(12) United States Patent
Gordon

(10) Patent No.: US 9,407,516 B2
(45) Date of Patent: Aug. 2, 2016

(54) LARGE SCALE STORAGE SYSTEM

(75) Inventor: Raz Gordon, Hadera (IL)

(73) Assignee: STORONE LTD., Ra'anana (IL)

( * ) Notice: Subject to any disclaimer, the term of this patent is extended or adjusted under 35 U.S.C. 154(b) by 192 days.

(21) Appl. No.: 13/978,959

(22) PCT Filed: Jan. 10, 2012

(86) PCT No.: PCT/IL2012/050007
§ 371 (c)(1),
(2), (4) Date: Jul. 10, 2013

(87) PCT Pub. No.: WO2012/095848
PCT Pub. Date: Jul. 19, 2012

(65) Prior Publication Data
US 2013/0290399 A1 Oct. 31, 2013

Related U.S. Application Data

(60) Provisional application No. 61/431,079, filed on Jan. 10, 2011.

(51) Int. Cl.
*G06F 15/173* (2006.01)
*G06F 13/28* (2006.01)
(Continued)

(52) U.S. Cl.
CPC ........ *H04L 41/5051* (2013.01); *H04L 41/0816* (2013.01); *H04L 41/5025* (2013.01);
(Continued)

(58) Field of Classification Search
CPC ......... H04L 45/00; H04L 45/22; H04L 45/28; H04L 29/14; H04L 29/06
USPC ........................................................ 709/239
See application file for complete search history.

(56) References Cited

U.S. PATENT DOCUMENTS

| 5,987,505 A | 11/1999 | Fry et al. |
| 6,538,669 B1 | 3/2003 | Lagueux, Jr. et al. |

(Continued)

FOREIGN PATENT DOCUMENTS

| JP | 2002-182859 A | 6/2002 |
| JP | 2002-312699 A | 10/2002 |

(Continued)

OTHER PUBLICATIONS

He, Xubin et al., Journal of Parallel and Distrubuted Computing, STICS: SCSI-to-IP cache for storage area networks, 2004, 64(9), pp. 1069-1085.

(Continued)

*Primary Examiner* — David Lazaro
*Assistant Examiner* — Mahran Abu Roumi
(74) *Attorney, Agent, or Firm* — Oliff PLC

(57) ABSTRACT

A distributed storage system comprising interconnected computer nodes; each one of the computer nodes comprising at least one processing resource configured to execute a Unified Distributed Storage Platform (UDSP) agent; at least one of the computer nodes comprising one or more resources including at least one cache resource configured to cache objects and having corresponding cache-related parameters; at least one UDSP agent of a respective computer node having the at least one cache resource is configured to: monitor cache-related parameters of the at least one cache resource connected to the respective computer node, for determining whether the cache-related parameters meet at least one first SLS criteria; and in the case the at least one first SLS criteria is not met, initiate handoff of at least part of one or more cache object spaces of the at least one cache resource to at least one other computer node, which after receiving the at least part of one or more cache object spaces, its cache-related parameters meet at least one second SLS criteria.

19 Claims, 17 Drawing Sheets

(51) Int. Cl.
*H04L 12/24* (2006.01)
*H04L 12/26* (2006.01)
*H04L 29/08* (2006.01)

(52) U.S. Cl.
CPC ............ *H04L43/04* (2013.01); *H04L 43/0876* (2013.01); *H04L 67/1012* (2013.01); *H04L 67/1097* (2013.01); *H04L 67/2842* (2013.01); *H04L 67/322* (2013.01)

(56) References Cited

U.S. PATENT DOCUMENTS

| | | | |
|---|---|---|---|
| 6,804,819 | B1 | 10/2004 | Bates et al. |
| 6,907,501 | B2 * | 6/2005 | Tariq .................. H04L 65/4084 455/439 |
| 6,977,927 | B1 | 12/2005 | Bates et al. |
| 7,434,002 | B1 | 10/2008 | Zedlewski et al. |
| 7,463,648 | B1 | 12/2008 | Eppstein et al. |
| 7,525,957 | B2 | 4/2009 | Scherer et al. |
| 7,584,337 | B2 | 9/2009 | Rowan et al. |
| 7,594,002 | B1 | 9/2009 | Thorpe et al. |
| 7,702,757 | B2 | 4/2010 | Bergman et al. |
| 7,831,773 | B2 * | 11/2010 | Zedlewski .......... G06F 11/3409 711/130 |
| 7,992,031 | B2 | 8/2011 | Chavda et al. |
| 8,176,358 | B2 | 5/2012 | Bensinger |
| 8,194,339 | B2 | 6/2012 | Wilson |
| 2002/0004912 | A1 | 1/2002 | Fung |
| 2002/0152181 | A1 * | 10/2002 | Kanai .................. G06Q 50/188 705/80 |
| 2002/0156984 | A1 | 10/2002 | Padovano |
| 2003/0131068 | A1 | 7/2003 | Hoshino et al. |
| 2003/0135609 | A1 | 7/2003 | Carlson et al. |
| 2003/0145038 | A1 | 7/2003 | Bin Tariq et al. |
| 2003/0188085 | A1 * | 10/2003 | Arakawa .............. G06F 3/0605 711/100 |
| 2004/0006589 | A1 | 1/2004 | Maconi et al. |
| 2004/0111514 | A1 | 6/2004 | Chase et al. |
| 2004/0123062 | A1 * | 6/2004 | Dalal ................... G06F 3/0605 711/170 |
| 2004/0230753 | A1 | 11/2004 | Amiri et al. |
| 2005/0027938 | A1 | 2/2005 | Burkey |
| 2005/0081086 | A1 | 4/2005 | Williams |
| 2005/0278360 | A1 | 12/2005 | Boyd et al. |
| 2006/0041644 | A1 | 2/2006 | Henseler |
| 2006/0129759 | A1 | 6/2006 | Bartlett et al. |
| 2006/0236061 | A1 | 10/2006 | Koclanes |
| 2008/0091843 | A1 * | 4/2008 | Kulkarni ........... G06F 17/30887 709/239 |
| 2008/0168432 | A1 | 7/2008 | Ayachitula et al. |
| 2008/0209142 | A1 | 8/2008 | Obernuefemann |
| 2008/0313242 | A1 | 12/2008 | Doerr |
| 2009/0049328 | A1 | 2/2009 | Hattori et al. |
| 2009/0055689 | A1 | 2/2009 | Petersen |
| 2009/0070337 | A1 | 3/2009 | Romem et al. |
| 2009/0132543 | A1 | 5/2009 | Chatley et al. |
| 2010/0254347 | A1 | 10/2010 | Muhanna et al. |
| 2011/0153770 | A1 | 6/2011 | Antani et al. |
| 2012/0072723 | A1 | 3/2012 | Orsini et al. |
| 2013/0042260 | A1 | 2/2013 | Challenger et al. |
| 2013/0290399 | A1 | 10/2013 | Gordon |

FOREIGN PATENT DOCUMENTS

| | | |
|---|---|---|
| JP | 2003-289327 A | 10/2003 |
| JP | 2003-296039 A | 10/2003 |
| JP | 2005-050007 A | 2/2005 |
| JP | 2005-050303 A | 2/2005 |
| WO | 02/067529 A2 | 8/2002 |
| WO | 2005/076120 A1 | 8/2005 |
| WO | 2007-114887 A1 | 10/2007 |
| WO | 2009/114310 A1 | 9/2009 |
| WO | 2012/104847 A1 | 8/2012 |

OTHER PUBLICATIONS

Kim, Song-Kyoo "Enhanced management method of storage area network (SAN) server with random remote backups", Mathematical and Computer Modelling, 2005, 42(9-10), pp. 947-958.
W.Y.H. Wang et al., "Design and development of Ethernet-based storage area network protocol", Networks, 2004, pp. 48-52.
Walker, Cameron G. et al., A Single-edge formulation with problem-specific cuts, Core-Edge design of storage area networks, Computers & Operations Research, 2010, vol. 37, pp. 916-926.
Burns, Randal Chilton, "Data management in a distrubuted file system for storage area networks", University of California, Santa Cruz, 2000.
M. Banikazemi et al., "Storage-Based Intrusion Detection for Storage Area Networks (SANs)", Mass Storage Systems and Technologies, 2005, pp. 118-127.
X. Molero et al., "Performance analysis of storage area networks using high-speed LAN interconnects", Networks, 2000, pp. 474-478.
Wezel et al., "Nuclear Instruments and Methods in Physics Research Section A: Accelerators, Sepctrometers, Detectors and Associated Equipment", First experiences with large SAN storage and Linux, 2004, 534(1-2), pp. 29-32.
I. Ari et al., SANBoost: automated "SAN-level caching in storage area network", 2004, Autonomic Computing, pp. 164-171.
C. DeCusatis, "Optical Fiber Communication Conference and Exhibit", Storage area network applications, 2002, pp. 443-444.
Jin, Yang et al., "Computer Engineering", Performance Testing of Storage Area Network, 2003.
Oct. 2010 "New Storage Solution Description", Glasshouse.
Patil et al., "Unified Virtual Storage: Virtualization of Distrubuted Storage in a Network;" International Journal of Computer Applications, vol. 1, pp. 30-33.

* cited by examiner

LARGE SCALE STORAGE SYSTEM

FIELD OF PRESENTLY DISCLOSED SUBJECT MATTER

The invention relates to large scale storage systems and in particular to an apparatus and a method for implementing such systems.

BACKGROUND

Distributed storage systems have rapidly developed over the last decade as networks grow in capacity and speed. With networks expanding from local area networks (LAN) to global wide area networks (WAN), businesses are becoming more globally distributed, resulting in a demand for distributed storage systems to provide data storage and access over remote geographic locations. There is thus a need in the art for a new method and system for distributing data storage over a general purpose network.

Prior art references considered to be relevant as background to the presently disclosed subject matter are listed below. Acknowledgement of the references herein is not to be inferred as meaning that these are in any way relevant to the patentability of the presently disclosed subject matter.

U.S. Patent Publication No. 2009/0070337, "Apparatus and Method for a Distributed Storage Global Database", relates to "A geographically distributed storage system for managing the distribution of data elements wherein requests for given data elements incur a geographic inertia. The geographically distributed storage system comprises geographically distributed sites, each comprises a site storage unit for locally storing a portion of a globally coherent distributed database that includes the data elements and a local access point for receiving requests relating to ones of the data elements. The geographically distributed storage system comprises a data management module for forwarding at least one requested data element to the local access point at a first of the geographically distributed sites from which the request is received and storing the at least one requested data element at the first site, thereby to provide local accessibility to the data element for future requests from the first site while maintaining the globally coherency of the distributed database."

U.S. Pat. No. 5,987,505, "Remote Access and Geographically Distributed Computers in a Globally Addressable Storage Environment", relates to "A computer system employs a globally addressable storage environment that allows a plurality of networked computers to access data by addressing even when the data is stored on a persistent storage device such as a computer hard disk and other traditionally non-addressable data storage devices. The computers can be located on a single computer network or on a plurality of interconnected computer networks such as two local area networks (LANs) coupled by a wide area network (WAN). The globally addressable storage environment allows data to be accessed and shared by and among the various computers on the plurality of networks."

International Journal of Computer Applications 2010 (0975-8887), Volume 1-No. 22, "Unified Virtual Storage: Virtualization of Distributed Storage in a Network", Ms. S. V. Patil et al., describes "a way to efficiently utilize free disk space on Desktop machines connected over a network. In many networks today, the local disks of a client node are only used sporadically. This is an attempt to mange the data storages in a network efficiently and to provide the software support for sharing of disk space on Desktop machines in LAN. In the current situation, storage expansion on conventional servers has constraints like, maximum expansion limitation, costly affair and in case of hardware replacement, up gradation, the manual relocation of Data becomes messy. UVS (Unified Virtual Storage) is an attempt to efficiently utilize freely available disk space on Desktop machines connected over a network. Its purpose to reduce load of data traffic on network server, to efficiently utilize space on client nodes thereby avoiding wastage of space, It also eliminates Hardware restriction for storage Expansion and provides Location transparency of data store. The main advantage of UVS is that it can be seamlessly integrated into the existing infrastructure (Local Area Network system). Virtual Storage is virtually infinite supporting scalable architecture. The client node can use the Unified Virtual Drive as a single point access for Distributed Storage across different servers thereby eliminating an individual addressing of the servers. The performance of prototype implemented on a UVS Server connected by network and performance is better the n the centralized system and that the overhead of the framework is moderate even during high load."

U.S. Patent Publication No. 2011/0153770, "Dynamic Structural Management of a Distributed Caching Infrastructure", relates to "a method, system and computer program product for the dynamic structural management of an n-Tier distributed caching infrastructure. In an embodiment of the invention, a method of dynamic structural management of an n-Tier distributed caching infrastructure includes establishing a communicative connection to a plurality of cache servers arranged in respective tier nodes in an n-Tier cache, collecting performance metrics for each of the cache servers in the respective tier nodes of the n-Tier cache, identifying a characteristic of a specific cache resource in a corresponding one of the tier nodes of the n-Tier crossing a threshold, and dynamically structuring a set of cache resources including the specific cache resource to account for the identified characteristic".

SUMMARY

In accordance with an aspect of the presently disclosed subject matter, there is provided a computer node configured to being connected to an infrastructure layer including interconnected computer nodes, at least one of the interconnected computer nodes comprising one or more storage-related resources, the computer node comprising at least one processing resource configured to execute a Unified Distributed Storage Platform (UDSP) agent, wherein the UDSP agent is configured to receive a task comprising at least one assignment; calculate grades for at least one of the assignments in respect of at least one of the interconnected computer nodes, such that each grade being indicative of a suitability of a respective computer node of the interconnected computer nodes to execute a respective assignment of the assignments while meeting at least one Service Level Specification (SLS) requirement, the grade is calculated also based on parameters data relating to one or more storage-related resources connected to the respective computer node, if any; execute one or more of the assignments or route the task to a more suitable computer node, based on the calculated grades; calculate grades for assignments of following tasks in respect of at least one added interconnected computer node of an updated infrastructure layer; the updated infrastructure layer is created in response to adding at least one additional interconnected computer node thereto; and execute one or more of the assignments of following tasks or route the following tasks to a more suitable computer node of the updated infrastructure layer, based on the calculated grades.

In accordance with certain examples of the presently disclosed subject matter, there is further provided a computer node wherein while calculating grades for the assignments of following tasks, the updated infrastructure layer is created, and the calculation is performed in respect of at least one added interconnected computer node of the created updated infrastructure layer.

In accordance with certain examples of the presently disclosed subject matter, there is yet further provided a computer node wherein while calculating grades for the assignments of following tasks, the updated infrastructure layer is created, and the calculation is performed in respect of at least one interconnected computer node of the created updated infrastructure layer.

In accordance with certain examples of the presently disclosed subject matter, there is yet further provided a computer node wherein the updated infrastructure is created dynamically.

In accordance with certain examples of the presently disclosed subject matter, there is yet further provided a computer node wherein grades are calculated only for pending assignments.

In accordance with certain examples of the presently disclosed subject matter, there is yet further provided a computer node wherein the one or more storage-related resources include at least one storage-related resource of the following storage-related resource categories: cache resources, data storage resources and network resources.

In accordance with certain examples of the presently disclosed subject matter, there is yet further provided a computer node wherein the one or more storage-related resources include at least one storage-related resource of each of the following storage-related resource categories: cache resources, data storage resources and network resources.

In accordance with certain examples of the presently disclosed subject matter, there is yet further provided a computer node wherein the assignment grades are calculated by an optimization engine.

In accordance with certain examples of the presently disclosed subject matter, there is yet further provided a computer wherein the optimization engine uses one or more of the following optimization techniques: Linear programming; Simulated annealing; Genetic algorithms.

In accordance with certain examples of the presently disclosed subject matter, there is yet further provided a computer node wherein the one or more optimization techniques uses heuristics or approximates.

In accordance with certain examples of the presently disclosed subject matter, there is yet further provided a computer node wherein the more suitable computer node is a most suitable computer node based on the calculated grades.

In accordance with certain examples of the presently disclosed subject matter, there is yet further provided a computer node wherein the UDSP agent is further configured to calculate an integrated grade based on the calculated assignments grades, and wherein the execution of one or more of said assignments or routing the task to a more suitable computer node, is based on the calculated integrated grade.

In accordance with certain examples of the presently disclosed subject matter, there is yet further provided a computer node wherein the task is received from a client server.

In accordance with certain examples of the presently disclosed subject matter, there is yet further provided a computer node wherein the task is received from a client server through a gateway resource.

In accordance with certain examples of the presently disclosed subject matter, there is yet further provided a computer node wherein the UDSP agent is further configured to: monitor at least one parameter indicative of the current state of the computer node or of the current state of one or more storage-related resources connected to the computer node, if any; propagate a notification indicative of a change to the at least one monitored parameter to at least one of the interconnected computer nodes.

In accordance with certain examples of the presently disclosed subject matter, there is yet further provided a computer node wherein the UDSP agent is further configured to calculate grades for assignments of following tasks in respect of at least one modified interconnected computer node of the updated infrastructure; the updated infrastructure layer includes at least one modified interconnected computer node; the modification including at least one of (i) at least one new storage-related resource is connected to the respective node (ii) at least one existing storage-related resource is disconnected from the respective node (iii) at least one existing storage-related resource is modified; calculate grades for assignments of following tasks in respect of at least one interconnected computer node having new storage-related resources connected thereto or having storage-related resources disconnected therefrom; and execute one or more of the assignments of following tasks or route the following tasks to a more suitable computer node of the updated infrastructure layer, based on the calculated grades.

In accordance with certain examples of the presently disclosed subject matter, there is yet further provided a computer node wherein the UDSP agent is further configured to: receive at least one Service Level Specification (SLS) comprising user-defined storage requirements referring to at least one logical storage entity, and storage-related resources parameters data relating to one or more storage-related resources connected to the interconnected computer nodes; calculate a configuration for the distributed storage system based, at least, on the at least one SLS and the storage-related resources parameter data; and automatically allocate at least part of one of the storage-related resources according to the calculated configuration.

In accordance with certain examples of the presently disclosed subject matter, there is yet further provided a computer node wherein the UDSP agent is further configured to receive dynamic behavior parameters data relating to dynamic behavior of the distributed storage system; upon at least one SLS being breached, calculate a reconfiguration for the storage system, based, at least, on the at least one SLS, the storage-related resources parameter data and the dynamic behavior parameter data; and automatically allocate at least part of one of the storage-related resources according to the calculated reconfiguration.

In accordance with an aspect of the presently disclosed subject matter, there is yet further provided a method of operating a computer node configured to being connected to an infrastructure layer including interconnected computer nodes, at least one of the interconnected computer nodes comprising one or more storage-related resources, the method comprising:
receiving a task comprising at least one assignment; calculating grades for at least one of the assignments in respect of at least one of the interconnected computer nodes, such that each grade being indicative of a suitability of a respective computer node of the interconnected computer nodes to execute a respective assignment of the assignments while meeting at least one Service Level Specification (SLS) requirement, the grade is calculated also based on parameters data relating to one or more storage-related resources connected to the respective computer node, if any; executing one or more of the assignments or routing the task to a more suitable computer node, based on the calculated grades; calculating grades for assignments of following tasks in respect of at least one added interconnected computer node of an updated infrastructure layer; the updated infrastructure layer is created in response to adding at least one additional interconnected computer node thereto; and executing one or more of the assignments of following tasks or routing the following tasks to a more suitable computer node of the updated infrastructure layer, based on the calculated grades.

In accordance with certain examples of the presently disclosed subject matter, there is yet further provided a method wherein while calculating grades for the assignments of following tasks, the updated infrastructure layer is created, and the calculation is performed in respect of at least one added interconnected computer node of the created updated infrastructure layer.

In accordance with certain examples of the presently disclosed subject matter, there is yet further provided a method wherein while calculating grades for the assignments of following tasks, the updated infrastructure layer is created, and the calculating is performed in respect of at least one interconnected computer node of the created updated infrastructure layer.

In accordance with certain examples of the presently disclosed subject matter, there is yet further provided a method wherein the updated infrastructure is created dynamically.

In accordance with certain examples of the presently disclosed subject matter, there is yet further provided a method wherein grades are calculated only for pending assignments.

In accordance with certain examples of the presently disclosed subject matter, there is yet further provided a method wherein the one or more storage-related resources include at least one storage-related resource of the following storage-related resource categories: cache resources, data storage resources and network resources.

In accordance with certain examples of the presently disclosed subject matter, there is yet further provided a method wherein the one or more storage-related resources include at least one storage-related resource of each of the following storage-related resource categories: cache resources, data storage resources and network resources.

In accordance with certain examples of the presently disclosed subject matter, there is yet further provided a method wherein the calculating grades is performed by an optimization engine.

In accordance with certain examples of the presently disclosed subject matter, there is yet further provided a method wherein the optimization engine uses one or more of the following optimization techniques: Linear programming; Simulated annealing; Genetic algorithms.

In accordance with certain examples of the presently disclosed subject matter, there is yet further provided a method wherein the one or more optimization techniques uses heuristics or approximates.

In accordance with certain examples of the presently disclosed subject matter, there is yet further provided a method wherein the more suitable computer node is a most suitable computer node based on the calculated grades.

In accordance with certain examples of the presently disclosed subject matter, there is yet further provided a method further comprising: calculating an integrated grade based on the calculated assignments grades, and wherein the executing one or more of the assignments or routing the task to a more suitable computer node, is based on the calculated integrated grades.

In accordance with certain examples of the presently disclosed subject matter, there is yet further provided a method wherein the task is received from a client server.

In accordance with certain examples of the presently disclosed subject matter, there is yet further provided a method wherein the task is received from a client server through a gateway resource.

In accordance with certain examples of the presently disclosed subject matter, there is yet further provided a method further comprising monitoring at least one parameter indicative of the current state of the computer node or of the current state of one or more storage-related resources connected to the computer node, if any; propagating a notification indicative of a change to the at least one monitored parameter to at least one of the interconnected computer nodes.

In accordance with certain examples of the presently disclosed subject matter, there is yet further provided a method further comprising: calculating grades for assignments of following tasks in respect of at least one modified interconnected computer node of the updated infrastructure; the updated infrastructure layer includes at least one modified interconnected computer node; the modification including at least one of (i) at least one new storage-related resource is connected to the respective node (ii) at least one existing storage-related resource is disconnected from the respective node (iii) at least one existing storage-related resource is modified; calculating grades for assignments of following tasks in respect of at least one interconnected computer node having new storage-related resources connected thereto or having storage-related resources disconnected therefrom; and executing one or more of the assignments of following tasks or routing the following tasks to a more suitable computer node of the updated infrastructure layer, based on the calculated grades.

In accordance with certain examples of the presently disclosed subject matter, there is yet further provided a method further comprising: receiving at least one Service Level Specification (SLS) comprising user-defined storage requirements referring to at least one logical storage entity, and storage-related resources parameters data relating to one or more storage-related resources connected to the interconnected computer nodes; calculating a configuration for the distributed storage system based, at least, on the at least one SLS and the storage-related resources parameter data; and automatically allocating at least part of one of the storage-related resources according to the calculated configuration.

In accordance with certain examples of the presently disclosed subject matter, there is yet further provided a method further comprising receiving dynamic behavior parameters data relating to dynamic behavior of the distributed storage system; upon at least one SLS being breached, calculating a reconfiguration for the distributed storage system, based, at least, on the at least one SLS, the storage-related resources parameter data and the dynamic behavior parameter data; and automatically allocating at least part of one of the storage-related resources according to the calculated reconfiguration.

In accordance with an aspect of the presently disclosed subject matter, there is yet further provided a distributed storage system comprising: an infrastructure layer including interconnected computer nodes, wherein each one of the interconnected computer nodes comprising at least one processing resource configured to execute a Unified Distributed Storage Platform (UDSP) agent; at least one of the interconnected computer nodes comprising one or more storage-related resources; the UDSP agent is configured to receive a task comprising at least one assignment; calculate grades for at least one of the assignments in respect of at least one of the interconnected computer nodes, such that each grade being indicative of a suitability of a respective computer node of the interconnected computer nodes to execute a respective assignment of the assignments while meeting at least one Service Level Specification (SLS) requirement, the grade is calculated also based on storage-related resource parameters data relating to one or more storage related resources connected to the respective computer node, if any; execute one or more of the assignments or route the task to a more suitable computer node of the infrastructure layer, based on the calculated grades; calculate grades for assignments of following tasks in respect of at least one added interconnected computer node of an updated infrastructure layer; the updated infrastructure layer is created in response to adding at least one additional interconnected computer node thereto; and execute one or more of the assignments of following tasks or route the following tasks to a more suitable computer node of the updated infrastructure layer, based on the calculated grades.

In accordance with certain examples of the presently disclosed subject matter, there is yet further provided a distributed storage system wherein while calculating grades for the assignments of following tasks, the updated infrastructure layer is created, and the calculation is performed in respect of at least one added interconnected computer node of the created updated infrastructure layer.

In accordance with certain examples of the presently disclosed subject matter, there is yet further provided a distributed storage system wherein while calculating grades for the assignments of following tasks, the updated infrastructure layer is created, and the calculation is performed in respect of at least one interconnected computer node of the created updated infrastructure layer.

In accordance with certain examples of the presently disclosed subject matter, there is yet further provided a distributed storage system wherein the updated infrastructure is created dynamically.

In accordance with certain examples of the presently disclosed subject matter, there is yet further provided a distributed storage system wherein grades are calculated only for pending assignments.

In accordance with certain examples of the presently disclosed subject matter, there is yet further provided a distributed storage system wherein the one or more storage-related resources include at least one storage-related resource of the following storage-related resource categories: cache resources, data storage resources and network resources.

In accordance with certain examples of the presently disclosed subject matter, there is yet further provided a distributed storage system wherein the one or more storage-related resources include at least one storage-related resource of each of the following storage-related resource categories: cache resources, data storage resources and network resources.

In accordance with certain examples of the presently disclosed subject matter, there is yet further provided a distributed storage system wherein the assignment grades are calculated by an optimization engine.

In accordance with certain examples of the presently disclosed subject matter, there is yet further provided a distributed storage system wherein the optimization engine uses one or more of the following optimization techniques: Linear programming; Simulated annealing; Genetic algorithms.

In accordance with certain examples of the presently disclosed subject matter, there is yet further provided a distributed storage system wherein the one or more optimization techniques uses heuristics or approximates.

In accordance with certain examples of the presently disclosed subject matter, there is yet further provided a distributed storage system wherein the more suitable computer node is a most suitable computer node based on the calculated grades.

In accordance with certain examples of the presently disclosed subject matter, there is yet further provided a distributed storage system wherein the UDSP agent is further configured to calculate an integrated grade based on the calculated assignments grades, and wherein the executing one or more of the assignments or routing the task to a more suitable computer node, is based on the calculated integrated grades.

In accordance with certain examples of the presently disclosed subject matter, there is yet further provided a distributed storage system wherein the task is received from a client server.

In accordance with certain examples of the presently disclosed subject matter, there is yet further provided a distributed storage system wherein the task is received from a client server through a gateway resource.

In accordance with certain examples of the presently disclosed subject matter, there is yet further provided a distributed storage system wherein the UDSP agent is further configured to monitor at least one parameter indicative of the current state of the computer node or of the current state of one or more storage-related resources connected to the computer node, if any; propagate a notification indicative of a change to the at least one monitored parameter to at least one of the interconnected computer nodes.

In accordance with certain examples of the presently disclosed subject matter, there is yet further provided a distributed storage system wherein the UDSP agent is further configured to:
calculate grades for assignments of following tasks in respect of at least one modified interconnected computer node of the updated infrastructure; the updated infrastructure layer includes at least one modified interconnected computer node; the modification including at least one of (i) at least one new storage-related resource is connected to the respective node (ii) at least one existing storage-related resource is disconnected from the respective node (iii) at least one existing storage-related resource is modified; calculate grades for assignments of following tasks in respect of at least one interconnected computer node having a new storage-related resources connected thereto or having storage-related resources disconnected therefrom; and execute one or more of the assignments of following tasks or route the following tasks to a more suitable computer node of the updated infrastructure layer, based on the calculated grades.

In accordance with certain examples of the presently disclosed subject matter, there is yet further provided a distributed storage system wherein the UDSP agent is further configured to:
receive at least one Service Level Specification (SLS) comprising user-defined storage requirements referring to at least one logical storage entity; calculate a configuration for the distributed storage system based, at least, on the at least one SLS and the storage-related resources parameter data; and automatically allocate at least part of one of the storage-related resources according to the calculated configuration.

In accordance with certain examples of the presently disclosed subject matter, there is yet further provided a distributed storage system wherein the UDSP agent is further configured to:
receive dynamic behavior parameters data relating to dynamic behavior of the distributed storage system; upon at least one SLS being breached, calculate a reconfiguration for the distributed storage system, based, at least, on the at least one SLS, the storage-related resources parameter data and the dynamic behavior parameter data; and automatically allocate at least part of one of the storage-related resources according to the calculated reconfiguration.

In accordance with an aspect of the presently disclosed subject matter, there is yet further provided a distributed storage system comprising: an infrastructure layer including interconnected computer nodes, wherein: each one of the interconnected computer nodes comprising at least one processing resource configured to execute a Unified Distributed Storage Platform (UDSP) agent; at least one of the interconnected computer nodes comprising one or more storage-related resources; the UDSP agent is configured to: receive a task comprising at least one assignment; calculate grades for at least one of the assignments in respect of at least one of the interconnected computer nodes, such that each grade being indicative of a suitability of a respective computer node of the interconnected computer nodes to execute a respective assignment of the assignments while meeting at least one Service Level Specification (SLS) requirement, the grade is calculated also based on parameters data relating to one or more storage related resources connected to the respective computer node, if any; execute one or more of the assignments or route the task to a more suitable computer node of the infrastructure layer, based on the calculated grades; calculate grades for assignments of following tasks in respect of at least one modified interconnected computer node of an updated infrastructure; the updated infrastructure layer is created in response to a modification of at least one interconnected computer node; the modification including at least one of (i) at least one new storage-related resource is connected to the respective node (ii) at least one existing storage-related resource is disconnected from the respective node (iii) at least one existing storage-related resource is modified; calculate grades for assignments of following tasks in respect of at least one interconnected computer node having a new storage-related resources connected thereto or having storage-related resources disconnected therefrom, giving rise to an updated infrastructure layer; and execute one or more of the assignments of following tasks or route the following tasks to a more suitable computer node of the updated infrastructure layer, based on the calculated grades.

In accordance with certain examples of the presently disclosed subject matter, there is yet further provided a distributed storage system wherein the UDSP agent is further configured to:
receive dynamic behavior parameters data relating to dynamic behavior of the distributed storage system; when at least one SLS requirement is breached, calculate a reconfiguration for the distributed storage system, based, at least, on the at least one SLS requirement, the storage-related resources parameter data and the dynamic behavior parameter data; and automatically allocate at least part of one of the storage-related resources according to the calculated reconfiguration.

In accordance with certain examples of the presently disclosed subject matter, there is yet further provided a distributed storage system wherein while calculating grades for the assignments of following tasks, the updated infrastructure layer is created, and the calculation is performed in respect of at least one modified interconnected computer node of the created updated infrastructure layer.

In accordance with certain examples of the presently disclosed subject matter, there is yet further provided a distributed storage system wherein while calculating grades for the assignments of following tasks, the updated infrastructure layer is created, and the calculation is performed in respect of at least one interconnected computer node of the created updated infrastructure layer.

In accordance with certain examples of the presently disclosed subject matter, there is yet further provided a distributed storage system wherein the updated infrastructure is created dynamically.

In accordance with certain examples of the presently disclosed subject matter, there is yet further provided a distributed storage system wherein the one or more storage-related resources include at least one storage-related resource of the following storage-related resource categories: cache resources, data storage resources and network resources.

In accordance with an aspect of the presently disclosed subject matter, there is yet further provided a computer node configured to being connected to an infrastructure layer including interconnected computer nodes, at least one of the interconnected computer nodes comprising one or more storage-related resources, the computer node comprising: at least one processing resource configured to execute a Unified Distributed Storage Platform (UDSP) agent, wherein the UDSP agent is configured to: receive a task comprising at least one assignment; calculate grades for at least one of the assignments in respect of at least one of the interconnected computer nodes, such that each grade being indicative of a suitability of a respective computer node of the interconnected computer nodes to execute a respective assignment of the assignments while meeting at least one Service Level Specification (SLS) requirement, the grade is calculated also based on parameters data relating to one or more storage related resources connected to the respective computer node, if any; execute one or more of the assignments or route the task to a more suitable computer node of the infrastructure layer, based on the calculated grades; calculate grades for assignments of following tasks in respect of at least one modified interconnected computer node of an updated infrastructure; the updated infrastructure layer is created in response to a modification of at least one interconnected computer node; the modification including at least one of (i) at least one new storage-related resource is connected to the respective node (ii) at least one existing storage-related resource is disconnected from the respective node (iii) at least one existing storage-related resource is modified; calculate grades for assignments of following tasks in respect of at least one interconnected computer node having a new storage-related resources connected thereto or having storage-related resources disconnected therefrom, giving rise to an updated infrastructure layer; and execute one or more of the assignments of following tasks or route the following tasks to a more suitable computer node of the updated infrastructure layer, based on the calculated grades.

In accordance with certain examples of the presently disclosed subject matter, there is yet further provided a computer node system wherein the UDSP agent is further configured to:
receive dynamic behavior parameters data relating to dynamic behavior of the storage system;
when at least one SLS requirement is breached, calculate a reconfiguration for the distributed storage system, based, at least, on the at least one SLS requirement, the storage-related resources parameter data and the dynamic behavior parameter data; and automatically allocate at least part of one of the storage-related resources according to the calculated reconfiguration.

In accordance with certain examples of the presently disclosed subject matter, there is yet further provided a computer node system wherein while calculating grades for the assignments of following tasks, the updated infrastructure layer is created, and the calculation is performed in respect of at least one modified interconnected computer node of the created updated infrastructure layer.

In accordance with certain examples of the presently disclosed subject matter, there is yet further provided a computer node system wherein while calculating grades for the assignments of following tasks, the updated infrastructure layer is created, and the calculation is performed in respect of at least one interconnected computer node of the created updated infrastructure layer.

In accordance with certain examples of the presently disclosed subject matter, there is yet further provided a computer node system wherein the updated infrastructure is created dynamically.

In accordance with certain examples of the presently disclosed subject matter, there is yet further provided a computer node system wherein the one or more storage-related resources include at least one storage-related resource of the following storage-related resource categories: cache resources, data storage resources and network resources.

In accordance with an aspect of the presently disclosed subject matter, there is yet further provided a method of operating a computer node configured to being connected to an infrastructure layer including interconnected computer nodes, at least one of the interconnected computer nodes comprising one or more storage-related resources, the method comprising:
receiving a task comprising at least one assignment; calculating grades for at least one of the assignments in respect of at least one of the interconnected computer nodes, such that each grade being indicative of a suitability of a respective computer node of the interconnected computer nodes to execute a respective assignment of the assignments while meeting at least one Service Level Specification (SLS) requirement, the grade is calculated also based on parameters data relating to one or more storage related resources connected to the respective computer node, if any; executing one or more of the assignments or routing the task to a more suitable computer node of the infrastructure layer, based on the calculated grades; calculating grades for assignments of following tasks in respect of at least one modified interconnected computer node of an updated infrastructure layer; the updated infrastructure layer is created in response to a modification of at least one interconnected computer node; the modification including at least one of (i) at least one new storage-related resource is connected to the respective node (ii) at least one existing storage-related resource is disconnected from the respective node (iii) at least one existing storage-related resource is modified; calculating grades for assignments of following tasks in respect of at least one interconnected computer node having a new storage-related resources connected thereto or having storage-related resources disconnected therefrom, giving rise to an updated infrastructure layer; and executing one or more of the assignments of following tasks or routing the following tasks to a more suitable computer node of the updated infrastructure layer, based on the calculated grades.

In accordance with certain examples of the presently disclosed subject matter, there is yet further provided a method further comprising receiving dynamic behavior parameters data relating to dynamic behavior of the storage system; when at least one SLS requirement is breached, calculating a reconfiguration for the distributed storage system, based, at least, on the at least one SLS requirement, the storage-related resources parameter data and the dynamic behavior parameter data; and automatically allocating at least part of one of the storage-related resources according to the calculated reconfiguration.

In accordance with certain examples of the presently disclosed subject matter, there is yet further provided a method wherein while calculating grades for the assignments of following tasks, the updated infrastructure layer is created, and the calculating is performed in respect of at least one modified interconnected computer node of the created updated infrastructure layer.

In accordance with certain examples of the presently disclosed subject matter, there is yet further provided a method wherein while calculating grades for the assignments of following tasks, the updated infrastructure layer is created, and the calculating is performed in respect of at least one interconnected computer node of the created updated infrastructure layer.

In accordance with certain examples of the presently disclosed subject matter, there is yet further provided a method wherein the updated infrastructure is created dynamically.

In accordance with certain examples of the presently disclosed subject matter, there is yet further provided a method wherein the one or more storage-related resources include at least one storage-related resource of the following storage-related resource categories: cache resources, data storage resources and network resources.

In accordance with an aspect of the presently disclosed subject matter, there is yet further provided a computer node configured to being connected to an infrastructure layer of a distributed storage system, the infrastructure layer including interconnected computer nodes, the computer node comprising: at least one processing resource configured to execute a Unified Distributed Storage Platform (UDSP) agent, wherein the UDSP agent is configured to:
receive at least one Service Level Specification (SLS) comprising user-defined storage requirements referring to at least one logical storage entity, and storage-related resources parameters data relating to one or more storage-related resources connected to the interconnected computer nodes; calculate a configuration for the distributed storage system based, at least, on the at least one SLS and said storage-related resources parameter data;
automatically allocate at least part of one of the storage-related resources according to the calculated configuration; receive dynamic behavior parameters data relating to dynamic behavior of the distributed storage system; upon at least one SLS being breached, calculate a reconfiguration for the distributed storage system, based, at least, on the at least one SLS, the storage-related resources parameter data and the dynamic behavior parameter data; and automatically allocate at least part of one of the storage-related resources according to the calculated reconfiguration.

In accordance with certain examples of the presently disclosed subject matter, there is yet further provided a computer node wherein the UDSP agent is further configured to:
receive a task comprising at least one assignment; calculate grades for at least one of the assignments in respect of at least one of the interconnected computer nodes, such that each grade being indicative of a suitability of a respective computer node of the interconnected computer nodes to execute a respective assignment of the assignments while meeting at least one user-defined storage-related requirement of the SLS, the grade is calculated also based on parameters data relating to one or more storage-related resources connected to the respective computer node, if any; execute one or more of the assignments or route the task to a more suitable computer node, based on the calculated grades; calculate grades for assignments of following tasks in respect of at least one added interconnected computer node of an updated infrastructure layer; the updated infrastructure layer is created in response to adding at least one additional interconnected computer node thereto; and execute one or more of the assignments of following tasks or route the following tasks to a more suitable computer node of the updated infrastructure layer, based on the calculated grades.

In accordance with certain examples of the presently disclosed subject matter, there is yet further provided a computer node wherein the configuration is calculated by an optimization engine.

In accordance with certain examples of the presently disclosed subject matter, there is yet further provided a computer node wherein the optimization engine uses one or more of the following optimization techniques: Linear programming; Simulated annealing; Genetic algorithms.

In accordance with certain examples of the presently disclosed subject matter, there is yet further provided a computer node wherein the one or more optimization techniques uses heuristics or approximates.

In accordance with certain examples of the presently disclosed subject matter, there is yet further provided a computer node wherein the storage requirements include at least one of: location; local protection level; backup retention policy; remote protection level; performance levels; encryption level; de-duplication; compression; storage method.

In accordance with certain examples of the presently disclosed subject matter, there is yet further provided a computer node wherein the one or more storage-related resources include at least one storage-related resource of the following storage-related resource categories: cache resources, data storage resources and network resources.

In accordance with certain examples of the presently disclosed subject matter, there is yet further provided a computer node wherein the storage-related resources are distributed among at least two locations.

In accordance with certain examples of the presently disclosed subject matter, there is yet further provided a computer node wherein the configuration includes over committing the storage system resources.

In accordance with certain examples of the presently disclosed subject matter, there is yet further provided a computer node wherein the UDSP agent is further configured, in response to a failure to determine the configuration, to provide a user with a failure notification or with a recommendation indicative of an addition of at least one additional storage-related resource which will allow successful calculation of a configuration.

In accordance with an aspect of the presently disclosed subject matter, there is yet further provided a method of operating a computer node configured to being connected to an infrastructure layer including interconnected computer nodes, at least one of the interconnected computer nodes comprising one or more storage-related resources, the method comprising:
receiving at least one Service Level Specification (SLS) comprising user-defined storage requirements referring to at least one logical storage entity, and storage-related resources parameters data relating to one or more storage-related resources connected to the interconnected computer nodes; calculating a configuration for the distributed storage system based, at least, on the at least one SLS and the storage-related resources parameter data;
automatically allocating at least part of one of the storage-related resources according to the calculated configuration; receiving dynamic behavior parameters data relating to dynamic behavior of the distributed storage system; upon at least one SLS being breached, calculating a reconfiguration for the distributed storage system, based, at least, on the at least one SLS, the storage-related resources parameter data and the dynamic behavior parameter data; and automatically allocating at least part of one of the storage-related resources according to the calculated reconfiguration.

In accordance with certain examples of the presently disclosed subject matter, there is yet further provided a method further comprising: receiving a task comprising at least one assignment; calculating grades for at least one of the assignments in respect of at least one of the interconnected computer nodes, such that each grade being indicative of a suitability of a respective computer node of the interconnected computer nodes to execute a respective assignment of the assignments while meeting at least one Service Level Specification (SLS) requirement, the grade is calculated also based on parameters data relating to one or more storage-related resources connected to the respective computer node, if any; executing one or more of the assignments or route the task to a more suitable computer node, based on the calculated grades; calculating grades for assignments of following tasks in respect of at least one added interconnected computer node of an updated infrastructure layer; the updated infrastructure layer is created in response to adding at least one additional interconnected computer node thereto; and executing one or more of the assignments of following tasks or routing the following tasks to a more suitable computer node of the updated infrastructure layer, based on the calculated grades.

In accordance with certain examples of the presently disclosed subject matter, there is yet further provided a method wherein the calculating a configuration is performed by an optimization engine.

In accordance with certain examples of the presently disclosed subject matter, there is yet further provided a method wherein the optimization engine uses one or more of the following optimization techniques: Linear programming; Simulated annealing; Genetic algorithms.

In accordance with certain examples of the presently disclosed subject matter, there is yet further provided a method wherein the one or more optimization techniques uses heuristics or approximates.

In accordance with certain examples of the presently disclosed subject matter, there is yet further provided a method wherein the storage requirements include at least one of: location; local protection level; backup retention policy; remote protection level; performance levels; encryption level; de-duplication; compression; storage method.

In accordance with certain examples of the presently disclosed subject matter, there is yet further provided a method wherein the one or more storage-related resources include at least one storage-related resource of the following storage-related resource categories: cache resources, data storage resources and network resources.

In accordance with certain examples of the presently disclosed subject matter, there is yet further provided a method wherein the storage-related resources are distributed among at least two locations.

In accordance with certain examples of the presently disclosed subject matter, there is yet further provided a method wherein the configuration includes over committing the storage system resources.

In accordance with certain examples of the presently disclosed subject matter, there is yet further provided a method further comprising: in response to a failure to determine the configuration, providing a user with a failure notification or with a recommendation indicative of an addition of at least one additional resource which will allow successful calculation of a configuration.

In accordance with an aspect of the presently disclosed subject matter, there is yet further provided a distributed storage system comprising: an infrastructure layer including interconnected computer nodes, wherein: each one of the interconnected computer nodes comprising at least one processing resource configured to execute a Unified Distributed Storage Platform (UDSP) agent; wherein the UDSP agent is configured to: receive at least one Service Level Specification (SLS) comprising user-defined storage requirements referring to at least one logical storage entity, and storage-related resources parameters data relating to one or more storage-related resources connected to the interconnected computer nodes; calculate a configuration for the distributed storage system based, at least, on the at least one SLS and the storage-related resources parameter data; automatically allocate at least part of one of the storage-related resources according to the calculated configuration; receive dynamic behavior parameters data relating to dynamic behavior of the distributed storage system; upon at least one SLS being breached, calculate a reconfiguration for the distributed storage system, based, at least, on the at least one SLS, said storage-related resources parameter data and the dynamic behavior parameter data; and automatically allocate at least part of one of the storage-related resources according to the calculated reconfiguration.

In accordance with certain examples of the presently disclosed subject matter, there is yet further provided a distributed storage system wherein the UDSP agent is further configured to:
receive a task comprising at least one assignment; calculate grades for at least one of the assignments in respect of at least one of the interconnected computer nodes, such that each grade being indicative of a suitability of a respective computer node of the interconnected computer nodes to execute a respective assignment of the assignments while meeting at least one user-defined storage requirement of the SLS, the grade is calculated also based on parameters data relating to one or more storage-related resources connected to the respective computer node, if any; execute one or more of the assignments or route the task to a more suitable computer node, based on the calculated grades; calculate grades for assignments of following tasks in respect of at least one added interconnected computer node of an updated infrastructure layer; the updated infrastructure layer is created in response to adding at least one additional interconnected computer node thereto; and execute one or more of the assignments of following tasks or route the following tasks to a more suitable computer node of the updated infrastructure layer, based on the calculated grades.

In accordance with certain examples of the presently disclosed subject matter, there is yet further provided a distributed storage system wherein the configuration is calculated by an optimization engine.

In accordance with certain examples of the presently disclosed subject matter, there is yet further provided a distributed storage system wherein the optimization engine uses one or more of the following optimization techniques: Linear programming; Simulated annealing; Genetic algorithms.

In accordance with certain examples of the presently disclosed subject matter, there is yet further provided a distributed storage system wherein the one or more optimization techniques uses heuristics or approximates.

In accordance with certain examples of the presently disclosed subject matter, there is yet further provided a distributed storage system wherein the storage requirements include at least one of: location; local protection level; backup retention policy; remote protection level; performance levels; encryption level; de-duplication; compression; storage method.

In accordance with certain examples of the presently disclosed subject matter, there is yet further provided a distributed storage system wherein the one or more storage-related resources include at least one storage-related resource of the following storage-related resource categories: cache resources, data storage resources and network resources.

In accordance with certain examples of the presently disclosed subject matter, there is yet further provided a distributed storage system wherein the storage-related resources are distributed among at least two locations.

In accordance with certain examples of the presently disclosed subject matter, there is yet further provided a distributed storage system wherein the configuration includes over committing the storage system resources.

In accordance with certain examples of the presently disclosed subject matter, there is yet further provided a distributed storage system wherein the UDSP agent is further configured, in response to a failure to determine the configuration, to provide a user with a failure notification or with a recommendation indicative of an addition of at least one additional resource which will allow successful calculation of a configuration.

In accordance with an aspect of the presently disclosed subject matter, there is yet further provided a distributed storage system comprising: an infrastructure layer including interconnected computer nodes, wherein: each one of the interconnected computer nodes comprising at least one processing resource configured to execute a Unified Distributed Storage Platform (UDSP) agent; wherein the UDSP agent is configured to: receive at least one Service Level Specification (SLS) comprising user-defined storage requirements referring to at least one logical storage entity, and storage-related resources parameters data relating to one or more storage-related resources connected to the interconnected computer nodes; calculate a configuration for the distributed storage system based, at least, on the at least one SLS and the storage-related resources parameter data; and automatically allocate at least part of one of the storage-related resources according to the calculated configuration.

In accordance with an aspect of the presently disclosed subject matter, there is yet further provided a computer node configured to being connected to an infrastructure layer of a distributed storage system, the infrastructure layer including interconnected computer nodes, the computer node comprising: at least one processing resource configured to execute a Unified Distributed Storage Platform (UDSP) agent, wherein the UDSP agent is configured to:
receive at least one Service Level Specification (SLS) comprising user-defined storage requirements referring to at least one logical storage entity, and storage-related resources parameters data relating to one or more storage-related resources connected to the interconnected computer nodes; calculate a configuration for the distributed storage system based, at least, on the at least one SLS and the storage-related resources parameter data; and
automatically allocate at least part of one of the storage-related resources according to the calculated configuration.

In accordance with an aspect of the presently disclosed subject matter, there is yet further provided a method of operating a computer node configured to being connected to an infrastructure layer of a distributed storage system, the infrastructure layer including interconnected computer nodes, the method comprising: receiving at least one Service Level Specification (SLS) comprising user-defined storage requirements referring to at least one logical storage entity, and storage-related resources parameters data relating to one or more storage-related resources connected to the interconnected computer nodes; calculating a configuration for the storage system based, at least, on the at least one SLS and the storage-related resources parameter data; and automatically allocating at least part of one of the storage-related resources according to the calculated configuration.

In accordance with an of the presently disclosed subject matter, there is yet further provided a distributed storage system comprising: an infrastructure layer including interconnected computer nodes, wherein: each one of the computer nodes comprising at least one processing resource configured to execute a Unified Distributed Storage Platform (UDSP) agent; at least one of the interconnected computer nodes comprising one or more other storage-related resources; the UDSP agent is configured to: receive a task comprising at least one assignment; calculate grades for at least one of the assignments in respect of at least one of the interconnected computer nodes, such that each grade being indicative of a suitability of a respective computer node of the interconnected computer nodes to execute a respective assignment of the assignments while meeting at least one Service Level Specification (SLS) requirement; and execute one or more of the assignments or route the task to a more suitable computer node of the infrastructure layer, based on the calculated grades.

In accordance with an aspect of the presently disclosed subject matter, there is yet further provided a computer node configured to being connected to an infrastructure layer including interconnected computer nodes comprising: at least one processing resource configured to execute a Unified Distributed Storage Platform (UDSP) agent, wherein the UDSP agent is configured to: receive a task comprising at least one assignment; calculate grades for at least one of the assignments in respect of at least one other computer node connected to the infrastructure layer and comprising one or more storage-related resources, such that each grade being indicative of a suitability of a respective computer node of the interconnected computer nodes to execute a respective assignment of the assignments while meeting at least one Service Level Specification (SLS) requirement; and execute one or more of the assignments or route the task to a more suitable computer node, based on the calculated grades.

In accordance with an aspect of the presently disclosed subject matter, there is yet further provided a method of operating a computer node configured to being connected to an infrastructure layer including interconnected computer nodes, the method comprising: receiving a task comprising at least one assignment; calculating grades for at least one of the assignments in respect of at least one other computer node connected to the infrastructure layer and comprising one or more storage-related resources, such that each grade being indicative of a suitability of a respective computer node of the interconnected computer nodes to execute a respective assignment of the assignments while meeting at least one Service Level Specification (SLS) requirement; and executing one or more of the assignments or routing the task to a more suitable computer node, based on the calculated grades.

In accordance with an aspect of the presently disclosed subject matter, there is yet further provided a distributed storage system comprising interconnected computer nodes; each one of the computer nodes comprising at least one processing resource configured to execute a Unified Distributed Storage Platform (UDSP) agent; at least one of the computer nodes comprising one or more resources including at least one cache resource configured to cache objects and having corresponding cache-related parameters; at least one UDSP agent of a respective computer node having the at least one cache resource is configured to: monitor cache-related parameters of the at least one cache resource connected to the respective computer node, for determining whether the cache-related parameters meet at least one first SLS criteria; and in the case the at least one first SLS criteria is not met, initiate handoff of at least part of one or more cache object spaces of the at least one cache resource to at least one other computer node, which after receiving the at least part of one or more cache object spaces, its cache-related parameters meet at least one second SLS criteria.

In accordance with certain examples of the presently disclosed subject matter, there is yet further provided a distributed storage system, wherein each UDSP agent of the respective computer node having the at least one cache resource is further configured to: monitor that the cache-related parameters meet at least one third SLS criteria indicative of underutilization of the corresponding cache resources; and in the case of meeting the at least one third SLS criteria, initiate handoff of at least part of one or more cache object spaces of the at least one cache resource to the at least one other computer node, which after receiving the at least part of one or more cache object spaces, its cache-related parameters meet the at least one second SLS criteria.

In accordance with certain examples of the presently disclosed subject matter, there is yet further provided a distributed storage system, wherein first computer nodes having respective UDSP data repositories, such that a UDSP data repository of a first computer node includes data on cache-related parameters corresponding to one or more cache resources of second computer nodes; the UDSP agent of the first computer node is configured to: monitor the cache-related parameters according to data extracted from its UDSP data repository in respect of one or more cache resources of at least one second computer node, for determining whether the cache-related parameters of a respective second computer node meet at least one first SLS criteria; and in the case the at least one first SLS criteria is not met, initiate a message to the respective second computer node including at least one of the cache-related parameters of the respective second computer node as extracted from the UDSP data repository of the first computer node, thereby allowing the respective second computer node to determine if the cache-related parameters received from the first computer node are preferable over the cache-related parameters of the second computer node.

In accordance with certain examples of the presently disclosed subject matter, there is yet further provided a distributed storage system wherein the first computer node has the at least one cache resource connected thereto.

In accordance with certain examples of the presently disclosed subject matter, there is yet further provided a distributed storage system wherein the UDSP data repository of the first computer node includes data also on self cache-related parameters corresponding to cache resources of the first computer node.

In accordance with certain examples of the presently disclosed subject matter, there is yet further provided a distributed storage system wherein the UDSP agent is further configured, in response to a failure to initiate the handoff, to provide a user with a failure notification or with a recommendation indicative of an addition of at least one additional cache resource allowing successful initiation of a handoff.

In accordance with certain examples of the presently disclosed subject matter, there is yet further provided a distributed storage system, wherein gateway resources or client servers, having respective UDSP data repositories, such that a UDSP data repository of a gateways resource or a client server includes data on cache-related parameters corresponding to one or more cache resources of computer nodes; the UDSP agent of the gateways resource or the client server is further configured to: monitor the cache-related parameters according to data extracted from its UDSP data repository in respect of one or more cache resources of at least one computer node, for determining whether the cache-related parameters of a respective computer node meet at least one first SLS criteria; and in the case the at least one first SLS criteria is not met, initiate a message to the respective computer node including at least one of the cache-related parameters of the respective computer node as extracted from the UDSP data repository of the gateways resource or the client server, thereby allowing the respective computer node to determine if the cache-related parameters received from the gateways resource or the client server are more preferable over the cache-related parameters of the computer node.

In accordance with certain examples of the presently disclosed subject matter, there is yet further provided a distributed storage system, wherein the UDSP agent of the respective computer node is further configured to: create a post-handoff cache mapping indicative of new locations of the at least part of one or more cache object spaces; send the post-handoff cache mapping to the other computer node and to one or more client servers associated with the at least part of one or more cache object spaces, if any; and transfer ownership of the at least part of one or more cache object spaces to the other computer node.

In accordance with certain examples of the presently disclosed subject matter, there is yet further provided a distributed storage system wherein the UDSP agent of the respective computer node is further configured to: receive a request relating to an object within the post-handoff cache mapping, during the handoff; if the object is not owned by the respective computer node according to the post-handoff cache mapping and the respective computer node does not have ownership of the object, relay the request to the other computer node.

In accordance with an aspect of the presently disclosed subject matter, there is yet further provided a computer node configured to being connected to an infrastructure layer including interconnected computer nodes, the computer node comprising: at least one cache resource configured to cache objects and having corresponding cache-related parameters; at least one processing resource configured to execute a Unified Distributed Storage Platform (UDSP) agent, wherein the UDSP agent is configured to: monitor cache-related parameters of the at least one cache resource connected to the computer node, for determining whether the cache-related parameters meet at least one first SLS criteria; and in the case the at least one first SLS criteria is not met, initiate handoff of at least part of one or more cache object spaces of the at least one cache resource to at least one other computer node of the interconnected computer nodes, which after receiving the at least part of one or more cache object spaces, its cache-related parameters meet at least one second SLS criteria.

In accordance with certain examples of the presently disclosed subject matter, there is yet further provided a computer node, wherein the UDSP agent is further configured to: monitor that the cache-related parameters meet at least one third SLS criteria indicative of underutilization of the corresponding cache resources; and in the case of meeting the at least one third SLS criteria, initiate handoff of at least part of one or more cache object spaces of the at least one cache resource to the at least one other computer node of the interconnected computer nodes, which after receiving the at least part of one or more cache object spaces, its cached parameters meet the at least one second SLS criteria.

In accordance with certain examples of the presently disclosed subject matter, there is yet further provided a computer node, wherein the computer node further comprises a UDSP data repository including data on cache-related parameters corresponding to one or more cache resources of at least one other computer node of the interconnected computer nodes; and wherein the UDSP agent is further configured to: monitor the cache-related parameters according to data extracted from its UDSP data repository in respect of the one or more cache resources of at least one other computer node, for determining whether the cache-related parameters of a respective other computer node meet at least one first SLS criteria; and in the case the at least one first SLS criteria is not met, initiate a message to the respective other computer node including at least one of the cache-related parameters of the respective other computer node as extracted from the UDSP data repository, thereby allowing the respective other computer node to determine if the cache-related parameters received from the computer node are preferable over the cache-related parameters of the other computer node.

In accordance with certain examples of the presently disclosed subject matter, there is yet further provided a computer node wherein the UDSP data repository includes data also on self cache-related parameters corresponding to cache resources of the computer node.

In accordance with certain examples of the presently disclosed subject matter, there is yet further provided a computer node wherein the UDSP agent is further configured, in response to a failure to initiate the handoff, to provide a user with a failure notification or with a recommendation indicative of an addition of at least one additional cache resource allowing successful initiation of a handoff.

In accordance with certain examples of the presently disclosed subject matter, there is yet further provided a computer node, wherein the UDSP agent is further configured to: create a post-handoff cache mapping indicative of new locations of the at least part of one or more cache object spaces; send the post-handoff cache mapping to the other computer node and to one or more client servers associated with the at least part of one or more cache object spaces, if any; and transfer ownership of the at least part of one or more cache object spaces to the other computer node.

In accordance with certain examples of the presently disclosed subject matter, there is yet further provided a computer node wherein the UDSP agent is further configured to: receive a request relating to an object within the post-handoff cache mapping, during the handoff; if the object is not owned by the respective computer node according to the post-handoff cache mapping and the respective computer node does not have ownership of the object, relay the request to the other computer node.

In accordance with an aspect of the presently disclosed subject matter, there is yet further provided a method of operating a computer node having at least one cache resource connected thereto, and configured to being connected to an infrastructure layer including interconnected computer nodes, the method comprising: monitoring cache-related parameters of the at least one cache resource having corresponding cache-related parameters and configured to cache objects, for determining whether the cache-related parameters meet at least one first SLS criteria; and in the case the at least one first SLS criteria is not met, initiating handoff of at least part of one or more cache object spaces of the at least one cache resource to at least one other computer node of the interconnected computer nodes, which after receiving the at least part of one or more cache object spaces, its cache-related parameters meet at least one second SLS criteria.

In accordance with certain examples of the presently disclosed subject matter, there is yet further provided a method, further comprising: monitoring that the cache-related parameters meet at least one third SLS criteria indicative of underutilization of the corresponding cache resources; and in the case of meeting the at least one third SLS criteria, initiating handoff of at least part of one or more cache object spaces of the at least one cache resource to the at least one other computer node of the interconnected computer nodes, which after receiving the at least part of one or more cache object spaces, its cached parameters meet the at least one second SLS criteria.

In accordance with certain examples of the presently disclosed subject matter, there is yet further provided a method, wherein the computer node further comprises a UDSP data repository including data on cache-related parameters corresponding to one or more cache resources of the at least one other computer node of the interconnected computer nodes; the method further comprising: monitoring the cache-related parameters according to data extracted from its UDSP data repository in respect of one or more cache resources of at least one other computer node, for determining whether the cache-related parameters of a respective other computer node meet at least one first SLS criteria; and in the case the at least one first SLS criteria is not met, initiating a message to the respective other computer node including at least one of the cache-related parameters of the respective other computer node as extracted from the UDSP data repository, thereby allowing the respective other computer node to determine if the cache-related parameters received from the computer node are preferable over the cache-related parameters of the other computer node.

In accordance with certain examples of the presently disclosed subject matter, there is yet further provided a method wherein the UDSP data repository includes data also on self cache-related parameters corresponding to cache resources of the computer node.

In accordance with certain examples of the presently disclosed subject matter, there is yet further provided a method further comprising, in response to a failure to initiate the handoff, providing a user with a failure notification or with a recommendation indicative of an addition of at least one additional cache resource allowing successful initiation of a handoff.

In accordance with certain examples of the presently disclosed subject matter, there is yet further provided a method, further comprising: creating a post-handoff cache mapping indicative of new locations of the at least part of one or more cache object spaces; sending the post-handoff cache mapping to the other computer node and to one or more client servers associated with the at least part of one or more cache object spaces or parts thereof, if any; and
transferring ownership of the at least part of one or more cache object spaces to the other computer node.

In accordance with certain examples of the presently disclosed subject matter, there is yet further provided a method further comprising: receiving a request relating to an object within the post-handoff cache mapping, during the handoff; if the object is not owned by the respective computer node according to the post-handoff cache mapping and the respective computer node does not have ownership of the object, relaying the request to the other computer node.

BRIEF DESCRIPTION OF FIGURES

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
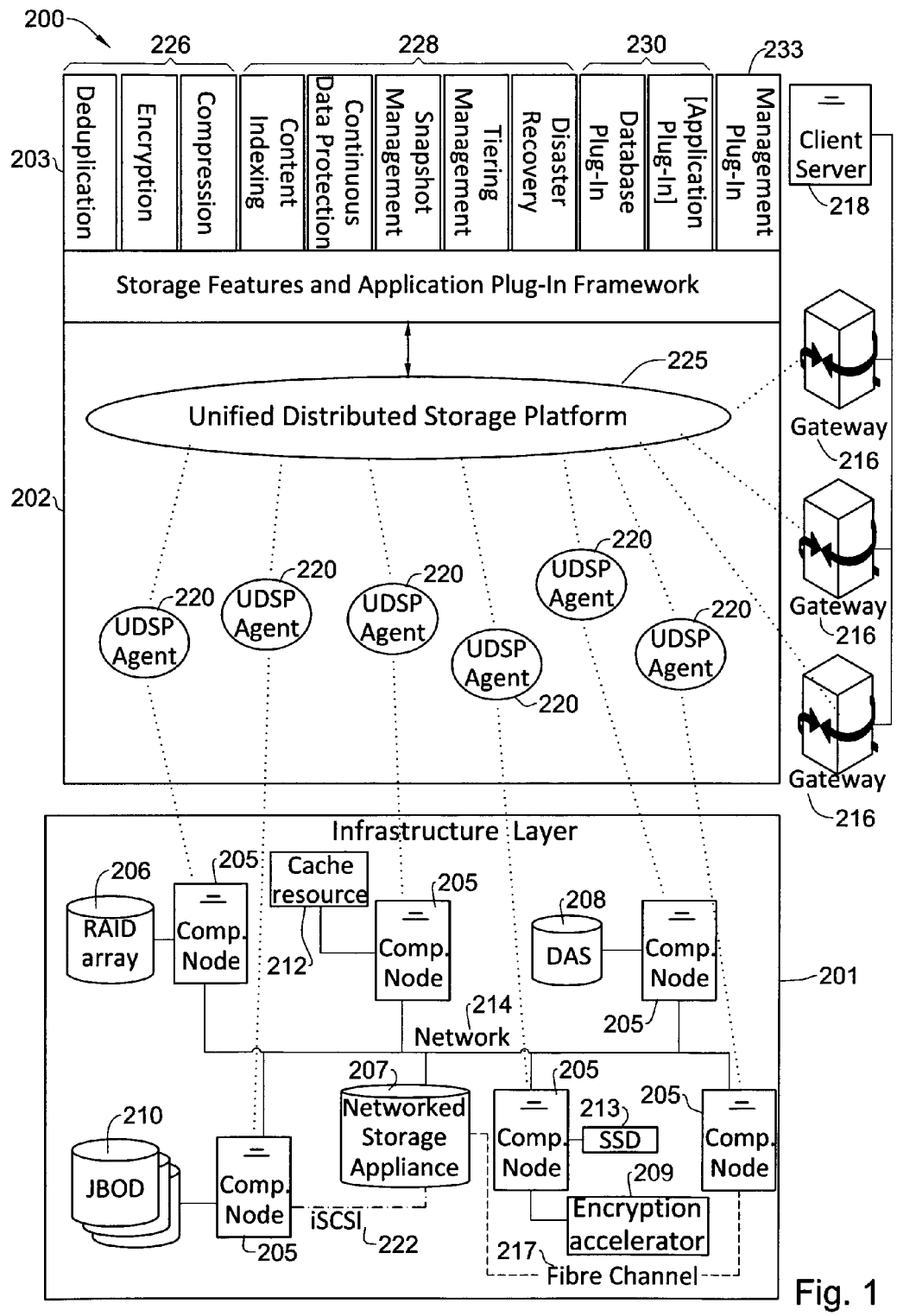
FIG. 1 schematically illustrates a top-level architecture of a Distributed Storage System including an Infrastructure Layer, according to an exemplary embodiment of the invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "calculating", "executing", "routing", "monitoring", "propagating", "allocating", "providing" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 3, 4, 6-18 and 20-23 may be executed. In embodiments of the presently disclosed subject matter one or more stages illustrated in FIGS. 3, 4, 6-18 and 20-23 may be executed in a different order and/or one or more groups of stages may be executed simultaneously. FIGS. 1, 2, 5 and 19 illustrate a general schematic of the system architecture in accordance with an embodiment of the presently disclosed subject matter. Each module in FIGS. 1, 2, 5 and 19 can be made up of any combination of software, hardware and/or firmware that performs the functions as defined and explained herein. The modules in FIGS. 1, 2, 5 and 19 may be centralized in one location or dispersed over more than one location. In other embodiments of the presently disclosed subject matter, the system may comprise fewer, more, and/or different modules than those shown in FIGS. 1, 2, 5 and 19.

Bearing this in mind, attention is drawn to FIG. 1, which schematically illustrates a top-level architecture of a Distributed Storage System including an Infrastructure Layer, according to the presently disclosed subject matter. According to examples of the presently disclosed subject matter, Distributed Storage System (DSS) 200 can comprise one or more of the following layers: an Infrastructure Layer 201, a Unified Distributed Storage Platform (UDSP) layer 202, and an API/framework layer 203.

Figure 5:
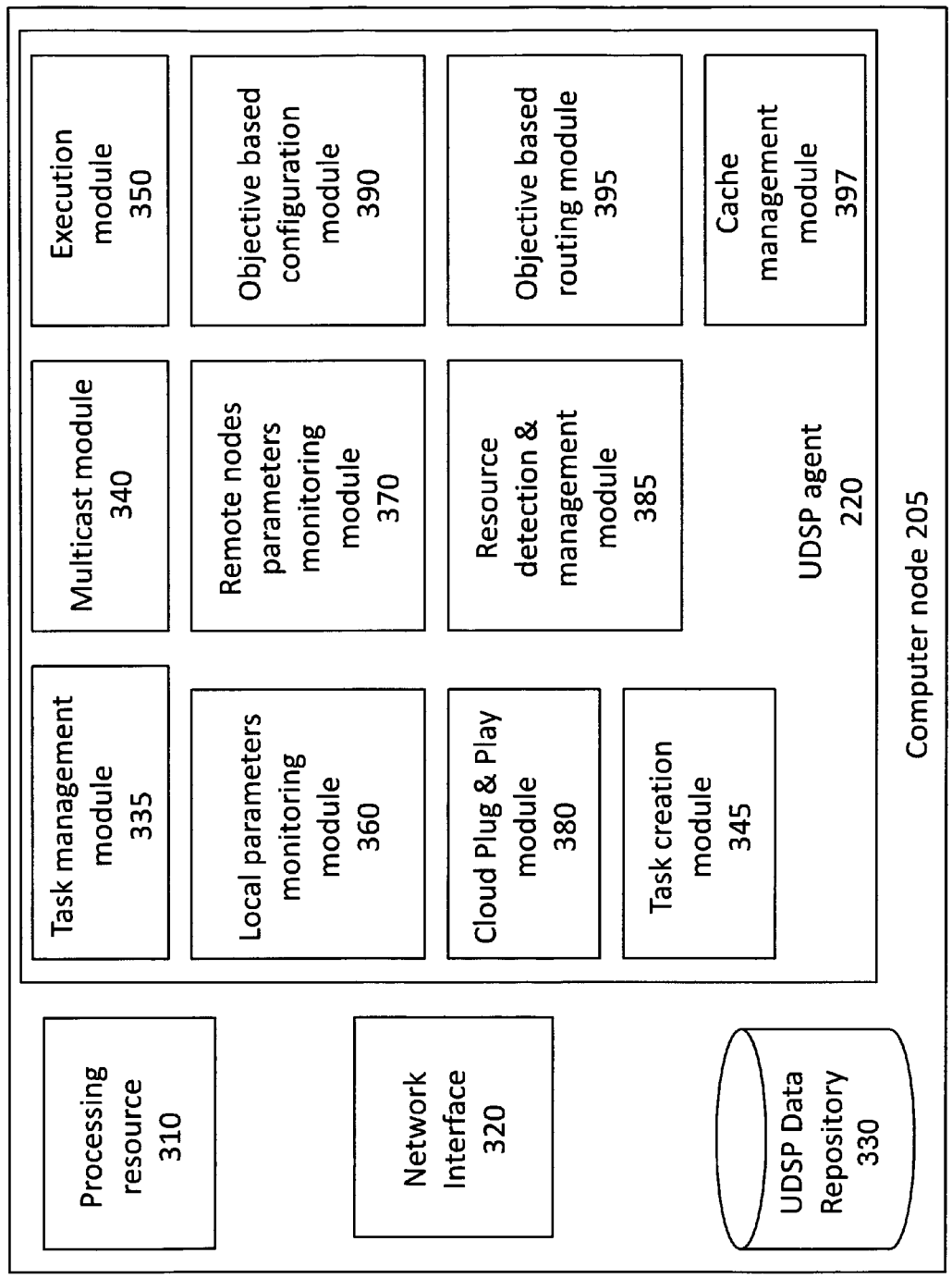
FIG. 5 is a block diagram schematically illustrating an exemplary computer node connected to the Distributed Storage System, according to certain examples of the presently disclosed subject matter.

According to some examples of the presently disclosed subject matter, infrastructure layer 201 can include one or more interconnected computer nodes 205 (e.g. any type of computer including, inter alia, one or more processing resources such as one or more processing units, one or more memory resources such as a memory, and one or more network interfaces), and in some cases two or more interconnected computer nodes 205, on which a more detailed description is provided herein, inter alia with reference to FIG. 5. Infrastructure layer 201 can further include one or more of the following storage-related resources: (a) data storage resources (e.g. data storage device 204, RAID (redundant array of independent disks) 206, DAS (direct attached storage) 208, JBOD (just a bunch of drives) 210, network storage appliance 207 (e.g. SAN, NAS, etc.), SSD 213, etc.); (b) cache resources 212 such as memory resources (e.g. RAM, DRAM, etc.), volatile and/or non-volatile, and/or a data storage resources (e.g. SSD 213) that in some cases can be used additionally or alternatively as a cache resource), etc.; (c) network resources 214; and (d) additional resources providing further functionality to the DSS 200 and/or enhance its performance (such as compression accelerator, encryption accelerator 209, Host Bus adapter (HBA) enabling communication with SAN resources, etc.).

In some cases, the resources can include more than one of a same type of device, and/or more than one of a different type of device. A more detailed description of some of the resources will follow herein.

According to some examples of the presently disclosed subject matter, the computer nodes 205 can be interconnected by a network (e.g. a general-purpose network).

In some cases, one or more of the resources of the infrastructure layer 201 can be connected to one or more computer nodes 205 directly. In some cases, one or more of the resources of the infrastructure layer 201 can be comprised within a computer node 205 and form a part thereof. In some cases, one or more of the resources of the infrastructure layer 201 can be connected (e.g. by a logical connection such as iSCSI 222, etc.) to one or more of the computer nodes 205 by a network (e.g. a general-purpose network).

Optionally, the network can be a general-purpose network. Optionally, the network can include a WAN. Optionally, the WAN can be a global WAN such as, for example, the Internet. Optionally, the network resources can interconnect using an IP network infrastructure. Optionally, the network can be a Storage Area Network (SAN). Optionally, the network can include storage virtualization. Optionally, the network can include a LAN. Optionally, the network infrastructure can include Ethernet, Infiniband, FC (Fibre Channel) 217, FCoE (Fibre Channel over Ethernet), etc., or any combination of two or more network infrastructures. Optionally, the network can be any type of network known in the art, including a general purpose network and/or a storage network. Optionally, the network can be any network suitable for applying an objective-based management system for allocating and managing resources within the network, as further detailed herein. Optionally, the network can be a combination of any two or more network types (including, inter alia, the network types disclosed herein).

According to some examples of the presently disclosed subject matter, at least one resource of the infrastructure layer 201 (including, inter alia, the computer nodes 205, the data storage resources, the cache resources, the network resources, additional resources connected to a computer node 205, or any other resources) can be an off-the-shelf, commodity, not purposely-built resource connected to the network and/or to one or more computer nodes 205. It is to be noted that such a resource can be interconnected as detailed herein, irrespective of the resource characteristics such as, for example, manufacturer, size, computing power, capacity, etc. Thus, any resource (including, inter alia, the computer nodes 205), irrespective of its manufacturer, which can communicate with a computer node 205, can be connected to the infrastructure layer 201 and utilized by the DSS 200 as further detailed herein. In some cases any number of resources (including, inter alia, the computer nodes 205) can be connected to the network and/or to one or more computer nodes 205 and utilized by the DSS 200, thus enabling scalability of the DSS 200. In some cases, any number of computer nodes 205 can be connected to the network and any number of resources can be connected to one or more computer nodes 205 and utilized by the DSS 200, thus enabling scalability of the DSS 200. It is to be noted that a more detailed explanation about the process of connecting new resources (including, inter alia, the computer nodes 205) to the DSS 200 is further detailed herein, inter alia with respect to FIG. 5.

Turning to the UDSP layer 202, according to some examples of the presently disclosed subject matter, it can include one or more UDSP agents 220 that can be installed on (or otherwise associated with or comprised within) one or more of the computer nodes 205. In some cases, a UDSP agent 220 can be installed on (or otherwise associated with) each of the computer nodes 205. In some cases, a UDSP agent 220 can be additionally installed on (or otherwise associated with) one or more of gateway resources 216 (that can act, inter alia, as protocol converters as further detailed herein), and in some cases, on each of the gateway resources 216. In some cases, a UDSP agent 220 can be additionally installed on (or otherwise associated with) one or more of the client servers 218 (e.g. servers and/or other devices connected to the DSS 200 as clients), and in some cases, on each of the client servers 218. It is to be noted that in some cases, client servers 218 can interact with DSS 200 directly without a need for any gateway resources 216 that are optional. It is to be further noted that in some cases there can be a difference in the UDSP agent 220 (e.g. a difference in its functionality and/or its capability, etc.) according to its installation location or its association (e.g. there can be a difference between a UDSP agent 220 installed on, or otherwise associated with, a computer node 205, a UDSP agent 220 installed on, or otherwise associated with, a gateway resources 216, a UDSP agent 220 installed on, or otherwise associated with, a client server 218, etc.).

It is to be noted that a detailed description of the UDSP agents 220 is provided herein, inter alia with respect to FIG. 5. Having said that, it is to be noted that according to some examples of the presently disclosed subject matter, UDSP agents 220 can be configured to control and manage various operations of DSS 200 (including, inter alia, automatically allocating and managing the resources of the Infrastructure Layer 201, handling data-path operations, etc.). In some cases, UDSP agents 220 can be configured to manage a connection of a new computer node 205 to the Infrastructure Layer 201 of DSS 200. In some cases, UDSP agents 220 can be configured to detect resources connected to the computer node 205 on which they are installed and to manage such resources. As indicated above, a more detailed description of the UDSP agents 220 is provided herein, inter alia with respect to FIG. 5.

In some cases, UDSP layer 202 can include UDSP 225 which includes a management system for DSS 200. Optionally, management system processing can be implemented through one or more UDSP agents 220 installed on the computer nodes 205 in Infrastructure Layer 201, or through one or more UDSP agents 220 installed on a gateway resource 216 or on a client server 218 with access to DSS 200 (e.g. directly and/or through gateway resources 216), or any combination thereof.

Management system can enable a user to perform various management tasks (including, inter alia monitoring and reporting tasks) relating to DSS 200, such as, creating new logical storage entities (such as Logical Units, Object Stores, file system instances, etc.) that can be associated with Service Level Specifications (SLSs) (in some cases, each logical storage entity is associated with a single SLS), updating logical storage entities, granting access permissions of logical storage entities to gateway resources 216 and/or to client servers 218, creating snapshots, creating backups, failover to remote site, failback to primary site, monitoring dynamic behavior of DSS 200, monitoring SLSs compliance, generation of various (e.g. pre-defined and/or user-defined, etc.) reports (e.g. performance reports, resource availability reports, inventory reports, relationship reports indicative of relationships between computer nodes 205 and other resources, trend reports and forecast reports of various parameters including Key Performance Indicators, etc.) referring to different scopes of the DSS 200 (e.g. in the resolution of the entire DSS 200, certain sites, certain types of use such as for a certain SLS, certain resources, etc.), managing various alerts provided by DSS 200 (e.g. alerts of failed hardware, etc.), etc. It is to be noted that the above management tasks are provided as non-limiting examples only. It is to be noted that in some cases, the logical storage entities can be created automatically by DSS 200 according to the SLS, as further detailed herein. It is to be noted that each of the logical storage entities can be associated with one or more data storage resources.

It is to be noted that throughout the specification, when reference is made to a user, this can refer to a human operator such as a system administrator, or to any type of auxiliary entity. An auxiliary entity can refer for example to an external application such as an external management system, including an auxiliary entity that does not require any human intervention, etc.

In some cases, management system can enable a user to provide DSS 200 with user-defined storage requirements defining a service level specification (SLS) specifying various requirements that the user requires the DSS 200 to meet. In some cases, the SLS can be associated with a logical storage entity. Optionally, the SLS can include information such as, for example, specifications of one or more geographical locations where the data is to be stored and/or handled; a local protection level defining availability, retention, recovery parameters (e.g. RPO—Recovery Point Objective, RTO—Recovery Time Objective); a backup retention policy defining for how long information should be retained; a remote protection level for disaster recovery (DR) defining one or more remote geographical locations in order to achieve specified availability, retention and recovery goals under various disaster scenarios; local and/or remote replication policy; performance levels (optionally committed) defined using metrics such as IOPS (input/output operations per second), response time, and throughput; encryption requirements; de-duplication requirements; compression requirements; a storage method (physical capacity, thin capacity/provisioning), etc.

In some cases, management system can enable management (including creation, update and deletion) of various Service Level Groups (SLG5). An SLG is a template SLS that can be shared among multiple logical storage entities. An SLG can be a partial SLS (that requires augmentation) and/or contain settings that can be overridden. Thus, for example, an SLG can define various recovery parameters only that can be inherited by various SLSs, each of which can add and/or override SLS parameters.

According to some examples of the presently disclosed subject matter, UDSP 225 can include an automatic management system for allocating resources and managing the resources in the DSS 200. Optionally, the automatic management system is an Objective-Based Management System (OBMS) 100 that can be configured to allocate and manage the resources in the network, inter alia based on any one of, or any combination of, user-defined requirements defined by one or more service level specifications (SLSs), data of various parameters relating to computer nodes 205 and/or to resources connected thereto, data of various parameters that refer to the DSS 200 or parts thereof (e.g. maximal allowed site-level over-commit, maximal allowed overall over-commit, various security parameters, etc.) and data of various parameters that refer to the dynamic behavior of the DSS 200 and the environment (e.g. the client servers 218, gateway resources 216, etc.), as further detailed herein, inter alia with respect to FIG. 2 and FIG. 5. Optionally, OBMS 100 processing can be implemented through one or more UDSP agents 220 installed on one or more of the computer nodes 205 in Infrastructure Layer 201, or through one or more UDSP agents 220 installed on a gateway resource 216 or on a client server 218 with access to DSS 200 (e.g. directly or through gateway resources 216), or any combination thereof.

According to some examples of the presently disclosed subject matter, API/framework layer 203 includes a plug-in layer which facilitates addition of software extensions (plug-ins) to DSS 200. Such plug-ins can be utilized for example for applying processes to the data, introducing new functionality and features to DSS 200, interfacing DSS 200 with specific applications and implementing application-specific tasks (e.g. storage related tasks, etc.), implementing various resource specific drivers, introducing new SLS parameters and/or parameter group/s (e.g. in relation to a plug-in functionality and/or goals), implementing management functionality, etc. In some cases, the plug-in layer can also include drivers associated with various hardware components (e.g. encryption cards, etc.).

In some cases the plug-ins can be deployed on one or more UDSP agents 220. In some cases, the plug-ins can be deployed on one or more UDSP agents 220 for example, according to the plug-in specifications (e.g. a software encryption plug-in can be installed on any UDSP agent 220), according to various resources connected to a computer node 205 and/or to a gateway resource 216 and/or to a client server 218 on which a UDSP agent 220 is installed (e.g. a hardware accelerator plug-in can be automatically deployed on each UDSP agent 220 associated with a computer node 205 that is associated with such a hardware accelerator), according to a decision of the automatic management system (e.g. OBMS 100), or according to a selection of a system administrator, etc. In some cases the plug-ins can be deployed automatically, e.g. by the automatic management system (e.g. OBMS 100) and/or by the computer nodes 205. Optionally, the software extensions can include data processing plug-ins 226 such as, for example, a data deduplication plug-in enabling for example deduplication of data stored on DSS 200, a data encryption plug-in enabling for example encryption/decryption of data stored on DSS 200, a data compression plug-in enabling for example compression/decompression of data stored on DSS 200, etc. Optionally, the software extensions can include storage feature plug-ins 228 such as, for example, a content indexing plug-in enabling for example indexing of data stored on DSS 200, a snapshot management plug-in enabling management of snapshots of data stored on DSS 200, a tiering management plug-in enabling for example tiering of data stored on DSS 200, a disaster recovery plug-in enabling for example management of process, policies and procedures related to disaster recovery, a continuous data protection plug-in enabling for example management of continuous or real time backup of data stored on DSS 200, etc. Optionally, the software extensions can include application plug-ins 230 such as, for example a database plug-in enabling for example accelerating query processing, a management plug-in 233 enabling for example performance of various DSS 200 management tasks and other interactions with users, client servers 218, and other entities connected to DSS 200, and other suitable application plug-ins.

As indicated herein, in some cases, a plug-in can introduce new SLS parameters and/or parameter group(s) (e.g. in relation to a plug-in functionality and/or goals). In such cases, according to the plug-in functionality, respective SLS parameters and/or parameter group(s) can be introduced to DSS 200. Such introduced SLS parameters can be used in order to set plug-in related requirements, e.g. by a user and/or automatically by the automatic management system (e.g. OBMS 100), etc.

In some cases, the software extensions can be stored on one of the computer nodes 205 or distributed on more than one computer node 205. In some cases, the software extensions can be stored on one or more data storage resources connected to one or more computer nodes 205. In some cases, the software extensions can be stored in a virtual software extensions library that can be shared by the UDSP agents 220.

In some cases, the software extensions can be managed, automatically and/or manually (e.g. by a system administrator). Such management can sometimes be performed by utilizing the management plug-in 233. In such cases, management plug-in 233 can enable addition/removal of software extension to/from DSS 200, addition/removal of various software extensions to/from one or more UDSP agents 220, etc.

Figure 2:
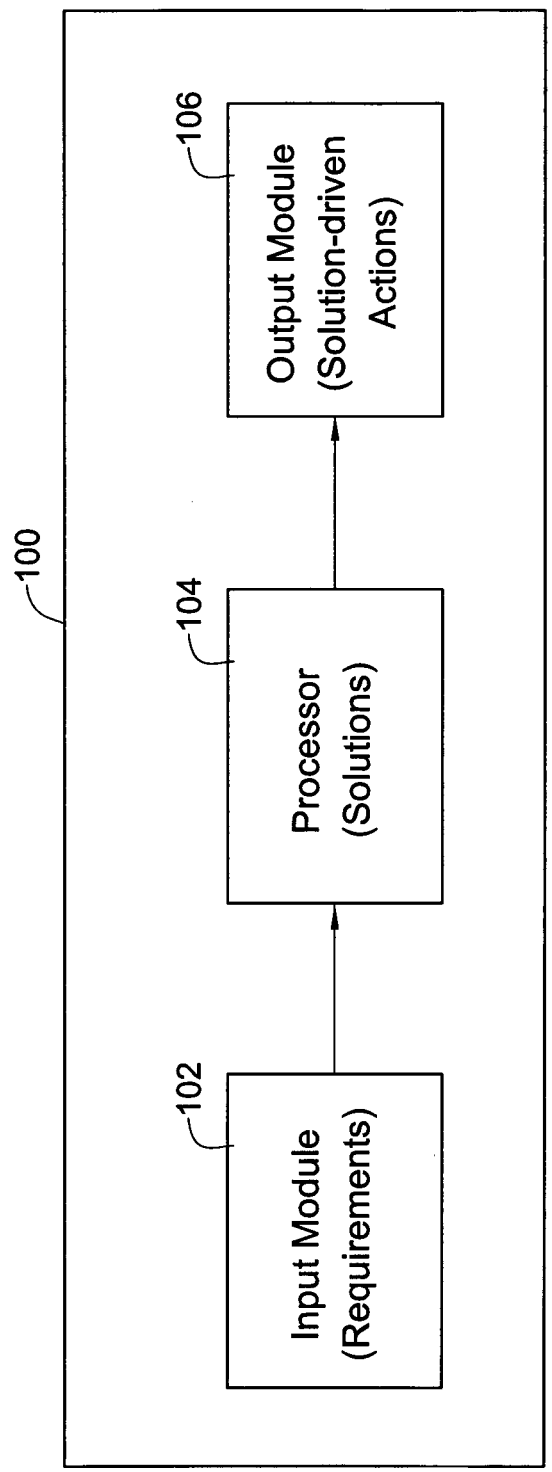
FIG. 2 schematically illustrates a simplified, exemplary system for configuring a Distributed Storage System, according to the presently disclosed subject matter.

Following the description of the top-level architecture of DSS 200, a detailed description of a DSS 200 configuration process that can be performed by Objective Based Management System (OBMS) 100 is hereby provided. For this purpose, attention is now drawn to FIG. 2, illustrating a simplified, exemplary system for configuring a Distributed Storage System 200, according to the presently disclosed subject matter. For this purpose, OBMS 100 can be configured, inter alia, to automatically allocate and manage resources in the Infrastructure Layer 201. OBMS 100 can include an Input Module 102, one or more Processors 104, and an Output Module 106.

In some cases, input Module 102 can be configured to receive input data. Such input data can include, inter alia, any one of, or any combination of, user-defined storage requirements defined by one or more service level specifications (SLSs), definitions of one or more logical storage entities, data of various parameters relating to computer nodes 205 and/or to resources connected thereto (including storage-related resources, also referred to as storage-related resources data), data of various parameters that refer to the DSS 200 or parts thereof (e.g. maximal allowed site-level over-commit, maximal allowed overall over-commit, various security parameters, etc.), data of various parameters relating to dynamic behavior (dynamic behavior parameter data) of the DSS 200 and the environment (e.g. the client servers 218, gateway resources 216, etc.), etc.

In some cases, user-defined requirements can define one or more service level specifications (SLSs) specifying various requirements that one or more users require the DSS 200 and/or one or more logical storage entities to meet.

In some cases, the data of various parameters relating to dynamic behavior of the DSS 200 and the environment (dynamic behavior parameter data) can include various parameters data indicative of the current state of one or more of the DSS 200 components (including the computer nodes 205 and the resources connected thereto). Such data can include data of presence and/or loads and/or availability and/or faults and/or capabilities and/or response time(s) and/or connectivity and/or cost(s) (e.g. costs of network links, different types of data storage resources) and/or any other data relating to one or more of the resources, including data relating to one or more computer nodes 205, one or more gateway resources 216, one or more client servers 218, etc. In some cases, such data can include, inter alia, various statistical data.

In some cases, the data of various parameters relating to computer nodes 205 and/or to resources connected thereto (including storage-related resources, also referred to as storage-related resources data) can include data of various parameters indicative of the resources of the DSS 200, including hardware resources, including storage-related resources, such as, for example:

a. parameters relating to a data storage resource, (e.g. for each of the its hard drives):
  1. Hard drive category parameters (e.g. hard drive size, interface (e.g. SAS, SATA, FC, Ultra-SCSI, etc.), cache size, special features (e.g. on-drive encryption, etc.), etc.);
  2. Hard drive performance parameters (e.g. response time, average latency, random seek time, data transfer rate, etc.);
  3. Hard drive power consumption;
  4. Hard drive reliability parameters (e.g. Mean Time Between Failure (MTBF), Annual Failure Rate (AFR), etc.).

b. computer node 205 parameters:
  1. Number of CPUs and cores per CPU.
  2. Performance parameters of each CPU and/or core, such as frequency, L2 and L3 cache sizes.
  3. Architecture (e.g. does the CPU and/or core support 64-bit computing, is it little-endian or big-endian)
  4. Support for certain instruction sets (e.g. AES-NI, a new instruction set for speeding up AES encryption).
  5. Number of hard drive slots available;
  6. Available storage interfaces (SATA, SAS, etc.);
  7. Maximal amount of memory;
  8. Supported memory configurations;

c. Cache resource parameters:
  1. Cache resource type (e.g. DRAM, SSD), size and performance.
  2. Is the cached storage space local or remote.
  3. NUMA parameters.

d. Gateway resource parameters:
  1. Number of CPUs and cores per CPU.
  2. Performance parameters of each CPU and/or core, such as frequency, L2 and L3 cache sizes.
  3. Architecture (e.g. does the CPU and/or core support 64-bit computing, is it little-endian or big-endian)
  4. Support for certain instruction sets (e.g. AES-NI, a new instruction set for speeding up AES encryption).
  5. Number of hard drive slots available in the enclosure;
  6. Available storage interfaces (SATA, SAS, etc.);
  7. Maximal amount of memory;
  8. Supported memory configurations;
  9. Networking parameters relating to gateway (number of ports, speed and type of each port, etc.)

e. Network resource parameters:
  1. Switching and routing capacities;
  2. Network types;
  3. Security parameters.

It is to be noted that these are mere examples and additional and/or alternative various parameters can be used.

In some cases, data relating to dynamic behavior of the DSS 200 and the environment (dynamic behavior parameter data) can include various parameters indicative of the resources of the DSS 200, including hardware resources such as, for example:

a. Parameters relating to a data storage resource (e.g. for each of its hard drives):
  1. Hard drive free space.
  2. S.M.A.R.T. parameters of the hard drive.
  3. The power state of the hard drive (turned off, in spin-up phase, ready, etc.)
  4. Recent and current load on hard drive.
  5. Existing allocations and reservations.

b. Computer node 205 parameters:
  1. Recent and current load statistics for each core.
  2. Existing allocations and reservations.
  3. Current amount of memory.

c. Cache resource parameters:
  1. Available size.
  2. Occupancy level of the cache.
  3. Recent and current swapping/page fault statistics.
  4. Existing allocations and reservations.

d. Gateway resource parameters:
  1. Recent and current network connections statistics.
  2. Recent and current node load statistics.
  3. Recent and current latency statistics.
  4. Recent and current routing cost statistics (for commands routed by a gateway into a DSS).
  5. Existing allocations and reservations.

e. Network resource parameters:
   1. Recent and current load of network segments.
   2. Recent and current reliability and quality parameters of network segments.
   3. Existing allocations and reservations.

It is to be noted that these are mere examples and additional and/or alternative various parameters can be used.

In some cases, input Module 102 can be configured to transfer the input data to one or more Processors 104. As indicated, OBMS 100 processing can be implemented through one or more UDSP agents 220 (e.g. while utilizing Objective based configuration module 380 as further detailed herein, inter alia with reference to FIG. 5), e.g. through UDSP agents 220 installed on one or more of the computer nodes 205 in Infrastructure Layer 201, or through UDSP agents 220 installed on one or more gateway resources 216, or through UDSP agents 220 installed on one or more client servers 218 with access to DSS 200 (e.g. directly or through gateway resources 216), or any combination thereof. In such cases, the one or more processors 104 can be one or more processing resources (e.g. processing units) associated with such UDSP agents 220 (e.g. if the processing is implemented through a UDSP agent 220 installed on a computer node 205, then processor can be the processing unit of that computer node 205, etc.). It is to be noted that more than one processing resource (e.g. processing unit) can be used for example in case of parallel and/or distributed processing.

The one or more Processors 104 can be configured to receive the input data from Input Module 102 and to perform an optimization process based on the input data for determining configuration requirements that meet all of the user-defined storage requirements (e.g. SLSs) provided by the one or more users of DSS 200, inter alia with respect to entities that they affect (such as logical storage entities associated with such SLSs). A more detailed description of the optimization process and of the determined configuration requirements is provided herein, inter alia with respect to FIG. 3.

The configuration requirements can be transferred to Output Module 106 which, in some cases, can determine if the current DSS 200 resources are sufficient to meet the determined configuration requirements. Accordingly, Output Module 106 can be configured to perform solution-driven actions, which include allocation, reservation, commit or over-commit (e.g. virtually allocating more resources than the actual resources available in the infrastructure layer 201) of the resources if the configuration requirements can be met by the system, or issuing improvement recommendations to be acted upon by the user which may include adding resources and/or adding plug-ins and/or any other recommendations for enabling the system to meet the configuration requirements. Such improvement recommendations can include, for example, recommendation to add one or more resources, to add or upgrade one or more plug-ins, to span the infrastructure across additional and/or different locations (local and/or remote), etc.

It is to be noted that in some cases the configuration process, or parts thereof, can be initiated when deploying the DSS 200 and/or one or more logical storage entities for the first time, and/or following one or more changes (e.g. pre-defined changes) applied to DSS 200 and/or to one or more logical storage entities (e.g. addition/removal of a resource such as computer nodes 205, cache resources, data storage resources, network resources, plug-ins or any other resource to DSS 200; a change in one or more user-defined storage requirements; etc.), and/or according to the dynamic behavior of DSS 200 (as further detailed below, inter alia with respect to FIG. 5 and FIG. 11), etc. Additionally or alternatively, the configuration process, or parts thereof, can be initiated in a semi-continuous manner (e.g. at pre-determined time intervals, etc.). Additionally or alternatively, the configuration process, or parts thereof, can be performed continuously.

It is to be further noted that, with reference to FIG. 2, some of the blocks can be integrated into a consolidated block or can be broken down to a few blocks and/or other blocks may be added. Furthermore, in some cases, the blocks can be performed in a different order than described herein. It should be also noted that whilst the flow diagrams are described also with reference to system elements that realizes them, this is by no means binding, and the blocks can be performed by elements other than those described herein.

Figure 3:
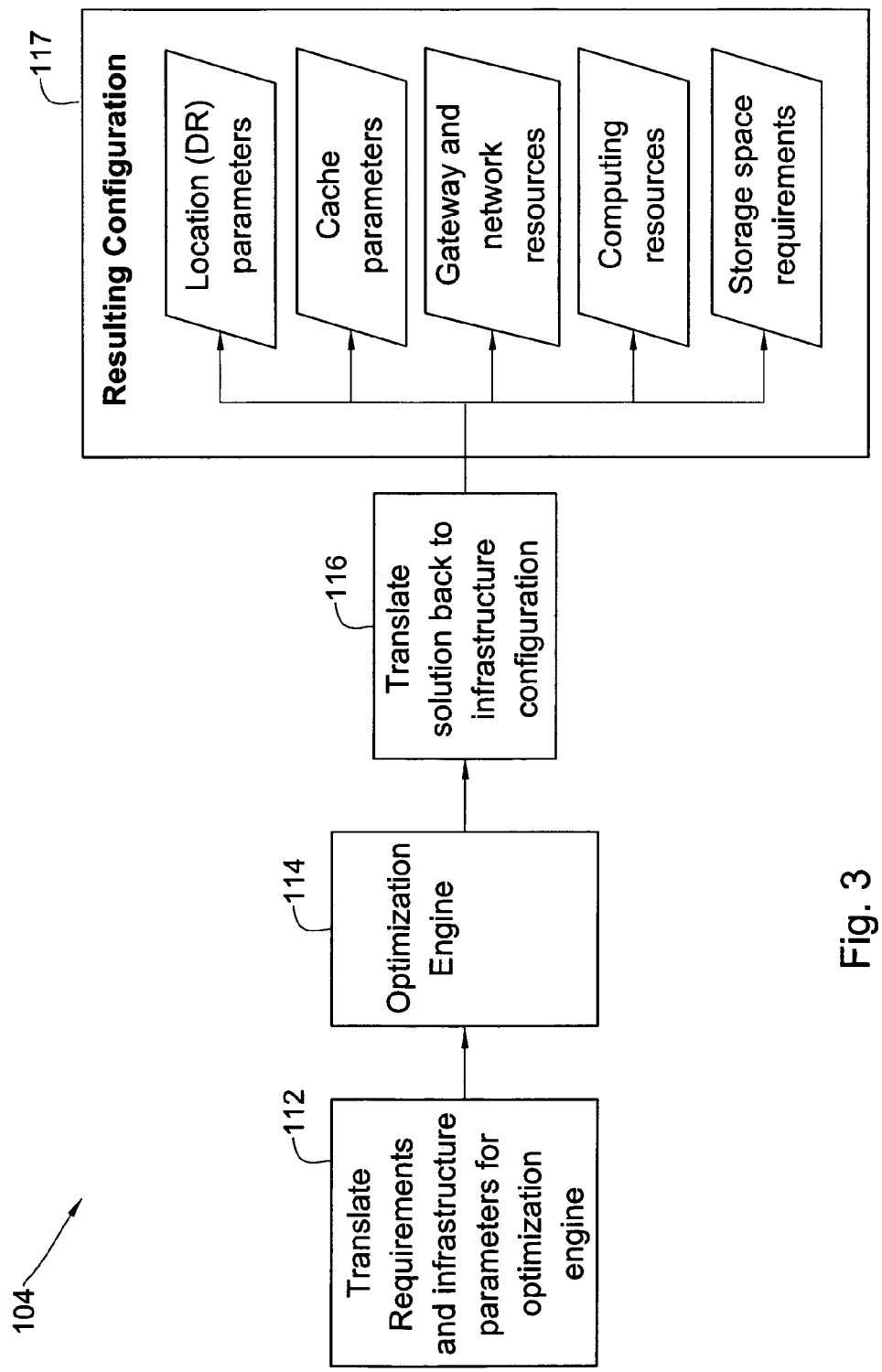
FIG. 3 schematically illustrates a simplified and exemplary flow diagram of an optimization process performed by the objective-based management system, according to the presently disclosed subject matter.

Attention is now drawn to FIG. 3, which schematically illustrates a simplified and exemplary flow diagram of an optimization process performed by the objective-based storage management system, according to the presently disclosed subject matter. In some cases, one or more Processors 104 can be configured to receive input data (e.g. from input module 102) and, in some cases, convert the received input data into a format suitable for processing by an optimization engine (e.g. into an optimization problem representation) (block 112).

An optimization engine associated with one or more Processors 104 can be configured to perform an optimization process, based on the original and/or converted input data to arrive at a required configuration which satisfies the requirements as defined by the input data (as further detailed herein, inter alia with respect to FIG. 2) (block 114). It is to be noted that in some cases, the optimization process can be instructed to return the first valid solution that it finds, whereas in other cases, the optimization process can be instructed to search for the optimal solution out of a set of calculated valid solutions. Optionally, the optimization techniques used in the optimization process can include any one of, or any combination of, linear programming, simulated annealing, genetic algorithms, or any other suitable optimization technique known in the art. Optionally, the optimization technique can utilize heuristics and/or approximations. Optionally, optimization decisions can be taken based on partial and/or not up-to-date information.

In some cases, the output of the optimization engine can be converted by the one or more Processors 104 from an optimization solution representation to a configuration requirements representation (block 116).

In some cases, the configuration requirements are output by the one or more Processors 104 for example as any one of, or any combination of, the following: location requirements (e.g. availability of at least one additional site, availability of a certain amount of storage space in the additional site/s, maximal latency between sites, minimal geographical distance between sites for example for disaster recovery purposes, etc.), cache resources requirements (e.g. required cache size, required cache type, required cache locations, required cache performance parameters, etc.), gateway resources requirements (e.g. required Fibre Channel bandwidth, required processing performance parameters, etc.), network resources requirements (e.g. required network bandwidth, required network type, etc.), computing resources requirements (e.g. computer nodes processing performance parameters, computer nodes number of CPU cores, etc.), data storage resources requirements (e.g. required storage space, required storage type, etc.), additional resource requirements (e.g. required compression performance, required encryption performance, etc.), plug-in requirements (e.g. required database plug-in, etc.), environment requirements (e.g. required physical security level, etc.), etc. (block 117).

It is to be noted that, with reference to FIG. 3, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Figure 4:
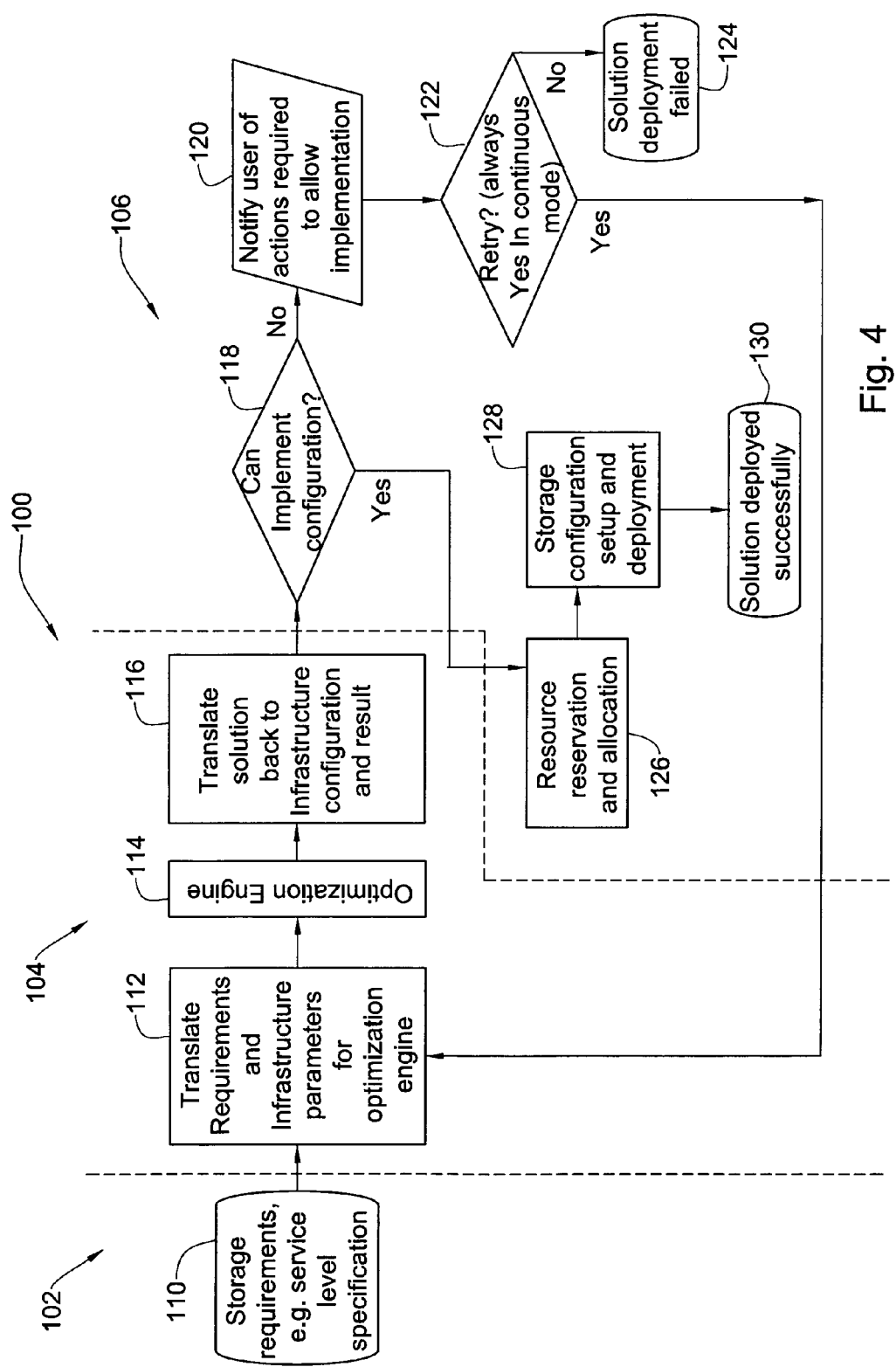
FIG. 4 schematically illustrates a simplified flow diagram of an exemplary operational algorithm of a configuration process performed by the objective-based management system, according to the presently disclosed subject matter.

Turning to FIG. 4, there is shown a schematic illustration of a simplified flow diagram of an exemplary operational algorithm of a configuration process performed by the objective-based management system, according to the presently disclosed subject matter. In some cases, as indicated above, Input Module 102 can receive the input data and transfer the data to the one or more Processors 104 (block 110). As further indicated above, the one or more Processors 104 can, in some cases, convert the input data into a format suitable for processing by an optimization engine (e.g. into an optimization problem representation) (block 112).

An optimization engine associated with one or more Processors 104 can be configured to perform an optimization process, based on the original and/or converted input data to arrive at a required configuration which satisfies the requirements as defined by the input data (as further detailed herein, inter alia with respect to FIG. 2) (block 114). In some cases, the output of the optimization engine can be converted by the one or more Processors 104 from an optimization solution representation to a configuration requirements representation (block 116).

In some cases, output module can compare the required configuration with the actual data of the DSS 200 resources (e.g. the computer nodes 205, the storage-related resources, etc.) and/or environment for determination if the DSS 200 can meet the required configuration (block 118). It is to be noted that in some cases the actual DSS 200 resources can refer to those parts of the DSS 200 resources that are currently available. If the actual DSS 200 resources and/or environment can meet the required configuration, OBMS 100 can be configured to reserve and/or allocate the resources according to the required configuration (block 126). In some cases, OBMS 100 can be configured to set up the DSS 200 configuration and/or perform any induced deployment actions (block 128). In some cases, the set-up and/or deployment action can include, inter alia, automatically creating new logical storage entities (such as Logical Units, Object Stores, file system instances, etc.) associated with SLSs. In some cases, each logical storage entity is associated with a single SLS.

As part of setting-up the storage configuration and/or performing any induced deployment actions, relevant set-up and/or deployment action requests can be sent to the UDSP agents 205; in some cases such requests are sent to the UDSP agents 205 associated with the storage-related resources relevant for the requested set-up and/or deployment action. In some cases, the UDSP agents 205 that receive such requests can be configured to update a data repository associated therewith about the set-up and/or deployment requested to be used by DSS 200 as further detailed below, inter alia with respect to FIG. 5. In some cases, following the deployment, the process of deploying the DSS 200 ends successfully (block 130).

If the actual DSS 200 resources and/or environment cannot meet the required configuration, OBMS 100 can be configured to send a message to the user (e.g. a system administrator) providing the user with a failure notification and/or recommendations as to corrective actions to be taken by the user for allowing implementation of the required infrastructure configuration (block 120). Optionally, the action can include adding infrastructure resources which will allow successful calculation of a configuration. Optionally, the action can include adding relevant plug-ins. Optionally, the action can involve spanning infrastructure resources across additional and/or alternative locations. It is to be noted that the recommendations disclosed herein are mere examples, and other recommendations can be additionally or alternatively issued to the user. In some cases, OBMS 100 can be configured to make a decision as to whether the required infrastructure configuration should be re-evaluated, optionally after some interval/delay, or not (block 122). If yes, OBMS 100 can be configured to return to block 112. Optionally, the Output Module 106 automatically goes to 112, optionally after some interval/delay, if set to a continuous mode. Optionally, the decision to retry or not is based on user input of a retry instruction. If no, the process of deploying the DSS 200 failed. In some cases, OBMS 100 can be configured to report failures.

It is to be noted that, with reference to FIG. 4, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 5, in which a block diagram schematically illustrating an exemplary computer node connected to the Distributed Storage System, according to certain examples of the presently disclosed subject matter, is shown.

According to some examples of the presently disclosed subject matter, Computer node 205 can comprise one or more processing resources 310. The one or more processing resources 310 can be a processing unit, a microprocessor, a microcontroller or any other computing device or module, including multiple and/or parallel and/or distributed processing units, which are adapted to independently or cooperatively process data for controlling relevant computer node 205 resources and/or storage-related resources connected to computer node 205 and for enabling operations related to computer node 205 resources and/or to storage-related resources connected to computer node 205.

Computer node 205 can further comprise one or more network interfaces 320 (e.g. a network interface card, or any other suitable device) for enabling computer node 205 to communicate, inter alia with other computer nodes and/or other resources connected to DSS 200.

According to some examples of the presently disclosed subject matter, computer node 205 can be associated with a UDSP data repository 330, configured to store data, including inter alia data of various user-defined storage requirements defining SLSs, and/or data of a logical storage entities associated with each SLS, and/or data of various parameters relating to computer nodes 205 and/or to storage-related resources connected thereto and/or data relating to various parameters that refer to the DSS 200 or parts thereof and/or data relating to dynamic behavior of the DSS 200 and the environment (e.g. the client servers 218, gateway resources 216, etc.), and/or data relating to the DSS 200 set-up and/or deployment and/or any other data. In some cases, UDSP data repository 330 can be further configured to enable retrieval, update and deletion of the stored data. It is to be noted that in some cases, UDSP data repository 330 can be located locally on computer node 205, on a storage-related resource connected to computer node 205 (e.g. a data storage resource, a cache resource, or any other suitable resource), on a client server 218, on a gateway resource 216, or any other suitable location. In some cases, UDSP data repository 330 can be distributed between two or more locations. In some cases, UDSP data repository 330 can be additionally or alternatively stored on one or more logical storage entities within the DSS 200. In some cases, additionally or alternatively, UDSP data repository 330 can be shared between multiple computer nodes.

According to some examples of the presently disclosed subject matter, computer node 205 can further comprise a UDSP agent 220 that can be executed, for example, by the one or more processing resources 310. As indicated above, UDSP agents 220 can be configured, inter alia, to control and manage various operations of computer node 205 and/or DSS 200. UDSP agent 220 can comprise one or more of the following modules: a task management module 335, a multicast module 340, a task creation module 345, an execution module 350, a local parameters monitoring module 360, a remote nodes parameters monitoring module 370, a cloud plug & play module 380, a resource detection and management module 385, an objective based configuration module 390, a cache management module 397 and an objective based routing module 395.

Figure 8:
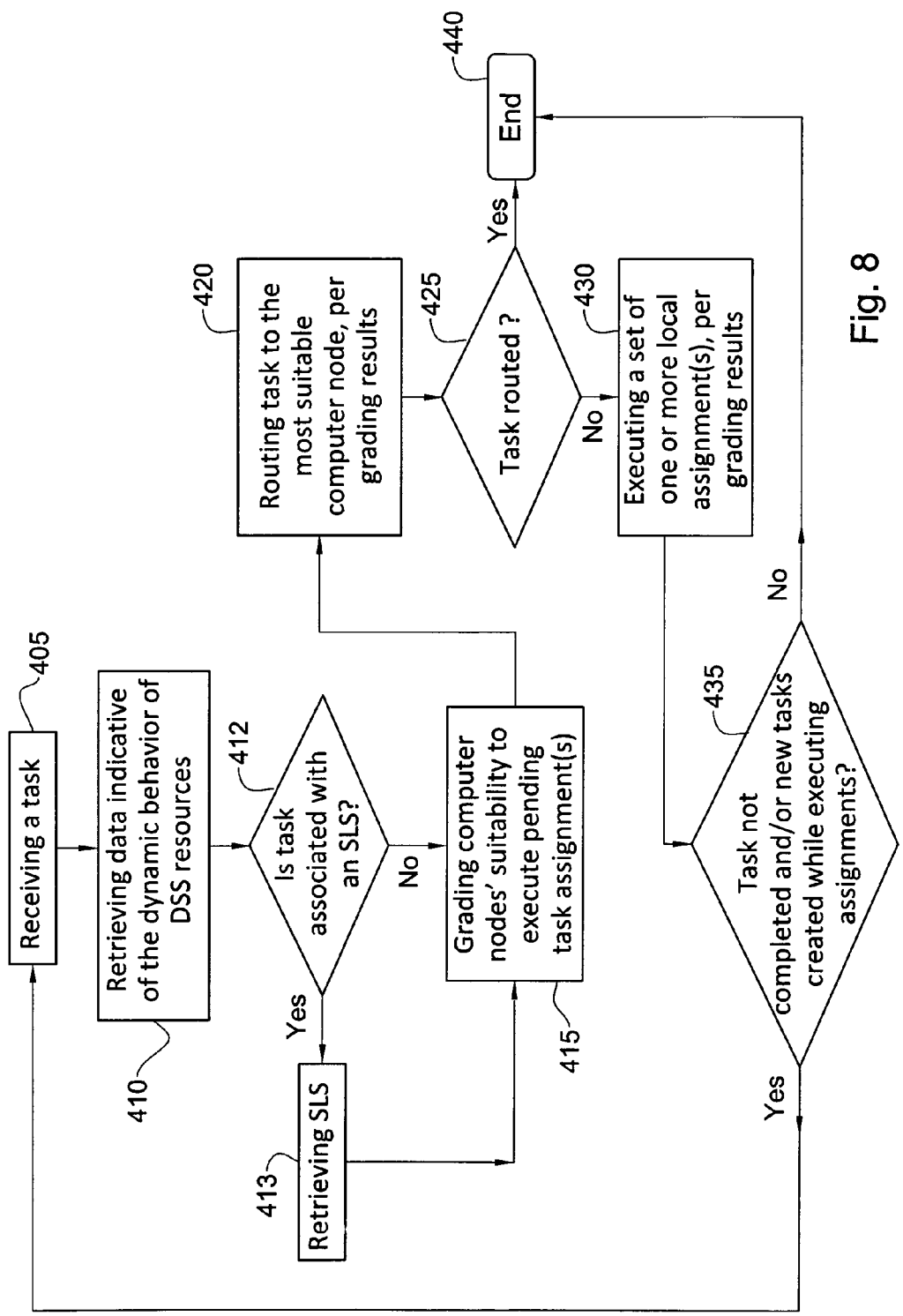
FIG. 8 is a flowchart illustrating a sequence of operations carried out for managing a task received by a UDSP agent, according to certain examples of the presently disclosed subject matter.

According to some examples of the presently disclosed subject matter, task management module 335 can be configured to manage a received task, such as a data path operation (e.g. read/write operation), as further detailed, inter alia with respect to FIG. 8.

Multicast module 340 can be configured to propagate (e.g. by unicast/multicast/recast transmission) various notifications to various UDSP agents 220 (e.g. UDSP agents installed on other computer nodes, gateway resources 216, client servers 218, etc.). Such notifications can include, for example, notifications of a resource status change, notifications of addition of a new resource, notifications of disconnection of a resource, notifications of a change in a local parameter, etc. In addition, multicast module 340 can be configured to handle any protocols between various UDSP agents 220 and other entities of the DSS 200 as well as external entities (such as external management systems, etc.).

Figure 9:
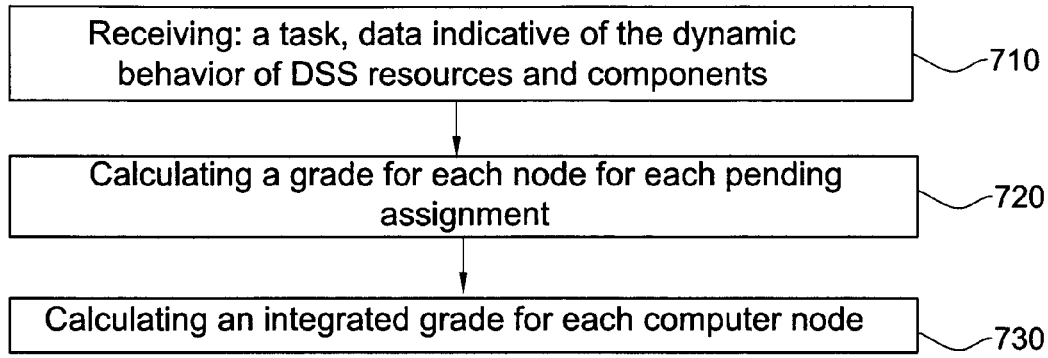
FIG. 9 is a flowchart illustrating a sequence of operations carried out for grading nodes suitability to execute pending task assignments, according to certain examples of the presently disclosed subject matter.

Task creation module 345 can be configured to create a new task for execution in DSS 200, as further detailed inter alia with respect to FIGS. 8 and 9.

Figure 10:
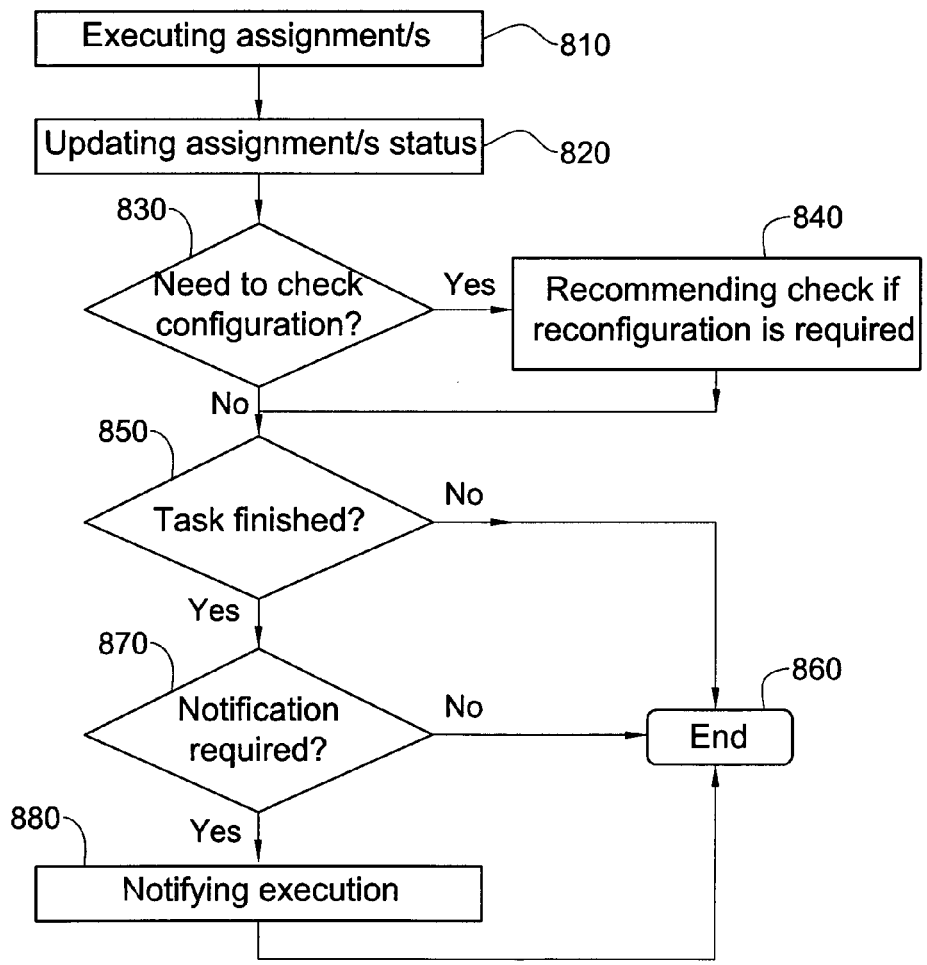
FIG. 10 is a flowchart illustrating a sequence of operations carried out for executing pending assignments on a computer node, according to certain examples of the presently disclosed subject matter

Execution module 350 can be configured to locally execute one or more assignments associated with a received task, as further detailed herein, inter alia with respect to FIG. 10.

Figure 12:
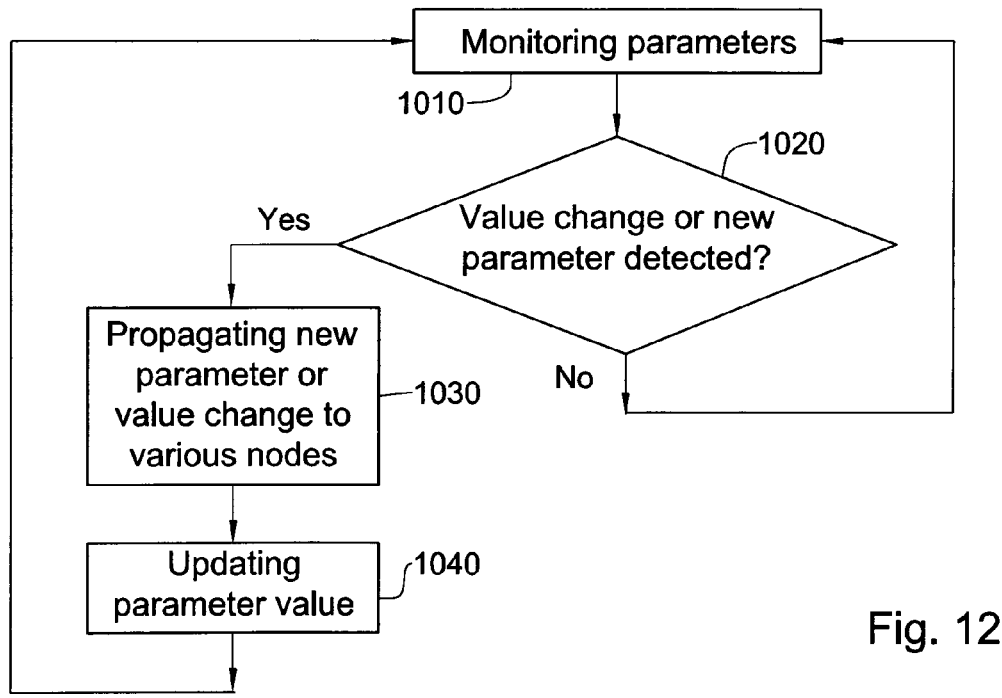
FIG. 12 is a flowchart illustrating a sequence of operations carried out for monitoring local parameters of a computer node and resources connected thereto, according to certain examples of the presently disclosed subject matter.

Local parameters monitoring module 360 can be configured to monitor various local parameters, such as parameters indicative of the dynamic behavior of the computer node 205 and/or any resource connected thereto, and propagate (e.g. while utilizing Multicast module 340) notifications indicative of a change to one or more local parameters, as further detailed, inter alia with respect to FIG. 12. It is to be noted that in some cases local parameters are parameters relating to a specific computer node 205 (or a gateway resource 216 or a client server 218, mutatis mutandis), on which the monitoring is performed, and/or to resources connected thereto.

Figure 15:
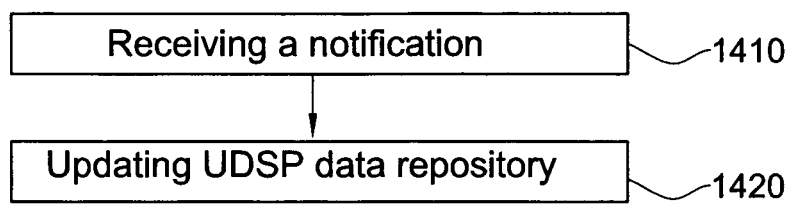
FIG. 15 is a flowchart illustrating a sequence of operations carried out for receiving a notification from a remote computer node and updating a Unified Distributed Storage Platform (UDSP) data repository accordingly, according to certain examples of the presently disclosed subject matter.

Remote nodes parameters monitoring module 370 can be configured to receive notifications indicative of a change in one or more parameters of one or more remote computer nodes 205 and/or resources connected thereto, and update UDSP data repository 330 accordingly, as further detailed, inter alia with respect to FIG. 15. In some cases, remote nodes parameters monitoring module 370 can be configured to register with another computer node 205 (e.g. with a UDSP agent 220 associated with the other computer node 205) to receive selective notifications therefrom. It is to be noted that in some cases, remote nodes parameters monitoring module 370 can be configured to independently and/or actively query a remote computer node 205 for any required information.

Figure 14:
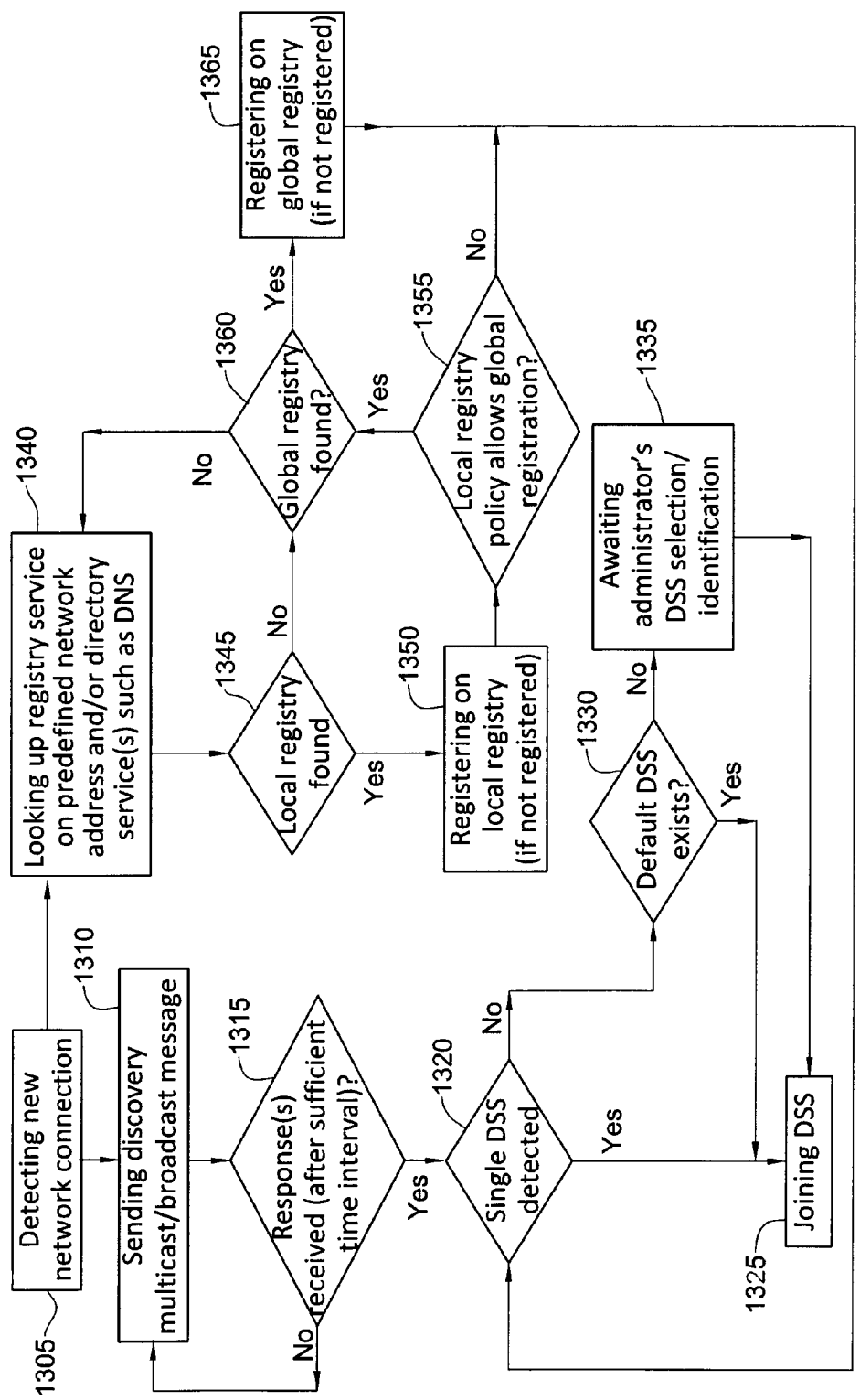
FIG. 14 is a flowchart illustrating a sequence of operations carried out for connecting a new computer node to Distributed Storage System (DSS), according to certain examples of the presently disclosed subject matter.

Cloud plug & play module 380 can be configured to enable autonomous and/or automatic connection of a computer node 205 to DSS 200, as further detailed, inter alia with respect to FIG. 14.

Figure 13:
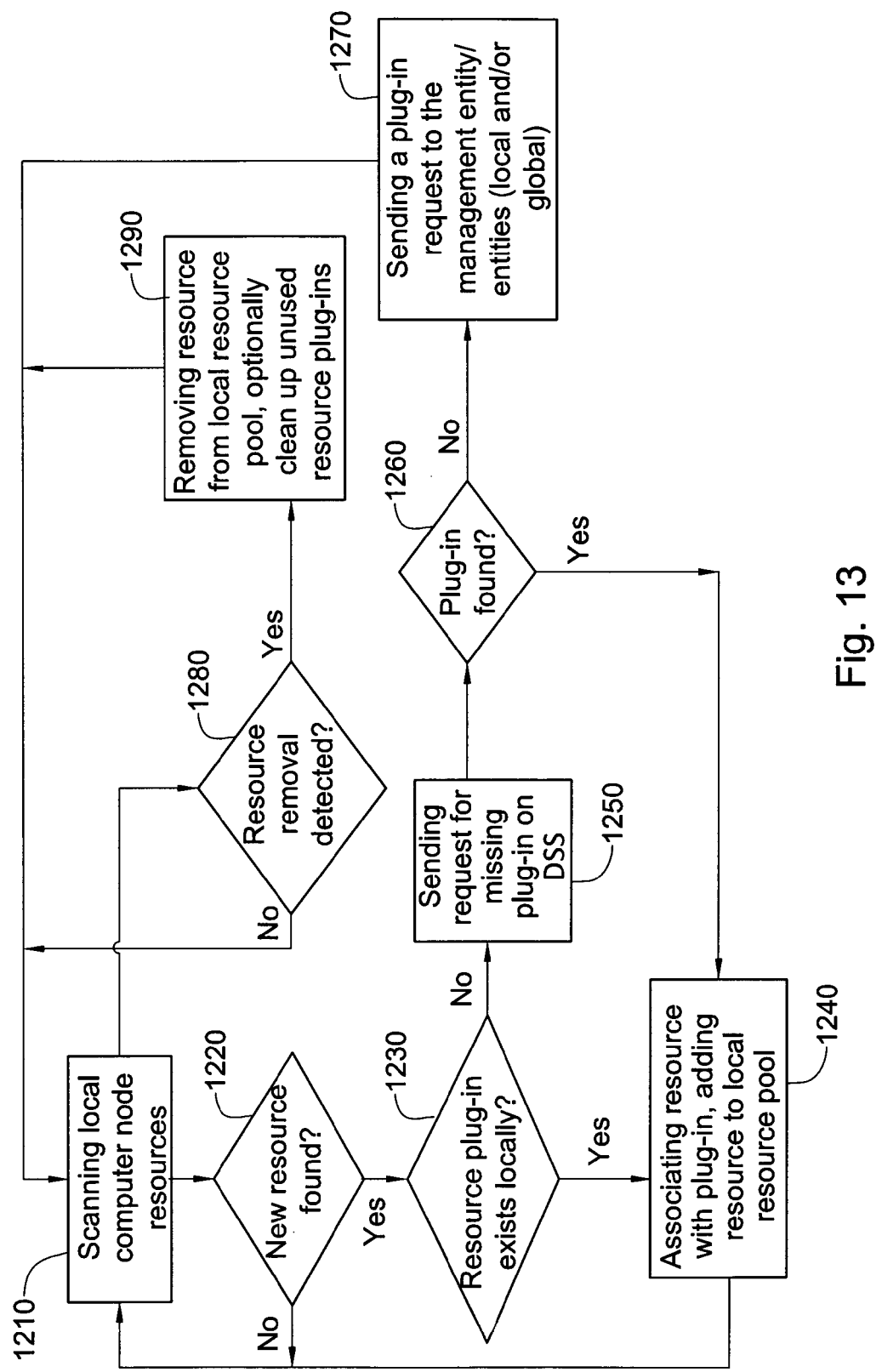
FIG. 13 is a flowchart illustrating a sequence of operations carried out for detecting and managing resources connected to a computer node, according to certain examples of the presently disclosed subject matter.

Resource detection and management module 385 can be configured to detect and manage resources connected to the computer node 205, as further detailed inter alia with respect to FIG. 13.

Objective based configuration module 390 can be configured to configure and/or reconfigure DSS 200 as detailed inter alia with respect to FIGS. 2-4 and 11.

Figure 6:
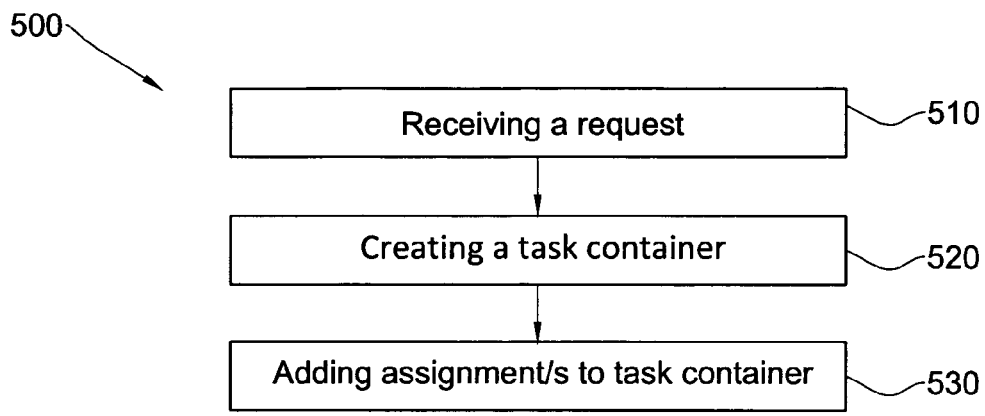
FIG. 6 is a flowchart illustrating a sequence of operations carried out for creating a task, according to certain examples of the presently disclosed subject matter.

Objective based routing module 395 can be configured to route a received task to a computer node 205 as further detailed, inter alia with respect to FIGS. 6 and 8.

Cache management module 397 can be configured, inter alia, to monitor parameters relating to cache resources, and to manage cache resources connected to the computer node (including, inter alia, to perform cache handoffs), as further detailed herein, inter alia with respect to FIGS. 16-22.

It is to be noted that the one or more processing resources 310 can be configured to execute the UDSP agent 220 and any of the modules comprised therein.

It is to be noted that according to some examples of the presently disclosed subject matter, some or all of the UDSP agent 220 modules can be combined and provided as a single module, or, by way of example, at least one of them can be realized in a form of two or more modules. It is to be further noted that in some cases UDSP agents 220 can be additionally or alternatively installed on one or more gateway resources 216 and/or client servers 218, etc. In such cases, partial or modified versions of UDSP agents 220 can be installed on and/or used by the one or more gateway resource 216 and/or client server 218, etc.

Turning to FIG. 6, there is shown a flowchart illustrating a sequence of operations carried out for creating a task, according to certain examples of the presently disclosed subject matter. A task can be generated in order to execute a requested operation received by the DSS 200 (e.g. a read/write operation, a management operation, etc.). In some cases, a task can comprise a list of one or more assignments to be executed as part of the requested operation.

In some cases, task creation module 345 can perform a task creation process 500. For this purpose, in some cases, task creation module 345 can receive a requested operation (block 510) originating for example from a client server 218, a gateway resource 216, a computer node 205, or any other source. The received requested operation can include data indicative of the type of operation (e.g. read, write, management, etc.), and/or any other data relevant to the requested operation (e.g. in a write request, data indicative of the relevant logical storage entity on which the operation is to be performed, a block to be written, etc.).

Task creation module 345 can be configured to create a task container (block 520). The task container can comprise, inter alia, one or more of: data indicative of the requested operation originator (e.g. a network identifier thereof), data indicative of the relevant logical storage entity on which the operation is to be performed, operation specific data (e.g. in case of a block-write operation—the block to write) and an empty assignment list.

In some cases, e.g. when the request is associated with a logical storage entity, task creation module 345 can be configured to retrieve the SLS associated with the logical storage entity, and create one or more assignments to be performed in accordance with the SLS (for example, if the SLS requires data to be encrypted, an encryption assignment can be automatically created, etc.) (block 530).

It is to be noted that the task creation process 500 can be performed by task creation module 345 of UDSP agent 220 associated with computer node 205. However, it is to be noted that additionally and/or alternatively, task creation process 500 can be performed by task creation module 345 of UDSP agent 220 associated with client server 218 and/or gateway resource 216, or any other source having a task creation module 345. Thus, in some cases, computer node 205 can receive one or more tasks that have already been created, e.g. by a client server 218 and/or a gateway resource 216, etc.

It is to be noted that, with reference to FIG. 6, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Figure 7:
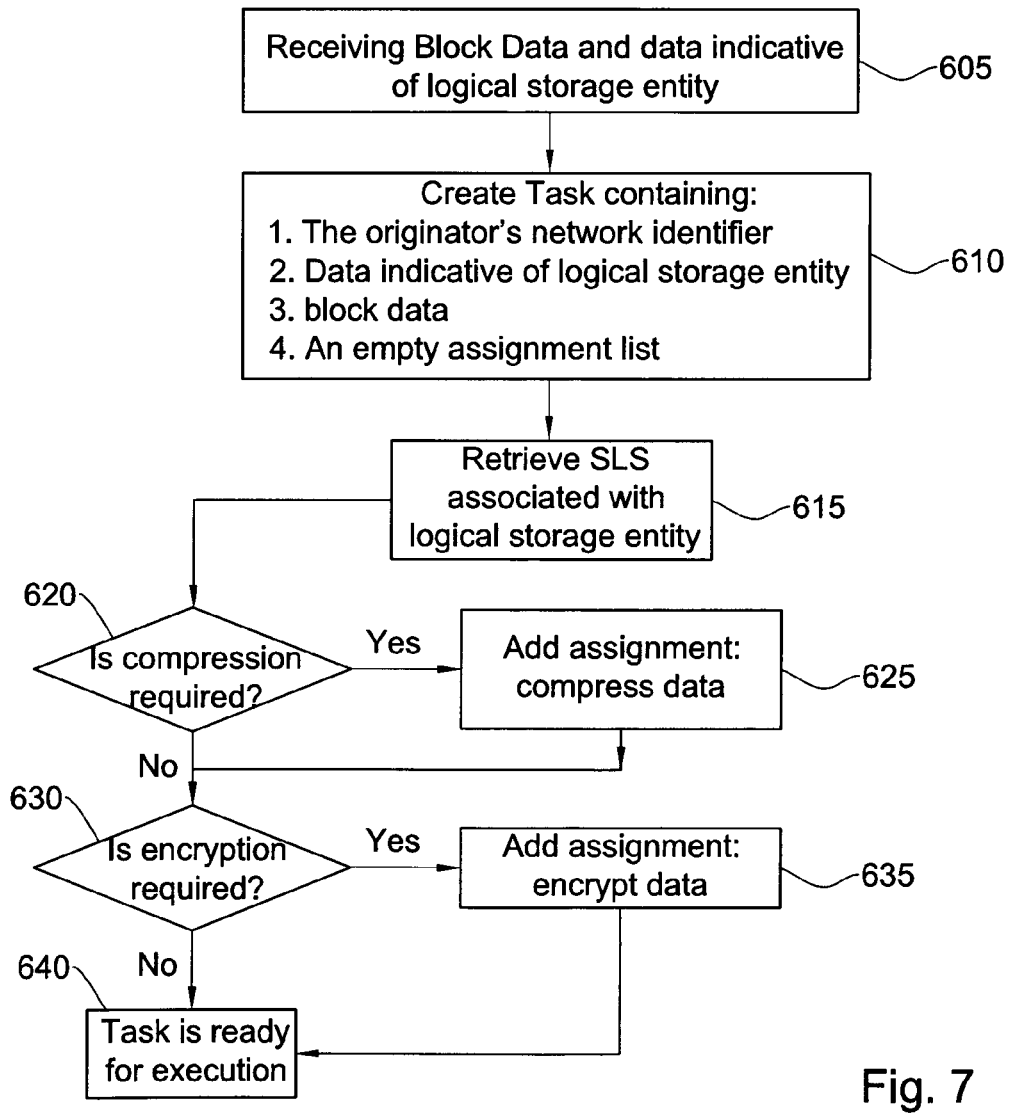
FIG. 7 is a flowchart illustrating a sequence of operations carried out for creating an exemplary storage block-write task, according to certain examples of the presently disclosed subject matter.

In order to better understand the process of a task creation, attention is drawn to FIG. 7, showing a flowchart illustrating a sequence of operations carried out for creating an exemplary storage block-write task, according to certain examples of the presently disclosed subject matter. In the example provided herein, task creation module 345 can receive block data to be written in DSS 200 and data indicative of the relevant logical storage entity on which the block is to be written (block 605).

In some cases, task creation module 345 can be configured to create a new task container. The task container can comprise, inter alia, data indicative of the originator from which the operation originated (e.g. a network identifier thereof), data indicative of the relevant logical storage entity on which the block is to be written, storage block data to be written in the logical storage entity and an empty assignment list (block 610).

In some cases, each task can be assigned with a Generation Number. Such a Generation Number can be a unique sequential (or any other ordered value) identifier that can be used by various plug-ins and resources in order to resolve conflicts and handle out-of-order scenarios. For example, it can be assumed that a first task (FT) is issued before a second conflicting task (ST) and that the ST is received for processing first. In such cases, the execution module 350 can be configured to check if the Generation Number of FT is earlier than that of ST, and in such cases, execution module 350 can be configured not to overwrite the data previously updated according to ST.

Task creation module 345 can also be configured to retrieve the SLS associated with the logical storage entity on which the operation is to be performed (block 615), and introduce relevant assignments to the assignments list associated with the task accordingly. Thus, task creation module 345 can be configured to check if compression is required according to the SLS (block 620), and if so, task creation module 345 can be configured to add the relevant assignment (e.g. compress data) to the assignments list (block 625). Task creation module 345 can be further configured to check if encryption is required according to the SLS (block 630), and if so, task creation module 345 can be configured to add the relevant assignment (e.g. encrypt data) to the assignments list (block 635).

Assuming that these are the only two assignments to be performed according to the SLS, task creation module 345 has successfully created the new task and the new task is ready for execution (block 640).

It is to be noted that, with reference to FIG. 7, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Following the brief explanation about tasks and their creation, attention is drawn to FIG. 8, showing a flowchart illustrating a sequence of operations carried out for managing a task received by a UDSP agent, according to certain examples of the presently disclosed subject matter.

In some cases, task management module 335 of UDSP agent 220 can be configured to receive a task (block 405). It is to be noted that a task can be received from a client server 218 (e.g. directly or through a gateway resource 216 that can act, inter alia, as a protocol converter), from a gateway resource 216, from another computer node 205, from an external entity (e.g. an application, etc.), or from any other source.

Following receipt of a task, task management module 335 can be configured to retrieve all or part of the data indicative of the dynamic behavior of all or part of the DSS 200 resources (e.g. computer nodes and/or storage-related resources, etc.) (block 410).

In some cases, task management module 335 can be configured to check if the task is associated with an SLS (e.g. the task relates to a specific logical storage entity, etc.) (block 412), and if so, retrieve the SLS associated with the logical storage entity associated with the task (e.g. from the UDSP data repository 330 or, if not available in UDSP data repository 330, from another computer node's UDSP data repository, etc.) (block 413).

Task management module 335 can be configured to utilize objective based routing module 395 to grade the suitability of one or more of the DSS 200 computer nodes 205 to execute one or more pending task assignments (block 415).

Pending task assignments are assignments that have no unfulfilled prerequisite prior to execution thereof. For example, a compression assignment can depend on prior execution of a deduplication assignment, an encryption assignment can depend on prior execution of a compression assignment, etc.

The suitability of computer nodes 205 to execute pending task assignments and thus, their grades, can be dependent for example on their resources (e.g. their processing capabilities), including their storage-related resources and/or, in case the task relates to a logical storage entity, on their ability to meet one or more SLS requirements (e.g. having a resource capable of being used for executing one or more of the task assignments in the scope of such a logical storage entity), if such requirements exist, and/or on their dynamic behavior and current state, etc. A more detailed description of the grading process is provided with respect to FIG. 9.

Based on the calculated grades, task management module 335 can be configured to utilize objective based routing module 395 to route the task for example to a more suitable computer node 205, and sometimes to the most suitable computer node, per grading results (e.g. the task can be routed to the computer node 205 having the highest grade) (block 420).

Task management module 335 can be configured to check if the task was routed to another computer node (block 425). If the task was routed to another computer node, then the process relating to the local computer node 205 (e.g. the computer node 205 running the process) ends (block 440). However, if the local computer node 205 is the most suitable one, then one or more of the pending task assignments can be executed on the local computer node 205 (block 430), for example by utilizing UDSP agent's 220 execution module 350.

It is to be noted that in some cases, not all pending task assignments that the local computer node 205 is capable of executing are executed by it, but only the pending task assignments for which it was selected as the most suitable one. Thus, for example, if a task comprises three pending task assignments, two of which can be executed by the local computer node 205, one for which it has the highest grade and one for which it does not have the highest grade—the UDSP agent 220 associated with the local computer node 205 can be configured to execute only the assignment for which the local computer node 205 has the highest grade. It is to be further noted that UDSP agent 220 of the local computer node 205 can in some cases utilize more than one processing resource of the local computer node 205 (if such exists) for parallel and/or concurrent processing of one or more assignments. In some cases, for such parallel and/or concurrent processing of more than one assignment, the local computer node 205 can utilize remote processing resources (e.g. processing resources associated with one or more remote computer nodes 205). A more detailed description of assignment/s execution is provided inter alia with respect to FIG. 10.

Task management module 335 can be further configured to check if additional assignments exist following execution of the assignments on the local computer node 205 and/or if the execution of the assignments on the local computer node 205 triggered creation of one or more new tasks (e.g. a replication assignment can result in generation of multiple write tasks, each destined at a different location) and/or assignments (block 435). If not—the process ends (block 440). If yes—the process returns to block 405, in which the task with the remaining assignments and/or the one or more new tasks are received by the UDSP agent 220 associated with the local computer node 205 and the processes of managing each of the tasks begin.

In some cases, the infrastructure layer can be updated, for example by adding one or more interconnected computer nodes 205 to the infrastructure layer, by removing one or more computer nodes 205 from the infrastructure layer, by modifying one or more existing computer nodes 205 (e.g. adding processing resources 310 and/or other storage related resources thereto, removing processing resources 310 and/or other storage related resources therefrom, etc.) of the infrastructure layer, etc. In some cases such changes to the infrastructure layer can be performed dynamically (e.g. whenever a user desires), including during operation of DSS 200.

Task management module 335 can in some cases be configured to utilize objective based routing module 395 to grade the suitability of one or more of the updated infrastructure layer computer nodes 205 that have been added or modified, to execute one or more pending task assignments of following tasks. In some cases, the updated infrastructure layer can be created during such grading calculation and the calculation can be performed in respect of one or more computer nodes 205 of the updated infrastructure layer. In some cases, the calculation can be performed in respect of one or more additional or modified computer nodes 205 of the updated infrastructure layer.

Task management module 335 can in some cases be configured to execute one or more of said pending assignments of following tasks or route said following tasks to a more suitable computer node 205 (and in some cases to the most suitable computer node 205) of the updated infrastructure layer, based on the calculated grades.

It is to be noted that, with reference to FIG. 8, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

As detailed herein, task management module 335 can be configured to utilize objective based routing module 395 to grade the suitability of one or more of the DSS 200 computer nodes 205 to execute pending task assignments. Attention is drawn to FIG. 9 illustrating a sequence of operations carried out for grading nodes suitability to execute pending task assignments, according to certain examples of the presently disclosed subject matter.

The grading process 700 can begin, for example, by objective based routing module 395 receiving at least one of: a task to be performed, data indicative of the dynamic behavior of all or part of the DSS 200 resources (including the computer nodes and/or the storage-related resources, etc.), or any other data that can be used by the grading process (block 710). In some cases, when the task is associated with a specific logical storage entity, objective based routing module 395 can also receive the SLS associated with the logical storage entity associated with the task.

Objective based routing module 395 can be configured to grade one or more computer nodes 205 suitability to execute each of the pending task assignments (block 720). The grading can be performed, inter alia, based on the received data.

It is to be noted that a grade can be calculated for each computer node 205 connected to DSS 200, or only for some of the computer nodes 205 (e.g. according to the network topology, the geographic distance from the local computer node 205, randomly and/or deterministically selecting computer nodes 205 until a sufficient number of computer nodes 205 suitable to execute one or more pending task assignments are found, etc.). It is to be further noted that various grading algorithms can be used for grading a computer node's 205 suitability to execute pending task assignments. It is to be still further noted that the grading process can contain and/or use heuristics and/or approximations. Additionally or alternatively, the grading can be based on partial and/or not up-to-date information.

In some cases, for each computer node 205 that a grade is to be calculated for, objective based routing module 395 can be configured to check, for each pending task assignment, if the computer node 205 can execute the pending task assignment. In case the task is associated with a logical storage entity, objective based routing module 395 can also check if the computer node 205 can execute the pending task assignment while meeting the requirements defined by the respective SLS. In case the computer node 205 cannot execute the pending task assignment (or cannot meet the requirements defined by the SLS when relevant), the grade for that node will be lower than the grade of a computer node 205 that is capable of executing the pending task assignment (while meeting the requirements defined by the SLS when relevant). In some cases, the grade is calculated also based on parameters data relating to one or more storage-related resources connected to the respective computer node 205 (e.g. data of parameters relating to presence and/or loads and/or availability and/or faults and/or capabilities and/or response time and/or connectivity and/or costs associated with the storage-related resources), and the capability of such storage-related resources to execute the pending task assignment (while meeting the requirements defined by the SLS when relevant).

In an exemplary manner, and for ease of understanding, the grade of a computer node 205 that cannot execute the pending task assignment (while meeting the requirements defined by the SLS, when relevant) is zero, whereas the grade of a computer node 205 that is capable of executing the pending task assignment (while meeting the requirements defined by the SLS when relevant) is greater than zero.

It is to be noted that in some cases, the calculated grades can be represented by non-scalar values, e.g. by multi-dimensional values. It is to be further noted that the calculated grades may not belong to an ordered set. It is to be still further noted that the decision of a suitable node and/or a most suitable node (e.g. the decision which grade is "higher") can be arbitrary (e.g. when the grades do not belong to an ordered set, etc.).

In some cases, if the local computer node 205 suitability to execute the assignment would be identical to that of one or more remote computer nodes 205 if they all had identical communication costs of communicating the task thereto, the local computer node's 205 grade will be higher due to the costs associated with communicating the task to any remote computer node 205.

In some cases, for each computer node 205 that a grade is to be calculated for, objective based routing module 395 can be configured to calculate an integrated grade based on the grades calculated for each pending task assignment (block 730). Such an integrated grade can be, for example, a summary of the computer node's 205 assignments grades, an average of the computer node's 205 assignments grades, or any other calculation based on the calculated computer node's 205 assignments grades.

It is to be noted that, with reference to FIG. 9, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Turning to FIG. 10, there is shown an illustration of a sequence of operations carried out for executing pending task assignments on a computer node, according to certain examples of the presently disclosed subject matter.

As detailed herein, task management module 335 can be configured to utilize execution module 350 for performing an assignments execution process 800 for executing one or more of the pending task assignments. In such cases, execution module 350 can be configured to execute one or more pending task assignments (block 810).

As indicated herein, it is to be noted that in some cases, not all pending task assignments that the local computer node 205 is capable of executing are executed by it, but only the pending task assignments for which it was selected. In addition, it is to be further noted that UDSP agent 220 associated with the local computer node 205 can in some cases utilize more than one processing resource (if such exists) for parallel and/or concurrent processing of one or more assignments. In some cases, for such parallel and/or concurrent processing of more than one assignment, the local computer node 205 can utilize remote processing resources (e.g. processing resources associated with one or more remote computer nodes 205).

Following execution of the one or more pending task assignments, execution module 335 can be configured to update the statuses of the executed assignments to indicate that the assignments have been executed (block 820).

In some cases assignments can be partially executed or their execution can fail. In such cases, execution module 335 can be configured to update the assignment status with relevant indications. In some cases the statuses can also contain data of the execution results.

In some cases, execution module 335 can be configured to check if there is a need to check the current DSS 200 configuration (including, inter alia, the resources availability and allocation) (block 830). Such a need can exist, for example, in case the execution of one or more of the executed assignments that is associated with a logical storage entity did not meet (or came close to not meeting, e.g. according to pre-defined thresholds, etc.) the respective SLS requirements and/or if one or more assignments execution failed and/or if execution of an assignment results in change of data of parameters relating to computer nodes 205 and/or to resources connected thereto that exceeds a pre-defined or calculated threshold (such as shortage of storage space or any other resource, etc.) and/or for any other reason.

In case there is a need to check the current configuration of DSS 200, execution module 335 can be configured to recommend UDSP agents 220 associated with one or more computer nodes 205 to check if a reconfiguration is required (block 840). It is to be noted that in some cases the recommendation can be handled by objective based configuration module 390 of the UDSP agent 220 associated with the computer node 205 on which the one or more assignments are executed. In other cases, the recommendation can be sent to UDSP agents 220 associated with one or more computer nodes 205 that can be responsible for performing the reconfiguration process (e.g. dedicated computer nodes). A further explanation regarding the reconfiguration check is provided herein, inter alia with respect to FIG. 11.

In case there is no need to check the current configuration of DSS 200 or following the recommendation to check if a reconfiguration is required, execution module 335 can be configured to check if following execution of the one or more pending task assignments the task is finished (e.g. all of the assignments associated with the task have been executed) (block 850).

In case the task is not finished the process ends (block 860). If the task is finished, execution module 335 can be configured to check if any notification indicating that the task is finished is required (e.g. a notification to the task originator, etc.) (block 870). If no notification is required, the process ends (block 860). If a notification is required, execution module 335 can be configured to issue a notification of the task execution as required (block 880) and the process ends (block 860).

According to some examples of the presently disclosed subject matter, for each required notification a dedicated assignment of sending the required notification can be created, e.g. during the task creation process described herein. In such cases, optionally, blocks 850-880 can be disregarded.

It is to be noted that, with reference to FIG. 10, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Figure 11:
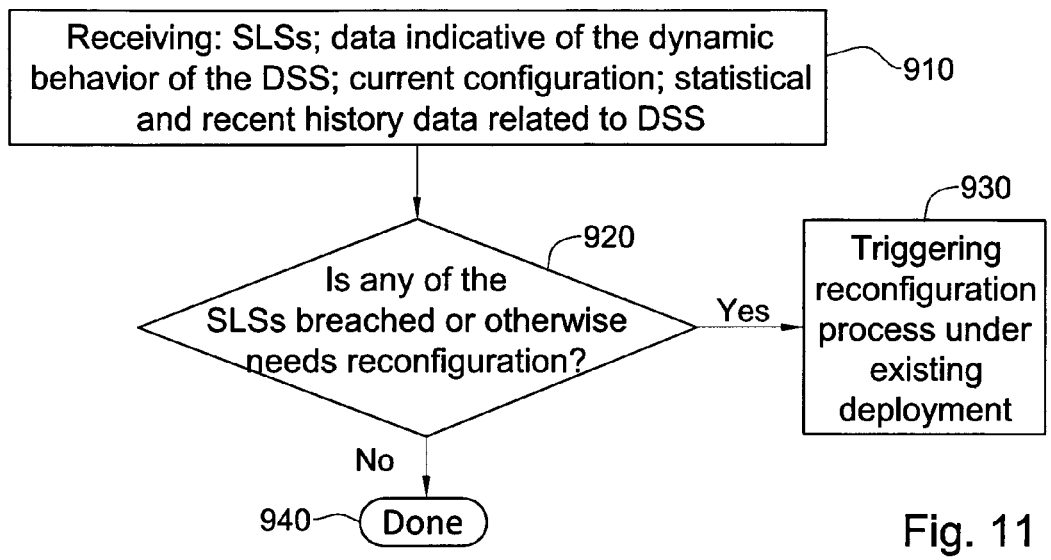
FIG. 11 is a flowchart illustrating a sequence of operations carried out for managing reconfigurations of Distributed Storage System (DSS), according to certain examples of the presently disclosed subject matter.

Attention is now drawn to FIG. 11, illustrating a sequence of operations carried out for managing reconfigurations of DSS, according to certain examples of the presently disclosed subject matter.

According to some examples of the presently disclosed subject matter, in some cases, a reconfiguration process 900 checking if a reconfiguration of DSS 200 is required can be performed. In some cases, such a check can be performed periodically (e.g. according to a pre-defined time interval, for example, every minute, every five minutes, every hour, or any other pre-defined time interval), continuously (e.g. in a repeating loop, etc.), following a triggering event (e.g. a monitored parameter exceeds a pre-defined or calculated threshold, receipt of a recommendation from a UDSP agent 220 associated with a computer node 205, as detailed inter alia with respect to FIG. 10, etc.), etc.

As indicated herein, in some cases, each UDSP agent 220 associated with a computer node 205 can be configured to perform the reconfiguration process 900, e.g. while utilizing objective based configuration module 390. In some cases, UDSP agents 220 associated with one or more computer nodes 205 (e.g. dedicated computer nodes) can be responsible for performing the reconfiguration process 900, e.g. while utilizing objective based configuration module 390.

In some cases, objective based configuration module 390 can be configured to receive any one of, or any combination of, SLSs associated with one or more logical storage entities in DSS 200, data indicative of the dynamic behavior of the DSS 200 and its resources and environment, data indicative of the current configurations of DSS 200, statistical data and historical data related to DSS 200, etc. (block 910). It is to be noted that in some cases all or part of the data can additionally or alternatively be retrieved from the UDSP data repository 330 associated with computer node 205 on which the reconfiguration process 900 is performed.

In some cases, objective based configuration module 390 can be configured to utilize the received data for checking if any of the SLSs are breached (or close to be breached, e.g. according to pre-defined thresholds, etc.) and/or if there is any other reason (e.g. failure to perform one or more assignments irrespective of an SLS, etc.) for performing a reconfiguration of the DSS 200 (block 920).

It is to be noted that whereas in some cases, every time an SLS is breached (it should be noted that breach of an SLS can sometimes include nearing such a breach, e.g. according to pre-defined thresholds, etc.) a reconfiguration of DSS 200 can be initiated, in other cases such reconfiguration of DSS 200 can be initiated depending on meeting some pre-defined criteria. Such criteria can be, for example, a pre-defined number of detected SLS breaches required is to be met, either within a pre-defined time frame or irrespective of the time, etc. Thus, for example, exemplary criteria can be detection of three SLS breaches, or detection of three SLS breaches within one day, etc. In some cases, the importance of a breach can additionally or alternatively be considered as a criterion. For this purpose, objective based configuration module 390 can be configured to utilize the statistical data and historical data related to DSS 200.

In case there is a need to reconfigure DSS 200, objective based configuration module 390 can be configured to activate the Objective Based Management System (OBMS) 100 for performing a DSS 200 configuration process, as detailed above, inter alia with respect to FIGS. 2-4 (block 930). It is to be noted, as indicated herein, that in cases of reconfiguration of DSS 200, OBMS 100 can receive the current configurations of DSS 200 as part of the inputs for the configuration process and take it into consideration when reconfiguring DSS 200. In some cases, during such reconfiguration, OBMS 100 can be configured to reserve and/or allocate and/or reallocate and/or free all or part of the resources.

If no SLS is breached (or is close to be breached) and there is no other reason for performing a reconfiguration, or following initiation of a reconfiguration of DSS 200, reconfiguration process 900 ends (block 940).

It is to be noted that, with reference to FIG. 11, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 12, illustrating a sequence of operations carried out for monitoring local parameters of a computer node and resources connected thereto, according to certain examples of the presently disclosed subject matter.

In some cases, local parameters monitoring module 360 can be configured to monitor various parameters of a computer node 205 and/or storage-related resources connected thereto (block 1010). As indicated herein, the monitored parameters can be any parameters indicative of presence and/or loads and/or availability and/or faults and/or capabilities and/or response time and/or connectivity and/or costs (e.g. costs of network links, different types of data storage resources) and/or any other parameters indicative of the dynamic behavior of the computer node 205 and/or any storage-related resource connected thereto and/or any other data relating to the computer node 205 and/or to one or more of the storage-related resources connected thereto. In some cases, local parameters monitoring module 360 can be configured to monitor various parameters of a client server 218 and/or a gateway resource 216, mutatis mutandis.

It is to be noted that such monitoring can be performed periodically (e.g. according to a pre-defined time interval, for example, every minute, every five minutes, every hour, or any other pre-defined time interval), continuously (e.g. in a repeating loop, etc.), following a triggering event (e.g. connection of a new resource to the computer node 205, etc.), etc.

In some cases, local parameters monitoring module 360 can be configured to check if a new parameter or a change in the value of any of the monitored parameters was detected (block 1020). If not, local parameters monitoring module 360 can be configured to continue monitoring parameters. If, however, a new parameter or a change in the value of any of the monitored parameters has been detected, local parameters monitoring module 360 can be configured to propagate (e.g. while utilizing multicast module 340) notifications indicative of a change to one or more local parameters. In some cases, such notifications can be sent to one or more computer nodes 205 and/or client servers 218 and/or gateway resources 216 (e.g. by unicast/multicast/recast transmission) (block 1030).

It is to be noted that in some cases, local parameters monitoring module 360 can be configured to send various types of notifications that can comprise various indications (e.g. indications of various groups of one or more local parameters, etc.) in various pre-determined time periods or in response to various triggering events. It is to be further noted that some notifications can be selectively sent, for example to one or more computer nodes 205 that registered to receive such notifications.

In some cases, local parameters monitoring module 360 can be configured to update the parameter value, and in some cases additionally or alternatively, derivatives thereof (e.g. various statistical data related to the parameter) in UDSP data repository 330 (block 1040).

In some cases, local parameters monitoring module 360 can be configured to check if there is a need to check the current DSS 200 configuration. Such a need can exist, for example, in case one of the monitored parameters exceeded a pre-defined or calculated threshold associated therewith and/or for any other reason.

In case there is a need to check the current configuration of DSS 200, local parameters monitoring module 360 can be configured to recommend UDSP agents 220 associated with one or more computer nodes 205 to check if a reconfiguration is required. It is to be noted that in some cases the recommendation can be handled by objective based configuration module 390 of the UDSP agent 220 associated with the local computer node 205 on which the local parameters monitoring module 360 is running. In other cases, the recommendation can be sent to UDSP agents 220 associated with one or more computer nodes 205 that can be responsible for performing the reconfiguration process (e.g. dedicated computer nodes). A further explanation regarding the reconfiguration check is provided herein, inter alia with respect to FIG. 11.

It is to be noted that, with reference to FIG. 12, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 13, illustrating a sequence of operations carried out for detecting and managing resources connected to a computer node, according to certain examples of the presently disclosed subject matter.

In some cases, resource detection and management module 385 can be configured to perform a detection and management process 1200. In some cases resource detection and management module 385 can be configured to scan for storage-related resources connected to one or more computer nodes 205 (block 1210). In some cases, resource detection and management module 385 can be configured to perform the scan continuously and/or periodically (e.g. every predetermined time period, for example every minute, every five minutes, every hour, etc.), etc. In some case, the scan can be initiated by a user (e.g. a system administrator, etc.).

Resource detection and management module 385 can be configured to check if any new storage-related resource is found (block 1220). If no new storage-related resource is found, resource detection and management module 385 can be configured to continue scanning for storage-related resources. If one or more new storage-related resources are found, storage-related resource detection and management module 385 can be configured to check if there is a need in one or more plug-ins for using such a storage-related resource and if so whether the plug-ins exist locally (e.g. on the computer node 205 to which the new resource is attached/connected) (block 1230).

If there is a need for one or more plug-ins and they all exist locally, resource detection and management module 385 can be configured to associate the plug-ins with the new storage-related resource and the storage-related resource can be added to the local resource pool (block 1240).

If there is a need for one or more plug-ins that do not exist locally, resource detection and management module 385 can be configured to check if the one or more missing plug-ins exist, for example on one or more computer nodes 205 and/or client servers 218 and/or gateway resources 216 (e.g. while utilizing multicast module 340) and/or in a shared virtual software extensions library as detailed herein (block 1250) and/or on any other location on DSS 200, and/or on any auxiliary entity.

If resource detection and management module 385 found the required plug-ins, resource detection and management module 385 can be configured to associate the plug-ins with the new storage-related resource and the storage-related resource can be added to the local resource pool (block 1240).

In some cases, if resource detection and management module 385 did not find the required plug-ins, resource detection and management module 385 can be configured to issue one or more plug-in requests. Such plug-in requests can in some cases be sent to a user (block 1270), thus enabling such a user to add the relevant plug-ins to DSS 200 (e.g. after purchasing it, downloading it from the Internet, etc.). Following sending such a request, resource detection and management module 385 can be configured to continue scanning for storage-related resources (block 1210).

It is to be noted that in some cases, until the required plug-ins are found, retrieved (if required) and installed, the new storage-related resource can be marked as a new storage-related resource that is identified every time a scan for storage-related resources is performed and thus, the process detailed herein repeats until the required plug-ins are found.

In some cases, resource detection and management module 385 can be additionally or alternatively configured to check if a storage-related resource removal is detected following the scan for storage-related resources (block 1280). In such cases, if a storage-related resource removal is detected, resource detection and management module 385 can be configured to remove the storage-related resource from the local resource pool and, optionally, clean up any plug-ins that are no longer required (e.g. in light of the fact that the resource that utilized such plug-ins is removed) (block 1290).

It is to be noted that in some cases, resource detection and management module 385 can be additionally or alternatively configured to perform the detection and management process 1200 for storage-related resources connected/disconnected to/from one or more client servers 218 and/or gateway resources 216, mutatis mutandis. It is to be further noted that utilization of the resource detection and management module 385 can enable seamless addition and/or removal and/or attachment and/or detachment of storage-related resources to computer nodes 205 and/or to client servers 218 and/or gateway resources 216 (e.g. "plug and play"), including during operation of DSS 200, and in some cases without performing any management action by a user (including, inter alia, any preliminary management action).

It is to be further noted that in some cases, addition and/or removal of storage-related resources to/from the local resource pool can result in changes to the monitored local parameters of a computer node 205 (e.g. addition and/or removal and/or update and/or any other change of various local parameters). As indicated herein, when new parameters are detected, in some cases, appropriate notifications can be sent by local parameters monitoring module 360, as detailed herein inter alia with respect to FIG. 12. It is to be noted that in some cases such notifications can trigger reconfiguration.

It is to be noted that, with reference to FIG. 13, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 14, illustrating a sequence of operations carried out for connecting a new computer node to Distributed Storage System (DSS), according to certain examples of the presently disclosed subject matter.

In some cases, when a new computer node 205, comprising a UDSP agent 220 connects to a network, cloud plug and play module 380 of the new computer node 205 can be configured to detect a new network connection and/or a change to an existing network connection (e.g. that the computer node 205 on which cloud plug and play module 380 is connected to a new or to a different network) (block 1305). Following detection of a new network connection, cloud plug and play module 380 can be configured to send (e.g. by unicast/multicast/recast transmission) a discovery message, for example by utilizing multicast module 340 (block 1310). Such discovery message can trigger any receiving computer node 205 to respond, e.g. by sending a response including at least a DSS 200 identifier (each DSS 200 can have a unique identifier that enables identification thereof).

Cloud plug and play module 380 can be configured to listen for any response received within a pre-determined time interval (e.g. a time interval that can enable the receiving computer nodes 205 to respond to the discovery message) and check if any response was received (block 1315). If no response was received, and computer node 205 did not join a DSS 200, cloud plug and play module 380 can be configured to repeat block 1310 and resend a discovery message.

If a response was received, cloud plug and play module 380 can be configured to check if the responses refer to a single DSS 200 (e.g. according to the received DSS 200 identifiers) (block 1320). If so, cloud plug and play module 380 can be configured to join computer node 205 to the detected DSS 200 (block 1325). It is to be noted that as a result of joining a DSS 200, computer node 205 can automatically begin sending and receiving various notifications, as detailed herein.

If more than one DSS 200 is detected (e.g. more than one DSS 200 identifier is received as a response to the discovery message), cloud plug and play module 380 can be configured to check if a default DSS 200 exists (block 1330). For this purpose, in some cases, an indication of a default DSS 200 can be retrieved from a local registry (e.g. a data repository accessible on the local network), from a Domain Name System (e.g. under a pre-defined DNS record, etc.), etc. In some cases an indication of a default DNS 200 can be sent by one of the responding computer nodes 205 whose response can include an indication of the default DSS 200. It is to be noted that other methods and techniques for identifying a default DSS 200 can be used as well.

If such default DSS 200 exists, cloud plug and play module 380 can be configured to join computer node 205 to the default DSS 200 (block 1325). If no default DSS 200 is detected, an indication of the new computer node 205 can be provided to a user for its selection of the DSS 200 to which the new computer node 205 is to join, and cloud plug and play module 380 can be configured to wait for such selection (block 1335). Once a selection is made, cloud plug and play module 380 can be configured to join computer node 205 to the selected DSS 200 (block 1325).

In some cases, upon detection of a new network connection (block 1305), cloud plug and play module 380 can be additionally or alternatively configured to look up a local registry (e.g. a data repository accessible on the local network) and/or a global registry (e.g. a data repository accessible on the Internet) registry service, for example on a pre-defined network address and/or on a directory service (e.g. DNS, Active Directory, etc.) (block 1340). Such registry service can enable inter alia identification of available DSS's 200 and/or a default DSS 200.

Cloud plug and play module 380 can be configured to check if a local registry is found (block 1345), and if so, it can be configured to register on the local registry (if it is not already registered) (block 1355). Such registration can include storing various configuration parameters related to the local computer node 205 in the registry. Cloud plug and play module 380 can be further configured to check if a policy defined by the local registry allows global registration (block 1355). If so, or in case that no local registry is found, cloud plug and play module 380 can be configured to check if a global registry is found (block 1360). If so—cloud plug and play module 380 can be configured to register on the global registry (if it is not already registered) (block 1365). Such registration can include storing various configuration parameters related to the local computer node 205 in the registry.

Following registration on the global registry or in case the policy defined by the local registry does not allow global registration, cloud plug and play module 380 can be configured to jump to block 1320 and continue from there.

It is to be noted that other methods can be used in order to join a new computer node 205 to a DSS 200, both automatically and manually, and the methods provided herein are mere examples.

It is to be noted that utilization of the cloud plug and play module 380 can enable computer nodes 205 to be seamlessly added and/or removed and/or attached and/or detached from the network, at any time, including during operation of DSS 200, and in some cases without performing any management action by a user (including, inter alia, any preliminary management action), provided that a UDSP agent 220 is installed on the computer node 205 (a detailed description of a UDSP agent 220 is provided herein). It is to be further noted that optionally, following addition and/or removal and/or attachment and/or detachment of one or more computer nodes 205 from the network, no user is required for enabling continued operation of the DSS 200.

It is to be noted that, with reference to FIG. 14, some of the blocks can be integrated into a consolidated block or can be broken down to a few blocks and/or other blocks may be added. Furthermore, in some cases, the blocks can be performed in a different order than described herein. It should be also noted that whilst the flow diagrams are described also with reference to the system elements that realizes them, this is by no means binding, and the blocks can be performed by elements other than those described herein.

Attention is now drawn to FIG. 15, illustrating a sequence of operations carried out for receiving a notification from a remote computer node and updating a Unified Distributed Storage Platform (UDSP) data repository accordingly, according to certain examples of the presently disclosed subject matter.

In some cases, remote nodes parameters monitoring module 370 of a UDSP agent 220 of a computer node 205 can be configured to receive various notifications (general notifications and/or notifications originating from a source to which computer node 205 registered in order to receive messages from) originating from other computer nodes 205 and/or client servers 218 and/or gateway resources 216 and/or users, etc. (block 1410).

In some cases, remote nodes parameters monitoring module 370 can be configured to update UDSP data repository 330 accordingly (block 1420).

It is to be noted that such data stored in UDSP data repository 330 can be used in order to locally maintain knowledge of the DSS 200 state (e.g. its dynamic behavior, etc.) or parts thereof which are relevant for the processes carried out by the computer node 205, as detailed herein.

It is to be noted, with reference to FIG. 15, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Having described the DSS 200, there follows a description of a system and method for managing cache resources in a DSS 200. As indicated herein, infrastructure layer 201 can comprise one or more, and in some cases two or more, computer nodes 205. Infrastructure layer 201 can further comprise one or more cache resources 212 and/or resources that can be used as cache resources (e.g. RAM, DRAM, SSD 213, etc.). Each cache resource 212 and/or resource that can be used as a cache resource can be connected to one or more computer nodes 205 (e.g. directly, by a network, etc.). As further indicated above, each computer node 205 can have a UDSP agent 220 installed thereon (or otherwise associated therewith).

As indicated herein, UDSP agent 220 can comprise a cache management module 397. The cache management module 397 can be configured to handle various cache related operations, inter alia over one or more cache resources on which standard and/or dedicated caching algorithms, methods and techniques are operating. The cache management module 397 can be configured to manage the cache mappings of the object spaces stored on the one or more cache resources connected to one or more computer nodes 205 connected to DSS 200.

Figure 16:
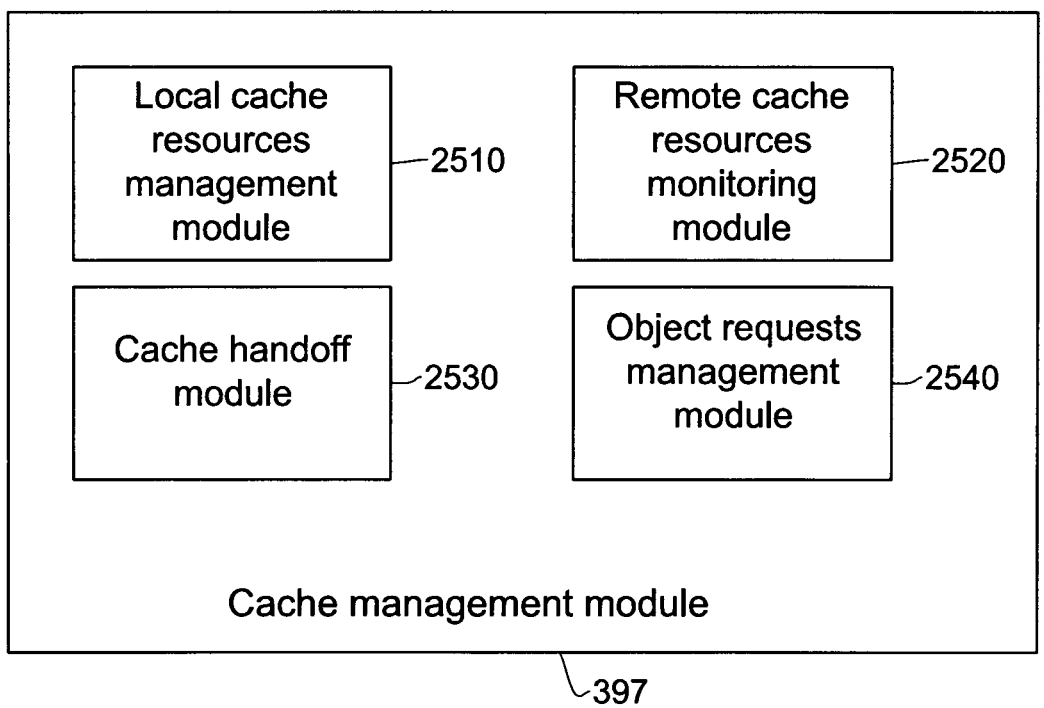
FIG. 16 is a block diagram schematically illustrating a cache management module, according to certain examples of the presently disclosed subject matter.

FIG. 16 is a block diagram schematically illustrating cache management module, according to certain examples of the presently disclosed subject matter.

According to some examples of the presently disclosed subject matter, cache management module 397 can comprise one or more of the following modules: Local cache resources management module 2510, Remote cache resources monitoring module 2520, cache handoff module 2530 and object requests management module 2540.

Figure 17:
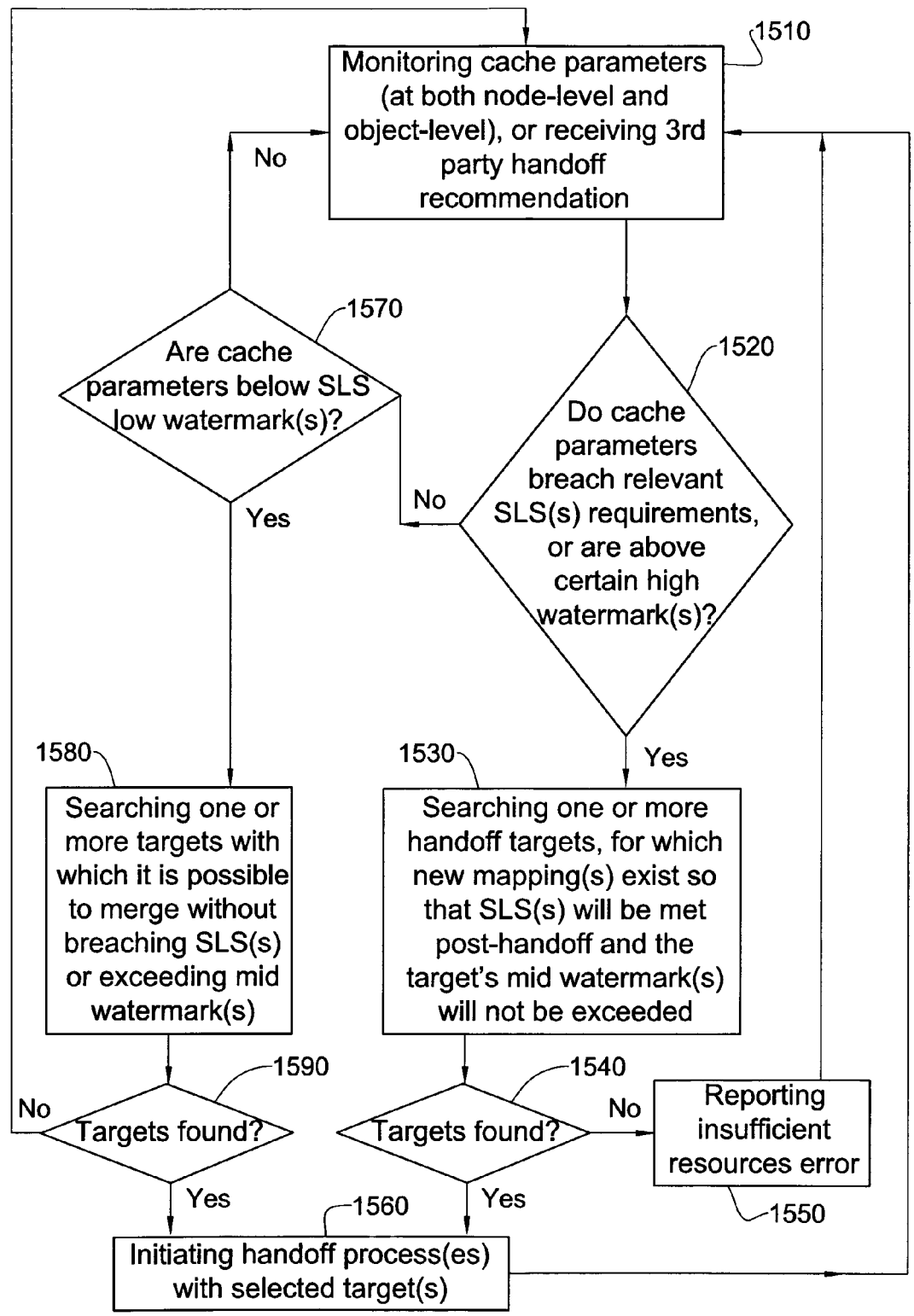
FIG. 17 is a flowchart illustrating a sequence of operations carried out for managing local cache resources of a computer node, according to certain examples of the presently disclosed subject matter.

Local cache resources management module 2510 can be configured to manage local cache resources of a computer node 205, as further detailed herein, inter alia with respect to FIG. 17.

Figure 18:
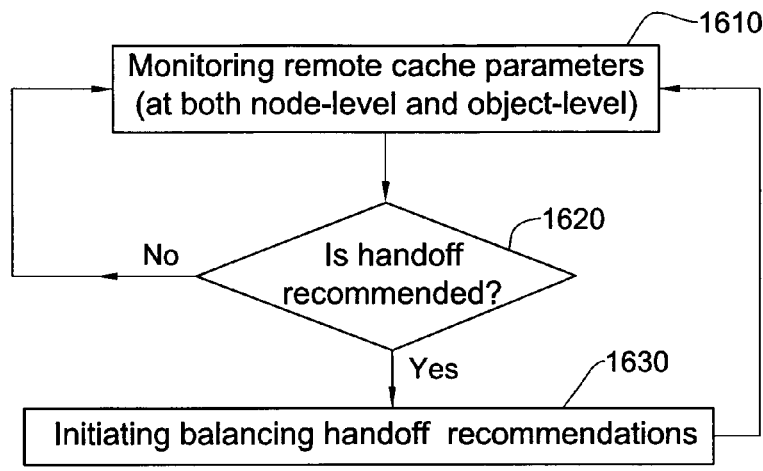
FIG. 18 is a flowchart illustrating a sequence of operations carried out for managing remote cache resources of remote computer nodes, according to certain examples of the presently disclosed subject matter.

Remote cache resources monitoring module 2520 can be configured to monitor remote cache resources of remote computer nodes 205 and issue handoff recommendations and/or instructions accordingly, as further detailed herein, inter alia with respect to FIG. 18.

Figure 20:
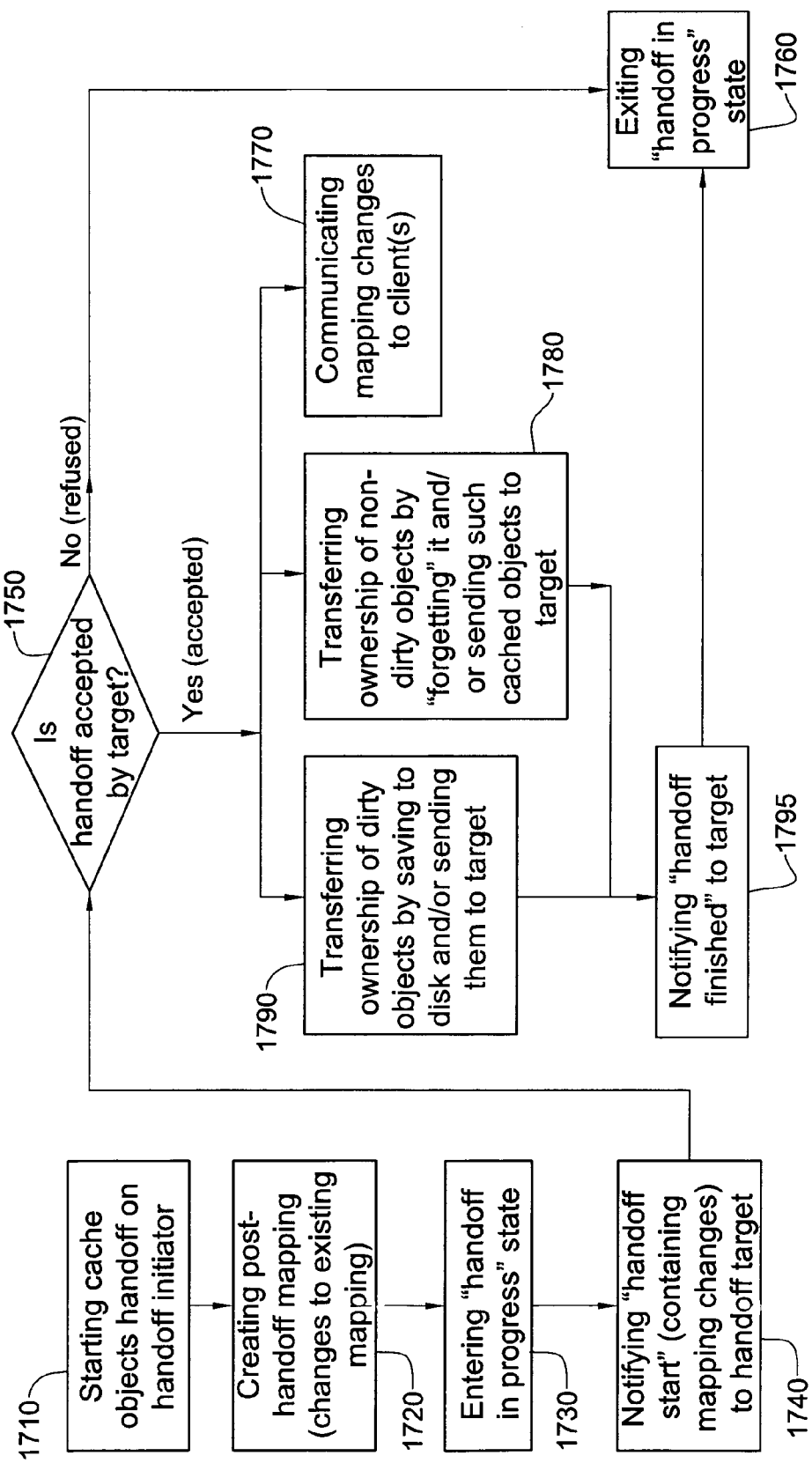
FIG. 20 is a flowchart illustrating a sequence of operations carried out for performing a cache handoff by a handoff initiator, according to certain examples of the presently disclosed subject matter.
Figure 21:
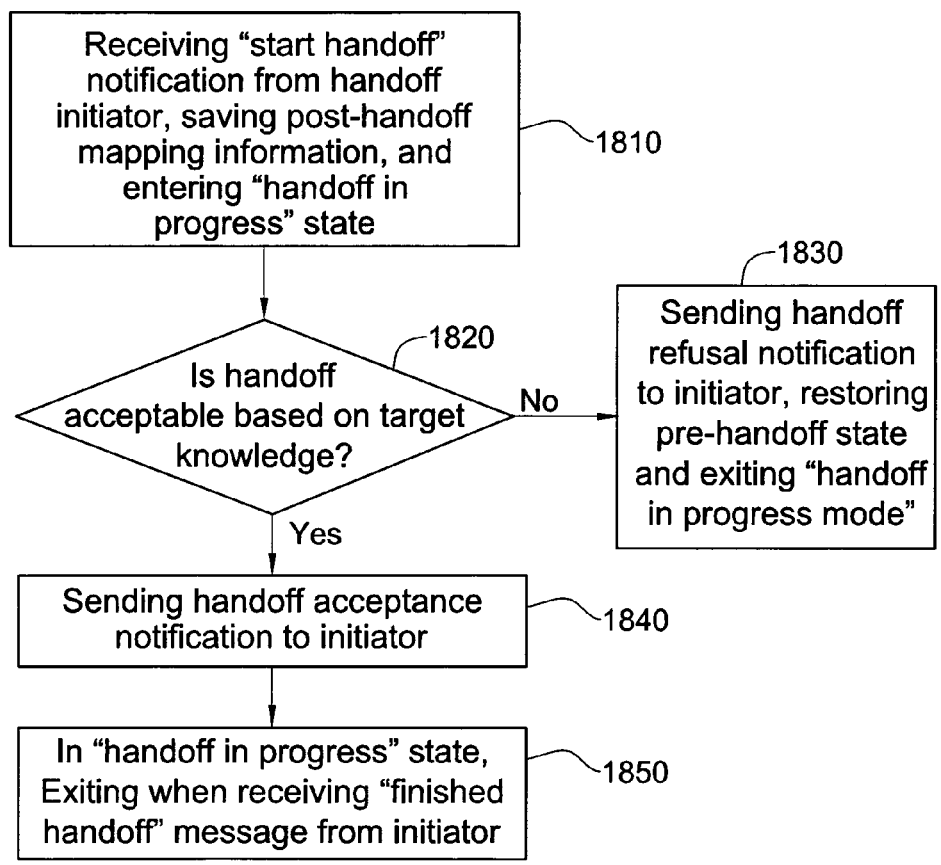
FIG. 21 is a flowchart illustrating a sequence of operations carried out for performing a cache handoff by a handoff target, according to certain examples of the presently disclosed subject matter.

Cache handoff module 2530 can be configured to perform various cache handoff related processes, as further detailed herein, inter alia with respect to FIGS. 20 and 21.

Figure 22:
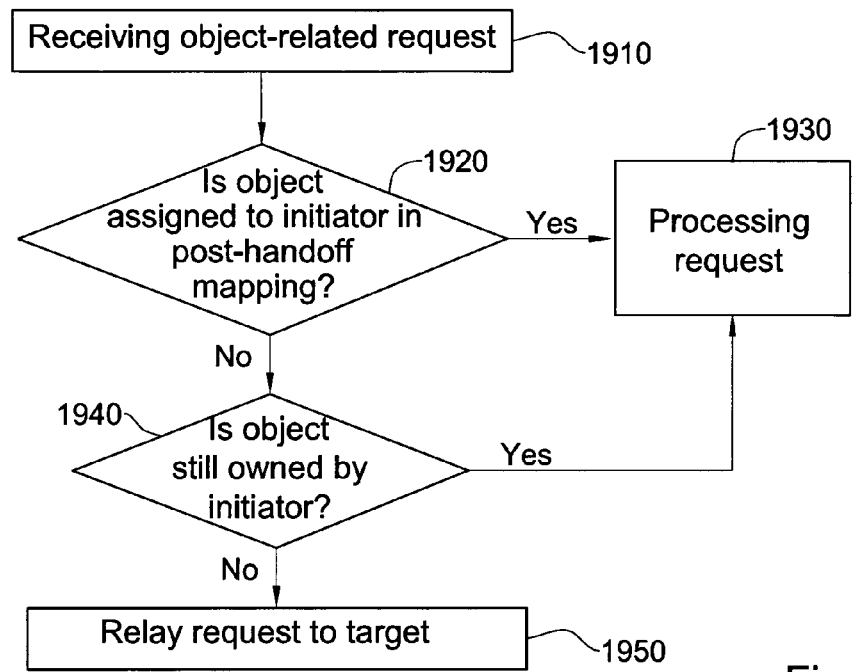
FIG. 22 is a flowchart illustrating a sequence of operations carried out for handling an object related request received by a handoff initiator during handoff, according to certain examples of the presently disclosed subject matter.
Figure 23:
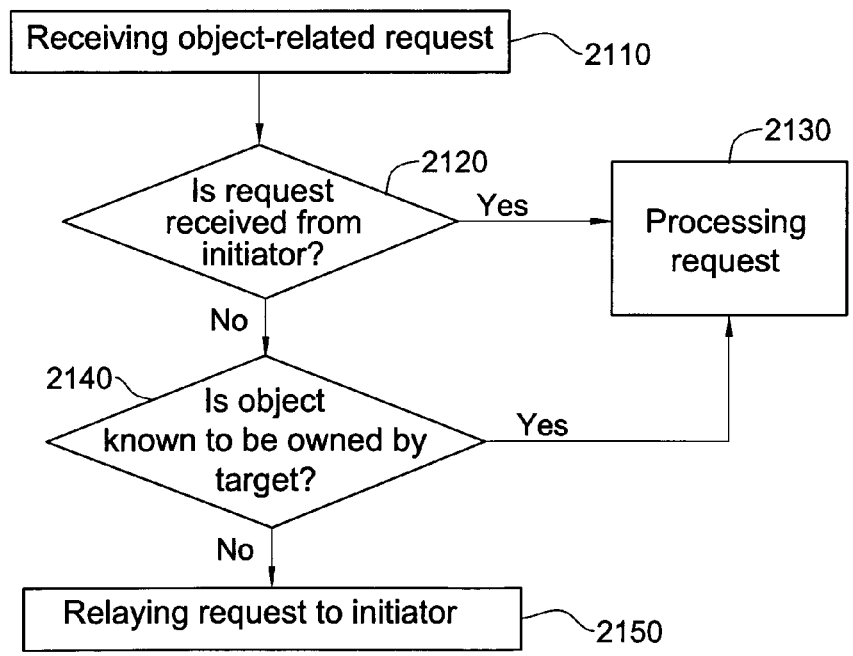
FIG. 23 is a flowchart illustrating a sequence of operations carried out for handling an object related request received by a handoff target during handoff, according to certain examples of the presently disclosed subject matter.

Object requests management module 2540 can be configured to manage object related requests received during handoff, as further detailed herein, inter alia with respect to FIGS. 22 and 23.

It is to be noted that according to some examples of the presently disclosed subject matter, some or all of the cache management module 397 modules can be combined and provided as a single module, or, by way of example, at least one of them can be realized in a form of two or more modules.

Attention is drawn to FIG. 17. FIG. 17 is a flowchart illustrating a sequence of operations carried out for managing local cache resources of a computer node, according to certain examples of the presently disclosed subject matter.

According to some examples of the presently disclosed subject matter, local cache resources management module 2510 can be configured to monitor various cache related parameters, including parameters of the cache resources connected to the computer node 205 (block 1510).

Cache related parameters 205 can include node-level cache related parameters corresponding to computer node 205 and/or resources (including cache resources) connected thereto (e.g. load parameters, performance parameters, presence parameters, availability parameters, faults parameters, capability parameters, response time parameters, connectivity parameters, costs parameters, location parameters, etc.). Cache related parameters can additionally or alternatively include object-level cache related parameters (e.g. location of the cached object, type of media on which the object is cached, etc.) pertaining to the cached objects (e.g. objects cached on the cache resources). Cache related parameters can still additionally or alternatively include external cache related parameters, such as parameters of various entities using the cache (e.g. client servers 218, etc.).

Local cache resources management module 2510 can be still further configured to receive third party recommendations (e.g. a recommendation from a remote computer node 205) to perform cache handoff (as further detailed below, inter alia with respect to FIG. 18). It is to be noted that such third party recommendations can include data of one or more cache related parameters, such data can in some cases include cache related parameters indicative of the reason according to which the third party recommends performing cache handoff. In case of receiving third party recommendations, local cache resources management module 2510 can be configured to determine if such received parameters are preferable (e.g. new and/or more updated parameters are received) over the locally known parameters (e.g. parameters stored on the UDSP data repository 330 associated with computer node 205), and if so—take them into consideration, in addition and/or instead of locally known parameters, in the following blocks.

It is to be noted that such monitoring can be performed periodically (e.g. according to a pre-defined time interval, for example, every minute, every five minutes, every hour, or any other pre-defined time interval), continuously (e.g. in a repeating loop, etc.), following a triggering event (e.g. connection/disconnection of a storage-related resource, including a cache resource, to/from the computer node 205, etc.), etc.

It is to be noted that in some cases, the monitoring of cache related parameters can be performed by local parameters monitoring module 360, as further detailed herein, inter alia with respect to FIG. 12.

In case a change in the value of one or more of the monitored parameters is detected and/or any new parameter is detected and/or any parameter is no longer detected (e.g. a certain cache resource is removed, etc.) and/or periodically (e.g. according to a pre-defined or calculated time interval, for example, every minute, every five minutes, every hour, or any other pre-defined time interval), local cache resources management module 2510 can be configured to check if the monitored parameters indicate a breach of one or more cache related requirements defined by one or more SLSs. Such a check can be performed, for example, by evaluating the monitored parameters in light of the SLSs associated with objects that are currently cached on the cache resource and/or objects that are mapped to the cache resource (using any of the mappings detailed herein), e.g. in light of the SLSs associated with the logical storage entities with which such objects are associated.

Local cache resources management module 2510 can be further configured to determine if the monitored parameters meet one or more First SLS-criteria such as one or more high watermarks (e.g. predefined maximal thresholds, calculated maximal thresholds, etc.), associated with such cache related SLSs, indicating nearing breaching (or breaching) of one or more such SLSs.

Local cache resources management module 2510 can be still further configured to determine if the monitored parameters indicate a breach or nearing such a breach (e.g. according to one or more First SLS-criteria such as one or more high watermarks) of one or more thresholds and/or SLSs that refer to the DSS 200 or parts thereof (e.g. maximal allowed site-level over-commit, maximal allowed overall over-commit, various security parameters, etc.) (block 1520).

It is to be noted that, for these purposes, local cache resources management module 2510 can be configured to retrieve the relevant SLSs from UDSP data repository 330.

If there is an SLS breach or an SLS is nearing being breached or there is breach of one or more parameters that refer to the DSS 200 or parts thereof, local cache resources management module 2510 can be configured to search one or more handoff targets (e.g. another, remote, computer node 205 having one or more cache resources 212, and/or one or more resources that can be used as a cache resource, connected thereto) to which the first, local, computer node 205 (the handoff initiator) is capable of transferring ownership (e.g. responsibility for handling) of one or more cache object spaces, so that all cache-related SLSs, and/or thresholds and/or SLSs that refer to the DSS 200 or parts thereof (e.g. maximal allowed site-level over-commit, maximal allowed overall over-commit, various security parameters, etc.), will be met post transfer (block 1530). Cache-related SLSs are any SLSs containing requirements that refer to, and/or affect, one or more cached objects, and/or one or more computer nodes 205 containing such objects and/or cache resources associated therewith, and/or any entity associated with such computer nodes 205.

It is to be noted that a handoff initiator can be responsible for handling one or more object spaces relating to one or more logical storage entities. A handoff (transfer of ownership) of one or more cache object spaces or portions thereof results in the handoff target receiving ownership of the transferred one or more cache object spaces, or portions thereof.

In some cases, local cache resources management module 2510 can be further configured to search for handoff targets to which the local computer node 205 (handoff initiator) is capable of transferring ownership of one or more cache object spaces, in some cases so that one or more Second SLS-criteria, such as the handoff target's mid watermarks (e.g. predefined middle thresholds, calculated middle thresholds, etc.), associated with one or more of the cache-related SLSs, are met.

Local cache resources management module 2510 can be further configured to check if one or more handoff targets are found (block 1540). If not, in some cases, local cache resources management module 2510 can be configured to report to a user that there are insufficient cache resources (insufficient resources error) and, optionally, recommend to a user, actions to be performed for allowing the cache resources to meet the requirements of the one or more cache-related SLSs (e.g. adding cache resources, etc.).

If one or more handoff targets are found, local cache resources management module 2510 can be configured to initiate a handoff process with one or more of the detected handoff targets (block 1560), as further detailed, inter alia with reference to FIG. 20. In some cases, following initiation of a handoff process, local cache resources management module 2510 can be configured to return to block 1510 and continue monitoring cache parameters.

It is to be noted that in some cases, as a non-limiting example, the selection of the one or more handoff targets can be performed by randomly selecting (or selecting according to any other rule, etc.) one or more of the possible handoff targets that were found in block 1530. As another non-limiting example, the selection of the one or more handoff targets can be performed by operating any type of ranking algorithm to rank the suitability of one or more of the possible handoff targets that were found in block 1530 and selecting the most suitable ones.

In case, following monitoring cache related parameters pertaining to cache resources connected to the local computer node 205, and/or to receipt of third party recommendations to perform cache handoff, there is no SLS breach or no crossing of one or more First SLS-criteria (e.g. a high watermark), local cache resources management module 2510 can be further configured to check if any of the monitored cache related parameters do not meet one or more Third SLS-criteria, such as low watermarks (e.g. predefined minimal thresholds, calculated minimal thresholds, etc.) associated with one or more cache-related SLSs and/or thresholds and/or SLSs that refer to the DSS 200 or parts thereof (e.g. maximal allowed site-level over-commit, maximal allowed overall over-commit, various security parameters, etc.), and, hence, it is considered underutilized (block 1570). If the local computer node's 205 cache resources are not underutilized, local cache resources management module 2510 can be configured to return to block 1510 and continue monitoring cache parameters.

If one or more of the local computer node's 205 cache resources, or parts thereof, are underutilized, local cache resources management module 2510 can be configured to search for one or more handoff targets to which the local computer node 205 is capable of transferring ownership of one or more cache object spaces, so that all cache-related SLSs and/or thresholds and/or SLSs that refer to the DSS 200 or parts thereof (e.g. maximal allowed site-level over-commit, maximal allowed overall over-commit, various security parameters, etc.) will be met post transfer (block 1580). In some cases, local cache resources management module 2510 can be further configured to search for handoff targets to which the local computer node 205 is capable of transferring ownership of one or more cache object spaces, so that the handoff target's Second SLSs criteria, such as mid watermarks (e.g. predefined middle thresholds, calculated middle thresholds, etc.), associated with one or more of the cache-related SLSs, are met.

It is to be noted that in some cases, as a non-limiting example, the selection of the one or more handoff targets can be performed by randomly selecting (or selecting according to any other rule, etc.) one or more of the possible handoff targets that were found in block 1530. As another non-limiting example, the selection of the one or more handoff targets can be performed by operating any type of ranking algorithm (such as algorithms that promote consolidation of cached object mappings, etc.) to rank the suitability of one or more of the possible handoff targets that were found in block 1530 and selecting the most suitable ones.

It is to be noted that such transfer of cached objects can result in releasing cache resources that can be, for example, utilized, if possible, for other purposes, either of the DSS 200 or of any other entity. Such transfer of cached objects can also result in enabling turning off the cache resources if they are entirely released (no more objects are cached thereon and no entity is using it), thus resulting in reduction of power consumption.

Local cache resources management module 2510 can be further configured to check if one or more handoff targets are found (block 1590). If one or more handoff targets are found, local cache resources management module 2510 can be configured to initiate a handoff process with one or more of the detected handoff targets (block 1560), as further detailed, inter alia with reference to FIG. 20.

In some cases, following initiation of a handoff process, local cache resources management module 2510 can be configured to return to block 1510 and continue monitoring cache parameters.

It is to be noted, with reference to FIG. 17, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 18, illustrating a sequence of operations carried out for monitoring remote cache resources of remote computer nodes, according to certain examples of the presently disclosed subject matter.

According to some examples of the presently disclosed subject matter, remote cache resources monitoring module 2520 can be configured to monitor various cache related parameters, including parameters of the cache resources connected to one or more remote computer node 205 (block 1510). Cache related parameters 205 can include node-level cache related parameters of remote computer nodes 205 and/or resources (including cache resources) connected thereto (e.g. load parameters, performance parameters, presence parameters, availability parameters, faults parameters, capability parameters, response time parameters, connectivity parameters, costs parameters, location parameters, etc.). Cache related parameters can additionally or alternatively include object-level cache related parameters (e.g. location of the cached object, type of media on which the object is cached, etc.) pertaining to the cached objects. Cache related parameters can still additionally or alternatively include external cache related parameters, such as parameters of various entities using the cache (e.g. client servers 218, etc.) (block 1610).

For this purpose, remote cache resources monitoring module 2520 can be configured to retrieve relevant cache related parameters from UDSP data repository 330.

Remote cache resources monitoring module 2520 can be configured to utilize such parameters in order to determine if one or more handoff recommendations should be issued (block 1620).

It is to be noted that a handoff recommendation should be issued, for example, if the monitored cache related parameters indicate a breach or are nearing such a breach (e.g. according to one or more First SLS-criteria such as one or more high watermarks) of one or more cache related SLSs (any SLSs containing requirements that refer to, and/or affect, one or more cached objects, and/or one or more computer nodes 205 containing such objects and/or cache resources associated therewith, and/or any entity associated with such computer nodes 205) and/or thresholds and/or SLSs that refer to the DSS 200 or parts thereof (e.g. maximal allowed site-level over-commit, maximal allowed overall over-commit, various security parameters, etc.).

As another example, in some cases, a handoff recommendation should be issued if any of the monitored cache related parameters crossed one or more Third SLS-criteria, such as low watermarks (e.g. predefined minimal thresholds, calculated minimal thresholds, etc.) and, hence, it is considered underutilized, etc.

It is to be noted that, for this purpose, remote cache resources management module 2520 can be configured to retrieve the relevant SLSs from UDSP data repository 330.

If a handoff recommendation should be issued, remote cache resources monitoring module 2520 can be configured to issue such a notification to one or more computer nodes 205 whose monitored parameters indicate an SLS breach, nearing such a breach or underutilization as detailed herein (block 1630).

In some cases, remote cache resources monitoring module 2520 can be configured to additionally or alternatively provide one or more handoff instructions. A handoff recommendation can be refused by a handoff target/initiator whilst a handoff instruction can be a command to perform cache handoff. In some cases such a handoff instruction can be issued to one or more handoff initiators, causing it to search for a handoff target and initiate a handoff therewith. In some cases, such a handoff instruction can be issued to one or more handoff initiators and one or more respective handoff targets with which a handoff can be performed, causing the one or more handoff initiators to initiate a handoff with the respective one or more handoff targets.

It is to be noted, with reference to FIG. 18, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Figure 19:
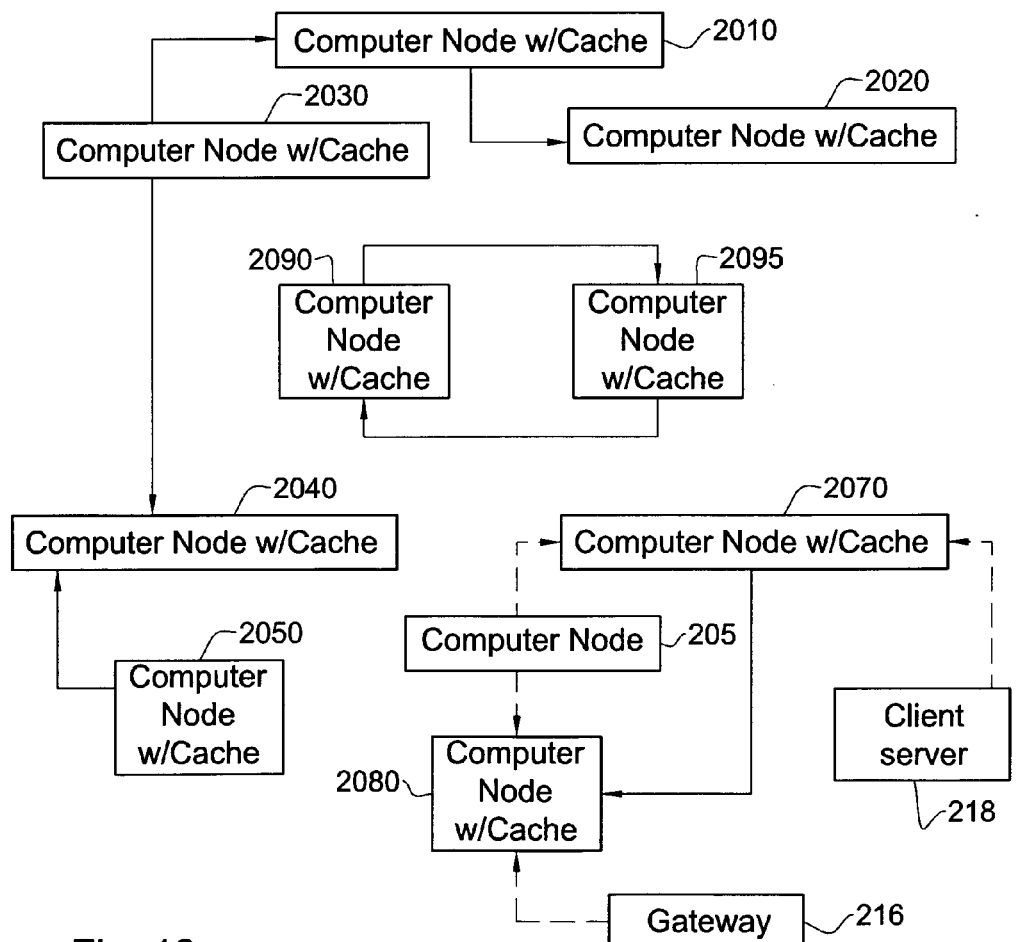
FIG. 19 schematically illustrates various scenarios of distributing cache resources, according to an exemplary embodiment of the invention.

Attention is now drawn to FIG. 19, illustrating various scenarios of distributing cache resources, according to an exemplary embodiment of the invention.

Looking at FIG. 19, it can be appreciated that computer node w/cache 2010 (when reference is made to a computer node w/cache, it refers to a computer node 205 having cache resources connected thereto), can, in some cases, act as a handoff initiator transferring ownership of one or more cache object spaces or parts thereof to computer node w/cache 2020, and as a handoff target receiving ownership of one or more cache object spaces, or parts thereof, for example from computer node w/cache 2030. It is to be noted that in some cases, computer node w/cache 2010 can simultaneously act as a handoff initiator and as a handoff target.

In some cases a certain computer node w/cache, e.g. computer node w/cache 2030 can act as a handoff initiator performing handoff with more than one other handoff targets, e.g. with computer node w/cache 2010 and computer node w/cache 2040, in some cases simultaneously.

In some cases a certain computer node w/cache, e.g. computer node w/cache 2040 can act as a handoff target performing handoff with more than one other handoff initiators, e.g. with computer node w/cache 2030 and computer node w/cache 2050, in some cases simultaneously.

In some cases a certain computer node w/cache, e.g. computer node w/cache 2090 can act as a handoff target performing handoff with a handoff initiator, e.g. with computer node w/cache 2095 and act as a handoff initiator performing handoff with the same handoff initiator, e.g. with computer node w/cache 2095, now acting as a handoff target, in some cases simultaneously. Thus, for example, computer node w/cache 2095 can initiate a handoff with computer node w/cache 2090, while computer node w/cache 2090 can initiate a handoff with computer node w/cache 2095, in some cases simultaneously.

In some cases a certain computer node (with or without cache resources connected thereto), e.g. computer node 205, can be configured to recommend one or more computer nodes w/cache, e.g. computer node w/cache 2080 and computer node w/cache 2070, to initiate one or more handoffs with one or more handoff targets.

In some cases a certain client server, e.g. client server 218, can be configured to recommend one or more computer nodes w/cache, e.g. computer node w/cache 2070, to initiate one or more handoffs with one or more handoff targets.

In some cases a certain gateway resource, e.g. gateway resource 216, can be configured to recommend one or more computer nodes w/cache, e.g. computer node w/cache 2080, to initiate one or more handoffs with one or more handoff targets (such handoffs in which computer node w/cache 2080 is initiating a handoff according to such a recommendation are not shown in the drawing).

In some cases a certain computer node w/cache, e.g. computer node w/cache 2070 and computer node w/cache 2080, can be configured to receive one or more recommendations from one or more computer nodes (with or without cache resources connected thereto) and/or client servers and/or gateway resources, e.g. computer node 205, gateway resource 216, client server 218, to initiate one or more handoffs with one or more handoff targets.

In some cases a certain computer node w/cache, e.g. computer node w/cache 2070, can be configured to receive one or more recommendations from one or more computer nodes (with or without cache resources connected thereto) and/or client servers and/or gateway resources, e.g. computer node 205, client server 218, to initiate one or more handoffs with one or more handoff targets, and act as a handoff initiator transferring ownership of one or more cache object spaces or parts thereof to another computer node w/cache, e.g. computer node w/cache 2080, in some cases simultaneously.

It is to be noted, as any person of ordinary skill in the art can appreciate, that the scenarios exemplified above are mere examples and numerous other scenarios, not presented in the illustration provided in FIG. 19, can exist.

Attention is now drawn to FIG. 20, illustrating a sequence of operations carried out for performing a cache handoff by a handoff initiator, according to certain examples of the presently disclosed subject matter.

According to some examples of the presently disclosed subject matter, cache handoff module 2530 associated with a handoff initiator (a computer node 205 having cache resources connected thereto that is initiating transfer of ownership of one or more cache object spaces, or parts thereof, to another computer node 205 having cache resources connected thereto) can be configured to start handoff of ownership of one or more cache object spaces, or parts thereof (block 1710).

For this purpose, cache handoff module 2530 can be configured to create a new post-handoff cache mapping indicative of the post handoff location of each of the cache object spaces, or parts thereof affected by the handoff process (block 1720).

It is to be noted that each client server 218 (or any other user of DSS 200) can have one or more local cache mappings indicative of one or more computer nodes 205 handling cache object spaces, relating to one or more logical storage entities to which the client server 218 (or any other user of DSS 200) refers. It can be appreciated that cache handoffs require updating of such one or more cache mappings accordingly, as further detailed, inter alia with reference to block 1770.

In some non-limiting examples, such cache mapping can be described by using a hierarchical structure of partitioning functions that reflects, in a compact manner, any partitioning, merge and location changes of the cache object spaces, resulting from handoff processes. Some examples of such partitioning functions are hash functions, splitting odd and even addressed objects, etc. It is to be noted that such cache mapping description manners and such partitioning functions are mere examples and any other known method and/or techniques can be utilized additionally or alternatively.

Cache handoff module 2530 can be further configured to enter a "handoff in progress" state, for example by setting a local flag indicative of such a state (block 1730), and send a "handoff start" notification, including the post-handoff cache mapping, to a handoff target (a computer node 205 having cache resources connected thereto that is selected to receive ownership of one or more cache object spaces or parts thereof, from the handoff initiator) to which the handoff is requested, indicative of its request to initiate a handoff process therewith (block 1740). Cache handoff module 2530 can be further configured to wait (e.g. for a predetermined or calculated time-frame, etc.) for a response to the handoff request from the handoff target. It is to be noted that a handoff target can accept such a handoff request, refuse such a handoff request, or partially accept such a handoff request (e.g. accept receiving ownership of only part of the one or more cache object spaces or parts thereof that the handoff initiator is trying to transfer thereto, etc.).

Cache handoff module 2530 can be also configured to check if the handoff request has been accepted by the handoff target (block 1750). If the handoff request has been refused (or, in some cases, if no response was received within a pre-determined time-frame, etc.), cache handoff module 2530 can be configured to exit the "handoff in progress" state (block 1760).

If however, the request was accepted, cache handoff module 2530 can be configured to send the post-handoff cache mapping to one or more client servers 218 (or any other relevant user of DSS 200), for example to client servers 218 that are associated with the one or more cache object spaces (e.g. that have access rights to the logical storage entities associated therewith), or parts thereof, to be transferred (block 1770). It is to be noted that in some cases, the new cache mapping can be sent to every client server 218 (or any other relevant user of DSS 200) connected to DSS 200.

In addition, cache handoff module 2530 can be configured to transfer ownership of non-dirty cached objects (cache objects that were not modified since last saved to persistent storage associated with the relevant cache object space) that have been mapped to the handoff target in the post handoff cache mapping, to the handoff target, for example by sending such cached objects (e.g. by transmitting their data) to the handoff target and/or by "forgetting" them (e.g. by marking them as deleted or physically deleting them from the handoff initiator's cache resources) (block 1780).

Still additionally, cache handoff module 2530 can be configured to transfer ownership of dirty cache objects (cache objects that were modified since last saved to persistent storage associated with the relevant cache object space) that are mapped to the handoff target in the post-handoff cache mapping, by flushing them (saving them to the persistent storage associated with the relevant cache object space) and/or by sending such cached objects (e.g. by transmitting their data) to the handoff target, and then "forgetting" them (block 1790).

In some cases, cache handoff module 2530 can be further configured to send a "handoff finished" notification to the handoff target, indicating that the handoff has been performed (block 1795), and to exit the "handoff in progress" state (block 1760). In some cases, block 1795 can be performed only after execution of blocks 1780 and 1790 is completed.

It is to be noted, with reference to FIG. 20, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 21, illustrating a sequence of operations carried out for performing a cache handoff by a handoff target, according to certain examples of the presently disclosed subject matter.

According to some examples of the presently disclosed subject matter, cache handoff module 2530 associated with a handoff target can be configured to receive a "handoff start" notification (including the post-handoff cache mapping) from a handoff initiator, save a backup copy of the local pre-handoff cache mapping, update the cache mapping according to the post-handoff cache mapping received from the handoff initiator and enter a "handoff in-progress" state (block 1810).

Cache handoff module 2530 can, in some cases, be further configured to check if the handoff request received from the handoff initiator is acceptable (block 1820), for example according to the handoff target knowledge of cache-related SLSs, and/or thresholds and/or SLSs that refer to the DSS 200 or parts thereof (e.g. maximal allowed site-level over-commit, maximal allowed overall over-commit, various security parameters, etc.), and/or cache-related parameters stored in the UDSP data repository 330 associated with it.

It can be appreciated that in some cases a handoff target can have access to information about the cache-related SLSs, and/or thresholds and/or SLSs that refer to the DSS 200 or parts thereof (e.g. maximal allowed site-level over-commit, maximal allowed overall over-commit, various security parameters, etc.), and/or cache-related parameters associated therewith and/or with the cache resources connected thereto, different than such information that the handoff initiator has access to (and in some cases, new and/or more updated information). For example, in some cases, by the time that a handoff request is received by a handoff target, one or more parameters relating to the cache resources connected thereto have already changed.

If the handoff request is not acceptable (e.g. based on the handoff target knowledge), cache handoff module 2530 can be configured to send a refusal notification to the handoff initiator (indicating that the handoff target does not accept the handoff request sent by the handoff initiator), restore the local pre-handoff cache mapping (saved for backup in block 1810), and exit the "handoff in-progress" state (block 1830).

If the handoff request is acceptable, cache handoff module 2530 can be configured to send an acceptance notification to the handoff initiator (indicating that the handoff target accepts the handoff request sent by the handoff initiator) (block 1840). In such cases, cache handoff module 2530 can be configured to wait for a "handoff finished" notification, indicating that the one or more cache object space, or parts thereof, have been transferred to the responsibility of the handoff target, and once such a notification is received, exit the "handoff in-progress" state (block 1850).

It is to be noted, with reference to FIG. 21, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 22, illustrating a sequence of operations carried out for handling an object related request received by a handoff initiator during handoff, according to certain examples of the presently disclosed subject matter.

According to some examples of the presently disclosed subject matter, object requests management module 2540 associated with a handoff initiator can be configured to receive an object related request (e.g. a read/write request) relating to an object within the pre-handoff and/or post-handoff cache mappings, for example from a client (e.g. a client server 218, a gateway resource 216, or any other source), during handoff (block 1910).

It is to be noted that in some cases, the requesting client can send the request prior to updating its local cache mapping according to the post-handoff cache mapping (as, in some cases, the post-handoff cache mapping is not received by the client immediately, for example due to heavy traffic on the network or for any other reason). Thus such an object related request can be sent to the handoff initiator while the requested object is no longer owned (e.g. handled) by it. Accordingly, upon receipt of such an object related request, object requests management module 2540 can be configured to check if the requested object is under the ownership of the handoff initiator according to the post-handoff cache mapping (block 1920) and if so—object requests management module 2540 can be configured to process the request (block 1930).

However, if the handoff initiator is not the owner of the requested object according to the post-handoff cache mapping, then object requests management module 2540 can be configured to check if the requested object is still under the ownership of the handoff initiator (e.g. as the handoff initiator did not transfer the ownership over the requested object yet) (block 1940).

If such a requested object is still owned by the handoff initiator, object requests management module 2540 can be configured to process the request (block 1930). However, if such a requested object is no longer owned by the handoff initiator, object requests management module 2540 can be configured to relay the object related request to the handoff target (block 1950).

It is to be noted, with reference to FIG. 22, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 23, illustrating a sequence of operations carried out for handling an object related request, relating to an object included in the post-handoff cache mapping, received by a handoff target during handoff, according to certain examples of the presently disclosed subject matter.

According to some examples of the presently disclosed subject matter, object requests management module 2540 associated with a handoff target can be configured to receive an object related request (e.g. a read/write request) relating to an object within the post-handoff cache mappings, for example from a client (e.g. a client server 218, a gateway resource 216, or any other source) or from a handoff initiator (block 2110). Upon receipt of such a request, object requests management module 2540 can be configured to check if the request originated from a handoff initiator (block 2120).

As indicated herein, a handoff initiator will relay an object related request to a handoff target following a determination that the handoff initiator is not the owner of the requested object according to the post-handoff cache mapping and that the handoff initiator is not the current owner of the requested object (an indication that the handoff initiator is still the owner can be, for example, that the object is still dirty in the handoff initiator's cache, etc.). Thus, whenever the request originates from a handoff initiator, object requests management module 2540 can be configured to process the request (block 2130), as this indicates that the handoff initiator has already transferred ownership of the requested object to the handoff target.

If the request did not originate from a handoff initiator, object requests management module 2540 can be configured to check if the requested object is owned by the handoff target (as, for example, the handoff target has already received ownership of the requested object from the handoff initiator, etc.) (block 2140). If it is owned by the handoff target, object requests management module 2540 can be configured to process the request (block 2130).

If the requested object is not owned by the handoff target (as, for example, the requested object ownership was not yet transferred and the handoff process did not end), object requests management module 2540 can be configured to relay the request to the handoff initiator (block 2150). It is to be noted that such scenario can result, for example, from the fact that a certain user can have an updated post-handoff cache mapping, indicating that the requested object is mapped to the handoff target, whereas, while it requests the requested object, the handoff process is still on-going and thus the requested object ownership was not yet transferred to the handoff target.

It is to be noted, with reference to FIG. 23, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

What is claimed is:

1. A distributed storage system comprising interconnected computer nodes;
    each one of said interconnected computer nodes comprising at least one processing resource configured to execute a Unified Distributed Storage Platform (UDSP) agent;
        wherein a first computer node among said interconnected computer nodes comprises a first cache resource, said first computer node is responsible for handling one or more cache object spaces related to one or more logical storage entities and is operatively connected with a UDSP data repository comprising data on first cache-related parameters corresponding to said first cache resource and cache-related parameters corresponding to one or more cache resources of one or more other computer nodes among said interconnected computer nodes; and
    wherein said UDSP agent of said first computer node is configured to:
        monitor said first cache-related parameters to determine whether said first cache-related parameters meet at least one first Service Level Specification (SLS) criterion;
        when said at least one first SLS criterion is not met by said first cache-related parameters, initiate a handoff of responsibility over at least part of said one or more cache object spaces to at least one second computer node among said interconnected computer nodes, said at least one second computer node comprising a second cache resource with second cache-related parameters corresponding thereto,
        wherein said UDSP agent is further configured to
            select said at least one second computer node such that, after receiving responsibility over said at least part of said one or more cache object spaces, said second cache-related parameters meet at least one second SLS criterion, wherein said second cache-related parameters are comprised in said UDSP data repository;
            create a post-handoff cache mapping at least indicative, for said at least part of said one or more cache object spaces, of said at least one second computer node selected to be responsible thereof;
            send said post-handoff cache mapping to said at least one second computer node;
            transfer responsibility over said at least part of said one or more cache object spaces to said at least one second computer node;
            use data comprised in said UDSP repository to monitor said second cache-related parameters and to determine whether said second cache-related parameters meet at least one first SLS criterion; and
            when said at least one first SLS criterion is not met, initiate a message to said selected at least one second computer node, said message informative of at least one of said cache-related parameters extracted from said UDSP data repository, corresponding to said second cache resource and not meeting said at least one first SLS criterion.

2. The distributed storage system of claim 1, wherein said UDSP agent of said first computer node is further configured to:
    monitor said cache-related parameters corresponding to said first cache resource to determine whether said parameters meet at least one third SLS criterion indicative of underutilization of said first cache resource; and
    when said at least one third SLS criterion is met, initiate a handoff of responsibility over at least part of said one or more cache object spaces to at least one third computer node among said interconnected computer nodes, said third computer node comprising a third cache resource, wherein said UDSP agent is further configured to select said at least one third computer node such that after receiving responsibility over said at least part of one or more cache object spaces, cache-related parameters corresponding to said third cache resource meet said at least one second SLS criterion.

3. The distributed storage system of claim 1, wherein said UDSP agent is further configured, in response to a failure to initiate said handoff, to provide a user with a failure notification or with a recommendation indicative of a need in addition of at least one additional cache resource.

4. The distributed storage system of claim 1 wherein said UDSP repository is comprised in at least one of the group consisted of said first computer node, a gateway resource operatively coupled to said first computer node and a client server operatively coupled to said first computer node.

5. The distributed storage system of claim 1, wherein said UDSP agent of said first computer node is further configured to send said post-handoff cache mapping to one or more client servers associated with said at least part of one or more cache object spaces.

6. The distributed storage system of claim 1 wherein said UDSP agent of said first computer node is further configured to:
receive, during said handoff, a request relating to a cache object space within said post-handoff cache mapping; and
relay said request to said second computer node when, according to said post-handoff cache mapping, said first computer node is not responsible for the respective cache object space.

7. A computer node configured to operatively connected to an infrastructure layer including interconnected computer nodes, said computer node comprising:
at least one first cache resource having corresponding cache-related parameters and configured to be responsible for handling one or more cache object spaces related to one or more logical storage entities, the computer node further operatively connected to a UDSP data repository comprising data on first cache-related parameters corresponding to said first cache resource and cache-related parameters corresponding to one or more cache resources of one or more other computer nodes among said interconnected computer nodes;
at least one processing resource configured to execute a Unified Distributed Storage Platform (UDSP) agent, wherein said UDSP agent is configured to:
monitor the first cache-related parameters to determine whether the first cache-related parameters meet at least one first Service Level Specification (SLS) criterion;
when said at least one first SLS criterion is not met by the first cache-related parameters, initiate a handoff of responsibility over at least part of said one or more cache object spaces to at least one second computer node among said interconnected computer nodes, said at least one second computer node comprising a second cache resource with second cache-related parameters corresponding thereto,
wherein said UDSP agent is further configured to
select said at least one second computer node such that, after receiving responsibility over said at least part of said one or more cache object spaces, the second cache-related parameters meet at least one second SLS criterion, wherein the second cache-related parameters are comprised in said UDSP data repository;
create a post-handoff cache mapping at least indicative, for said at least part of said one or more cache object spaces, of said at least one second computer node selected to be responsible thereof;
send said post-handoff cache mapping to said at least one second computer node;
transfer responsibility over said at least part of said one or more cache object spaces to said at least one second computer node;
use data comprised in said UDSP repository to monitor the second cache-related parameters and to determine whether the second cache-related parameters meet at least one first SLS criterion; and
when said at least one first SLS criterion is not met, initiate a message to said selected at least one second computer node, said message informative of at least one of the cache-related parameters extracted from said UDSP data repository, corresponding to said second cache resource and not meeting said at least one first SLS criterion.

8. The computer node of claim 7, wherein said UDSP agent is further configured to:
monitor the cache-related parameters corresponding to said first cache resource to determine whether the parameters meet at least one third SLS criterion indicative of underutilization of said first cache resource; and
when said at least one third SLS criterion is met, initiate a handoff of responsibility over at least part of said one or more cache object spaces to at least one third computer node among said interconnected computer nodes, said third computer node comprising a third cache resource, wherein said UDSP agent is further configured to select said at least one third computer node such that after receiving responsibility over said at least part of one or more cache object spaces, cache-related parameters corresponding to said third cache resource meet said at least one second SLS criterion.

9. The computer node of claim 7, wherein said UDSP agent is further configured, in response to a failure to initiate said handoff, to provide a user with a failure notification or with a recommendation indicative of a need in addition of at least one additional cache resource.

10. The computer node of claim 7, wherein said UDSP repository is comprised in at least one of the group consisted of said first computer node, a gateway resource operatively coupled to said first computer node and a client server operatively coupled to said first computer node.

11. The computer node of claim 7, wherein said UDSP agent is further configured to send said post-handoff cache mapping to one or more client servers associated with said at least part of one or more cache object spaces.

12. The computer node of claim 7, wherein said UDSP agent is further configured to:
receive, during said handoff, a request relating to a cache object space within said post-handoff cache mapping; and
relay said request to said second computer node when, according to said post-handoff cache mapping, said first computer node is not responsible for the respective cache object space.

13. A method of operating a computer node having at least one first cache resource connected thereto and configured to be responsible for handling one or more cache object spaces related to one or more logical storage entities, the computer node configured to be operatively connected to an infrastructure layer including interconnected computer nodes and to a UDSP data repository comprising data on first cache-related parameters corresponding to said first cache resource and cache-related parameters corresponding to one or more cache resources of one or more other computer nodes among said interconnected computer nodes, the method comprising:

monitoring the first cache-related parameters to determine whether the first cache-related parameters meet at least one first Service Level Specification (SLS) criterion;

when said at least one first SLS criterion is not met by the first cache-related parameters, initiating handoff of responsibility over at least part of said one or more cache object spaces to at least one second computer node of said interconnected computer nodes, said at least one second computer node comprising a second cache resource with second cache-related parameters corresponding thereto, wherein said at least one second computer node is selected such that after receiving responsibility over said at least part of said one or more cache object spaces, the second cache-related parameters meet at least one second SLS criterion, wherein the second cache-related parameters are comprised in said UDSP data repository;

creating a post-handoff cache mapping at least indicative, for said at least part of said one or more cache object spaces, of said at least one second computer node selected to be responsible thereof;

sending said post-handoff cache mapping to said at least one second computer node;

transferring responsibility over said at least part of said one or more cache object spaces to said at least one second computer node;

using data comprised in said UDSP repository to monitor the second cache-related parameters and to determine whether the second cache-related parameters meet at least one first SLS criterion; and when said at least one first SLS criterion is not met, initiating a message to said selected at least one second computer node, said message informative of at least one of the cache-related parameters extracted from said UDSP data repository, corresponding to said second cache resource and not meeting said at least one first SLS criterion.

14. The method of claim 13 further comprising:

monitoring the cache-related parameters corresponding to said first cache resource to determine whether the parameters meet at least one third SLS criterion indicative of underutilization of said first cache resource; and when said at least one third SLS criterion is met, initiating a handoff of responsibility over at least part of said one or more cache object spaces to at least one third computer node among said interconnected computer nodes, said third computer node comprising a third cache resource, wherein said at least one third computer node is selected such that after receiving responsibility over said at least part of one or more cache object spaces, cache-related parameters corresponding to said third cache resource meet said at least one second SLS criterion.

15. The method of claim 13 further comprising: in response to a failure to initiate said handoff, providing a user with a failure notification or with a recommendation indicative of a need in addition of at least one additional cache resource.

16. The method of claim 13, wherein said UDSP repository is comprised in at least one of the group consisted of said first computer node, a gateway resource operatively coupled to said first computer node and a client server operatively coupled to said first computer node.

17. The method of claim 13 further comprising: sending said post-handoff cache mapping to one or more client servers associated with said at least part of one or more cache object spaces.

18. The method of claim 13 further comprising:

receiving, during said handoff, a request relating to a cache object space within said post-handoff cache mapping; and relaying, said request to said second computer node when, according to said post-handoff cache mapping, said first computer node is not responsible for the respective cache object space.

19. A non-transitory computer readable storage medium having instructions that, when executed by a processing device, cause the processing device to perform operating a computer node having at least one first cache resource connected thereto and configured to be responsible for handling one or more cache object spaces related to one or more logical storage entities, the computer node configured to connected to an infrastructure layer including interconnected computer nodes and to a UDSP data repository comprising data on first cache-related parameters corresponding to said first cache resource and cache-related parameters corresponding to one or more cache resources of one or more other computer nodes among said interconnected computer nodes, the operating comprising:

monitoring the first cache-related parameters to determine whether the cache-related parameters meet at least one first Service Level Specification (SLS) criterion; and when said at least one first SLS criterion is not met by the first cache-related parameters, initiating handoff of responsibility over at least part of said one or more cache object spaces to at least one second computer node of said interconnected computer nodes, said at least one second computer node comprising a second cache resource with second cache-related parameters corresponding thereto, wherein said at least one second computer node is selected such that after receiving responsibility over said at least part of said one or more cache object spaces, the second cache-related parameters meet at least one second SLS criterion, wherein the second cache-related parameters are comprised in said UDSP data repository;

creating a post-handoff cache mapping at least indicative, for said at least part of said one or more cache object spaces, of said at least one second computer node selected to be responsible thereof;

sending said post-handoff cache mapping to said at least one second computer node;

transferring responsibility over said at least part of said one or more cache object spaces to said at least one second computer node;

using data comprised in said UDSP repository to monitor the second cache-related parameters and to determine whether the second cache-related parameters meet at least one first SLS criterion; and when said at least one first SLS criterion is not met, initiating a message to said selected at least one second computer node, said message informative of at least one of the cache-related parameters extracted from said UDSP data repository, corresponding to said second cache resource and not meeting said at least one first SLS criterion.

* * * * *